United States Patent [19]

Tescher

[11] Patent Number: 4,541,012

[45] Date of Patent: Sep. 10, 1985

[54] VIDEO BANDWIDTH REDUCTION SYSTEM EMPLOYING INTERFRAME BLOCK DIFFERENCING AND TRANSFORM DOMAIN CODING

[75] Inventor: Andrew G. Tescher, Claremont, Calif.

[73] Assignee: Compression Labs, Inc., San Jose, Calif.

[21] Appl. No.: 336,984

[22] Filed: Jan. 4, 1982

[51] Int. Cl.[4] .............................................. H04N 7/12
[52] U.S. Cl. ................................... 358/133; 358/135
[58] Field of Search ............... 358/133, 135, 136, 138, 358/13; 382/43; 364/725, 726, 727, 826, 827

[56] References Cited

U.S. PATENT DOCUMENTS

| | | | |
|---|---|---|---|
| 3,366,739 | 1/1968 | Parkinson | 358/133 |
| 4,179,709 | 12/1979 | Workman | 358/133 |
| 4,202,011 | 5/1980 | Koga | 358/136 |
| 4,216,354 | 8/1980 | Esteban et al. | 381/31 |
| 4,224,678 | 9/1980 | Lynch et al. | 364/724 |
| 4,225,885 | 9/1980 | Lux et al. | 340/146.3 |
| 4,237,494 | 12/1980 | Yamaguchi | 358/280 |
| 4,254,438 | 3/1981 | Yamazaki et al. | 358/261 |
| 4,302,775 | 11/1981 | Widergren et al. | 358/136 |

OTHER PUBLICATIONS

Haskell–Frame to Frame Coding–IEEE Trans. on Infor. Theory, vol. IT-20, No. 1, pp. 119–120, Jan. 1974.
Kangko–Digital Television Transmission–IEEE Comm.–Jul. 1980, pp. 14–22.
Mounts, F. W., "A Video Encoding System with Conditional Picture–Element Replenishment", *The Bell System Technical Journal*, Sep. 1969.
Murray, G. Graham, Staley, Patrick A. and Thoma, George R., "Motion–adaptive TV data compression", SPIE, vol. 241, pp. 51–60, *Real–Time Signal Processing III*(1980).
Haskell, B. G. and Schmidt, R. L., "A Low–Bit–Rate Interframe Coder for Videotelephone", *The Bell System Technical Journal*, vol. 54, No. 8, Oct. 1975.
Jones, Jr., Harry W., "A Conditional Replenishment Hadamard Video Compressor", SPIE, vol. 119, *Applications of Digital Image Processing*, (IOCC 1977).
Hein, David N. and Jones, Jr., Harry W., "Conditional replenishment using motion prediction", SPIE, vol. 207, *Applications of Digital Image Processing III* (1979).

*Primary Examiner*—Joseph A. Orsino, Jr.
*Attorney, Agent, or Firm*—Fliesler, Dubb, Meyer & Lovejoy

[57] ABSTRACT

Video type information signals are compressed for transmission and reproduction by comparing corresponding blocks of time domain information signals from successive fields, converting a block of the time domain information signals to a transform domain signal represented by discrete cosine transform coefficients when the difference between the corresponding blocks exceeds a block difference threshold, and encoding the transform domain coefficients for transmission to a decoding site. Corresponding blocks of time domain information signals from successive fields are compared by storing the successive fields in memory on a pixel by pixel basis, retrieving each block on a pixel by pixel basis, forming the difference between corresponding pixels from the successive blocks, squaring the resulting difference signal, summing the squares and dividing by the number of pixels per block. Successive fields are merged by weighted summing of corresponding pixels.

35 Claims, 8 Drawing Figures

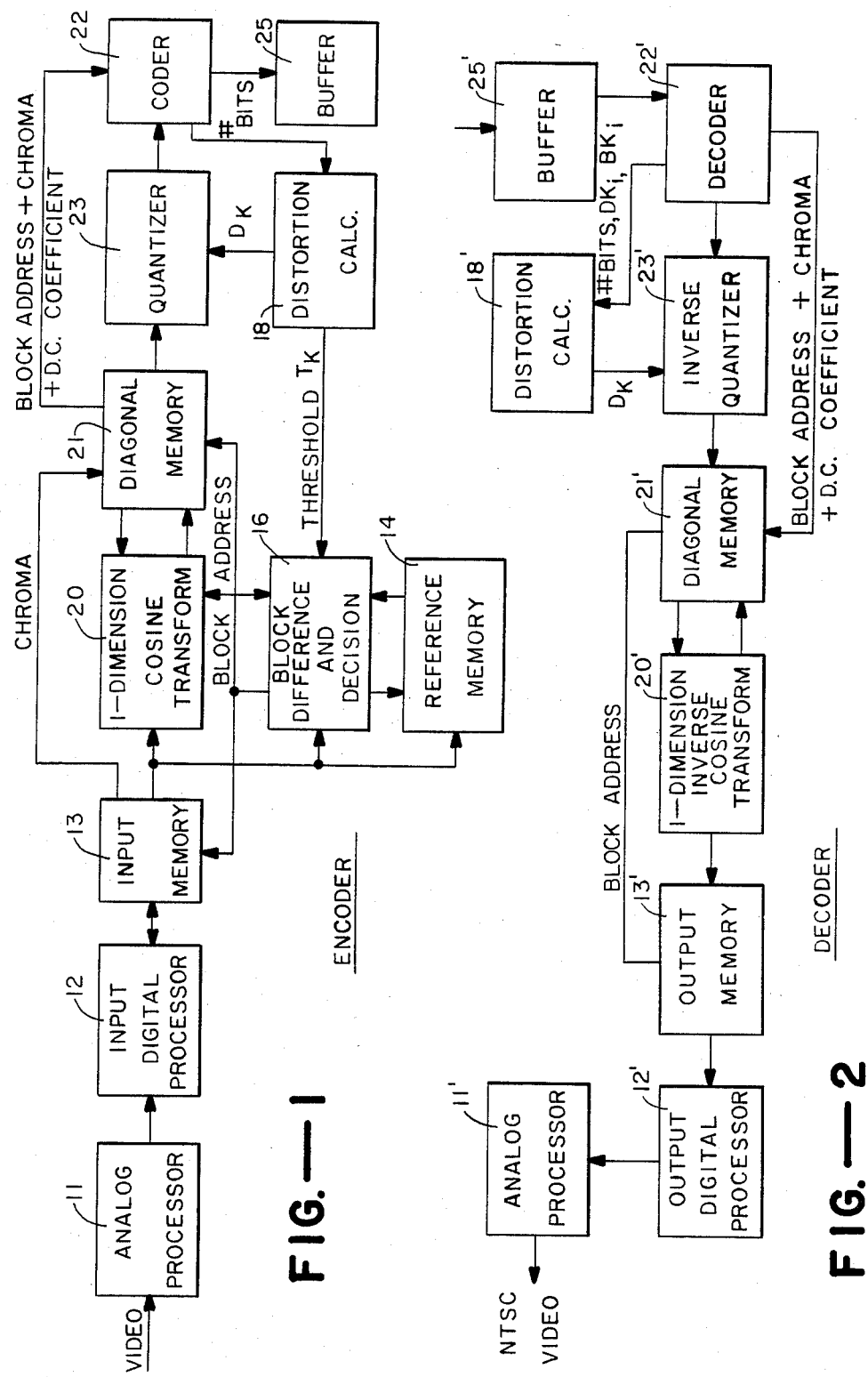

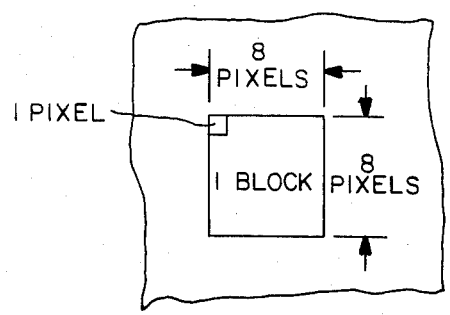
FIG.—3
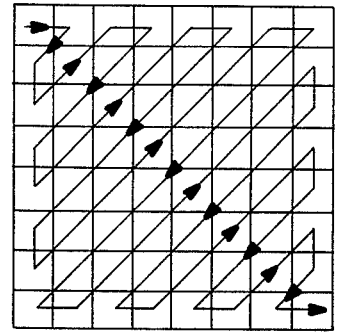
FIG.—5
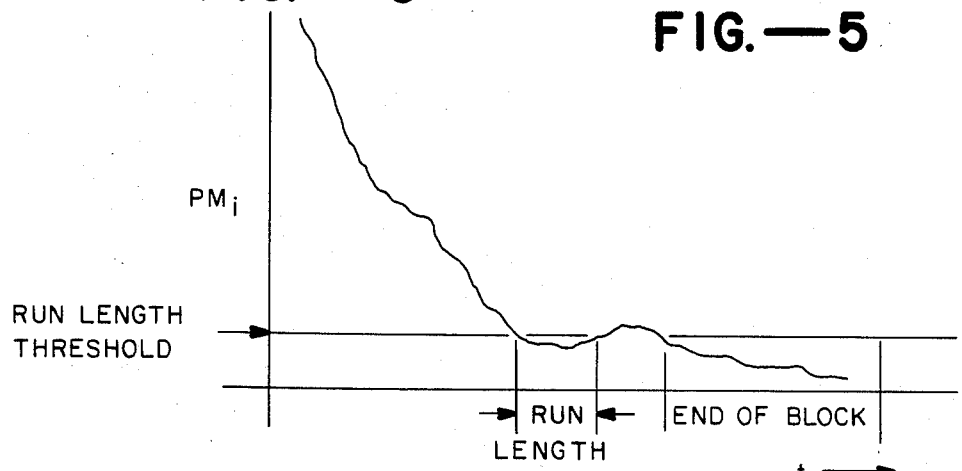
FIG.—7
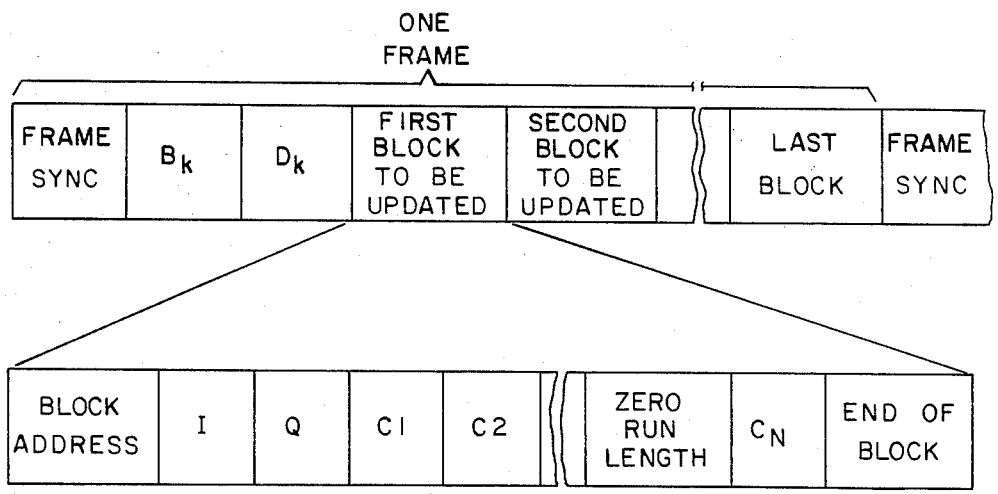
FIG.—8

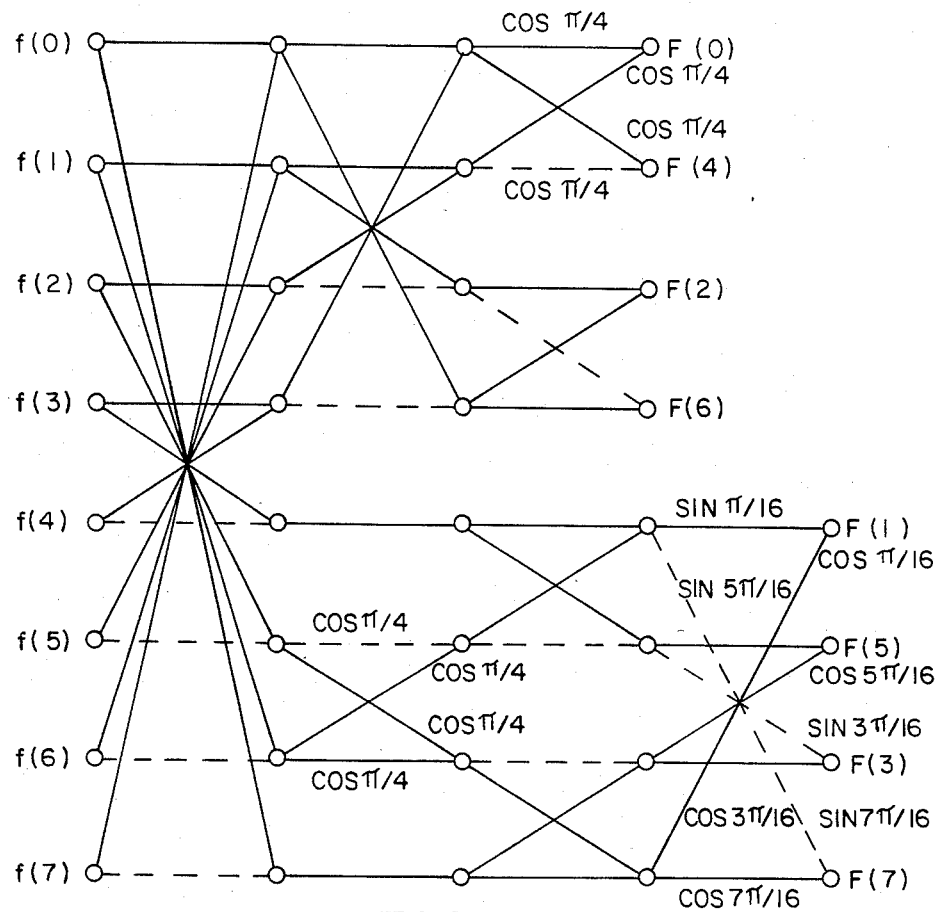
FIG.—4
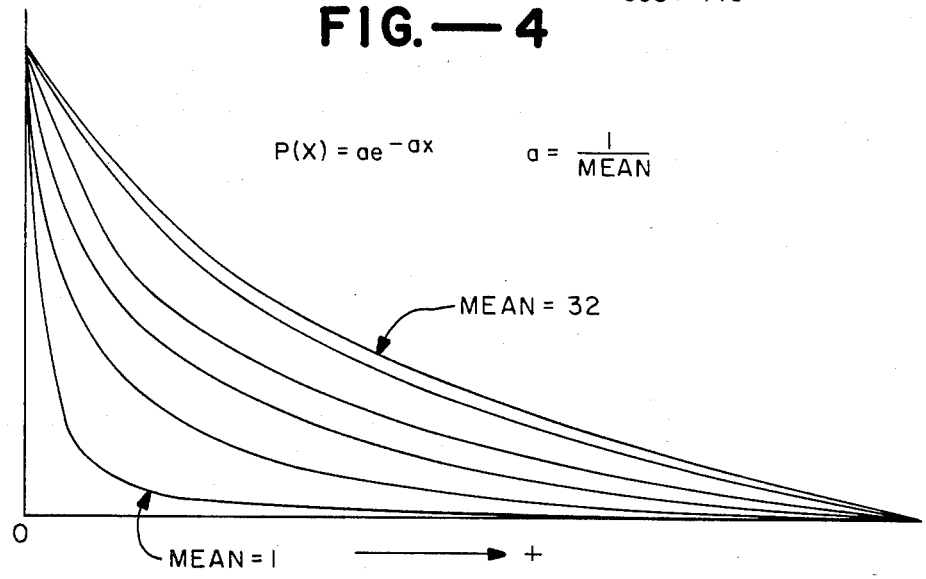
FIG.—6

VIDEO BANDWIDTH REDUCTION SYSTEM EMPLOYING INTERFRAME BLOCK DIFFERENCING AND TRANSFORM DOMAIN CODING

BACKGROUND OF THE INVENTION

This invention relates to information signal processing in general, and in particular to the field of processing time sequential information signals (such as video signals) for the purpose of compressing the amount of information to be transferred from an encoding site to a decoding site.

In recent years, increasing efforts have been directed toward providing more efficient information signal encoding techniques used to process time sequential information signals prior to their transmission from a transmitting station to a receiving station. The requirement for more efficient encoding techniques has been prompted by two major factors: firstly, a substantial increase in the quantity of information required to be transferred via communication links and, secondly, maximum occupancy of the communication frequency bands available for voice and data transmission. An early technique employed to reduce the amount of information required to be transferred without substantial degradation is the signal processing technique known as conditional replenishment, described in U.S. Patent No. 3,984,626 to Mounts et al., the disclosure of which is hereby incorporated by reference. Briefly, in the conditional replenishment signal processing technique, individual line element sample signals from a successive field of information are compared with the corresponding line elements in the previous field, and the difference therebetween is tested against a fixed threshold. If the difference exceeds the threshold value, the new value is encoded and transmitted to a receiving station, along with an appropriate address code specifying the line location of the sample to be updated in the field memory of the receiving station. Thus, rather than transmitting each and every line sample for every field, only those samples which differ by a significant threshold amount are transmitted, which substantially reduces the number of samples in the communication channel pipeline. Although this saving in the amount of actual data flowing through the communication pipeline is somewhat offset by the necessity of simultaneously transmitting the address information, this disadvantage is more than overcome by the substantial reduction in the total number of samples which must be transmitted in order to maintain the information current at the decoding site. When used to process video type information signals, an even greater reduction in the required number of transmitted samples is achieved due to the inherent nature of video signals, which possess intrinsic interfield correlation (e.g. abrupt interfield changes for background portions of video images occur relatively infrequently).

Another compression technique known in the art is the use of transform domain encoding, in which each field of information signals is divided into a number of rectangular or square arrays of individual picture elements (for example a 16 pixel by 16 pixel array) termed blocks, and each block is converted to the transform domain. For each converted block, the individual transform coefficients are then encoded and transmitted along with appropriate address codes, as well as additional overhead information (e.g. field start signals, frame start signals and the like). One such transform domain processing system is disclosed in U.S. Pat. No. 4,189,748 to Reis, the disclosure of which is hereby incorporated by reference.

Although many types of mathematical transform functions have been proposed for implementation in a transform domain signal processing system, in reality most transform functions are inappropriate for implementation due to the complexity of the required logic circuitry. This disadvantage is exacerbated in applications requiring real time signal processing by virtue of the minimum time period required to perform the signal processing necessary to generate the values of the transform coefficients. For a general discussion of the advantages and disadvantages of the different types of transform functions, reference should be had to the collection of technical publications entitled "Image Transmission Techniques, Advances in Electronics and Electron Physics, Supplement 12", Pratt, Academic Press, 1979, particularly the section entitled "Transform Image Coding".

SUMMARY OF THE INVENTION

The invention comprises a method and system for processing time domain information signals which combines the advantages of conditional replenishment and transform domain coding in such a manner that information signal compression of a magnitude substantially greater than that available in known systems is achieved while affording real time information signal processing.

In its broadest aspect, the invention provides a method of processing time domain information signals having a successive field format to effect substantial compression of the signals, the method including the steps of comparing corresponding blocks of time domain information signals from successive fields, converting a block of the time domain information signals to a transform domain signal represented by discrete cosine transform coefficients when the difference between the corresponding blocks exceeds a first variable parametric value, and encoding the transform domain coefficients for subsequent utilization, e.g. transmission from a transmitting station to a receiving station, recording on video tape or other magnetic media, etc. The corresponding blocks of time domain information signals from successive fields are compared by storing the successive fields in memory on a pixel by pixel basis, retrieving the corresponding blocks from memory also on a pixel by pixel basis, forming the difference between corresponding pixels from the successive blocks, squaring the resulting difference signal, summing the squares of the resulting difference signals, and dividing the resulting sum by the number of pixels per block. In the preferred embodiment, the method is optimized by employing a total of 64 pixels per block arranged in an 8 by 8 array and by merging successive fields on a pixel by pixel basis, the merging being performed by summing corresponding pixels from successive fields in accordance with a predetermined weighting factor of $\frac{3}{4}$ for the earlier appearing (previously merged) field and $\frac{1}{4}$ for the later appearing field.

The conversion of a block of the time domain information signals to the transform domain is accomplished by first transforming the individual block samples along a first direction, which is the horizontal line direction in the preferred embodiment, and subsequently transforming the same block samples along the orthogonal direction, which is the vertical direction in the preferred embodiment. For each transformed block, the individual block samples corresponding to the previous field are replaced with the updated block information, and the transformed coefficients for the converted block are stored in diagonal format in a diagonal memory unit. In addition, an address code indicating the field address of a transformed block is also stored in the diagonal memory for subsequent encoding.

The transform coefficients for each converted block stored in the diagonal memory are encoded using a plurality of different code tables, one of the tables being dedicated to the first coefficient in each diagonal group, corresponding to the DC term and representing the average signal intensity of the converted block, and the remaining tables being selected on a coefficient by coefficient basis. Specifically, each transform coefficient (other than the first or DC coefficient) is first quantized by digitally dividing the coefficient by a varible parametric value $D_K$, after which the predictive mean value of each quantized coefficient is calculated by summing a weighted portion of the actual value of that quantized coefficient with the predictive mean value of the previous quantized coefficient weighted by a different factor, and the newly calculated predictive mean value is used to select that one of the several available individual code tables capable of encoding the quantized coefficient value with a minimum number of binary bits. In addition to the tables noted above, separate tables are provided for encoding the block address of the encoded transform coefficients, for directly encoding the D.C coefficient, and for run length coding certain coefficient values. In the case of time domain information signals comprising color video signals with quadrature components two preselected quantized coefficient code tables are used to represent the average value of each color quadrature component of the corresponding converted block.

To further compress the amount of information encoded prior to utilization, those successive transform coefficients with zero value whose predictive mean lies below the value of a preselected fixed threshold are transmitted as a run length code. In addition, when the predictive values for successive remaining cosine coefficients in the converted block lie below the preselected fixed threshold, a single end-of-block code is generated.

The codes corresponding to a given converted block are transferred at a availablef rate to a rate buffer in the order of generation prior to utilization, and the number of binary bits transferred to the buffer is monitored in order to gauge the buffer fullness. The dynamic occupancy of the buffer is used to control the value of the variable parametric value $D_K$ in order in minimize the possibility of buffer overflow, utilizing a special algorithm. The buffer fullness state is also used to control the first variable parametric value—termed the block difference threshold $T_K$—also by employing a special algorithm. Thus, as the rate buffer approaches the completely filled state, the magnitude of $D_K$ is increased, which increases the minimum quantizing interval employed in sampling the transform coefficients during the encoding process. In addition, the block difference threshold $T_K$ is similarly increased to reduce the number of blocks selected for conversion to the transform domain and subsequent encoding. Similarly, as the state of the buffer fullness decreases, both $D_K$ and $T_K$ are lowered in value in accordance with the special algorithms employed in order to increase the number of blocks selected for conversion to the transform domain and to decrease the minimum quantization interval used in the encoding process.

The codes representing the converted blocks are formatted in the rate buffer in the following fashion. The start of each frame is denoted by a frame sync code signal, which is followed by a first control code signal representative of the buffer fullness at the beginning of the frame and a second control code signal representative of the quantizing interval $D_K$ value at the beginning of the same frame. The control code signals are followed by individual block replenishment code symbols which include a block address code specifying the field address of the corresponding block, the DC code term representative of the average intensity of the corresponding block, and the plurality of coefficient code terms reprentative of the predictive mean value of the transform coefficients for the corresponding block. For color video signal processing, the quadrature component code terms are included between the block address code and the DC code term. The termination of the last block is signified by the subsequent appearance of the frame sync code signal for the next succeeding frame.

The decoding process is essentially the inverse of the encoding process. For each frame of encoded information, the first and second control code signals are used to establish the initial minimum quantization interval to be employed for inverse quantizing the block replenishment code symbols. The received replenishment code symbols are decoded using a parallel set of inverse code tables, which are selected using the same predictive mean algorithm as that employed in the encoding process. The block address, quadrature chrominance and D.C. term codes are coupled directly to a diagonal memory unit, while the coefficient code terms are inverse quantized by multiplying each code term by $D_k$, using the transmitted initial value of $D_K$ for the first block of data, and the resulting coefficients are stored in the diagonal memory unit. After the first block has been decoded, the distortion constant $D_k$ is recalculated and the newly calculated value of $D_k$ is used to inverse quantize the next block of data.

The coefficients stored in the diagonal memory unit are then transformed to time domain digital samples using an inverse discrete cosine transform, and the resulting samples are stored in an output memory unit, replacing previous samples representing the same block. The merged field samples stored in the output memory unit, which replicate the merged field samples stored in a corresponding reference memory unit at the encoder stie, are finally processed to provide video output signals.

Further compression is achieved according to the invention by special initial processing of the luminance and chrominance samples. The luminance signals are sub-sampled at less than the standard rate (which is 512 lines/frame and 512 samples/line for NTSC video), the preferred embodiment employing 256 lines/frame and 256 samples/line. Each quadrature chrominance component is sub-sampled at less than the standard rate and averaged over a given block. In the preferred embodiment, each quadrature component is sub-sampled at one-half the standard rate for each block line and the sub-samples for each block line are averaged, after which each block line average is combined to obtain a block average. Prior to averaging, each chrominance component sample is further modifed by discarding the two least significant bits of the sample. After transmission from an encoding site to a decoding site, the full range of luminance and chrominance samples is recovered by individual interpolative processing of the received luminance and chrominance samples.

BRIEF DESCRIPTION OF THE DRAWINGS

FIG. 1 is a block diagram illustrating an encoder incorporating the invention;

FIG. 2 is a block diagram illustrating a decoder incorporating the invention;

FIG. 3 is a schematic view of a portion of a display screen illustrating the replenishment block size;

FIG. 4 is a trellis diagram illustrating the cosine transform alogorithm employed in the preferred embodiment;

FIG. 5 is a schematic diagram illustrating the manner in which transform coefficients are stored in a diagonal memory unit;

FIG. 6 is set of probability distribution curves illustrating the manner in which the quantized coefficient encoding tables are constructed;

FIG. 7 is a schematic diagram illustrating typical predictive mean values for a single block; and FIG. 8 is a schematic diagram illustrating the code formatting for one frame of replenishment information.

DESCRIPTION OF THE PREFERRED EMBODIMENTS

Turning now to the drawings, FIG. 1 is a block diagram illustrating a preferred embodiment of the encoded portion of the invention. As seen in this FIG., analog video signals are coupled to the input of an analog processor unit 11 in which composite video input signals are separated into the standard luminance and quadrature chrominance components and converted to multi-bit digital samples at a predetermined sampling rate. In the preferred embodiment eight bit digital samples are taken at a 10.7 MHz sampling rate. The equivalent digital samples produced in analog processor unit 11 are coupled to the input of an input digital processor 12 in which incoming field samples are merged with the corresponding samples from the previous field in the manner described below. The resulting individual merged field samples from input digital processor 12 are stored in an input memory unit 13 having a sufficient capacity to contain one field of digital information. An additional memory unit 14, termed a reference memory, is coupled to the data output of input memory unit 13. Reference memory unit 14 stores a reference field of information for comparison with a newly merged field stored in input memory unit 13, and has the same capacity as input memory unit 13.

In operation, the individual digital samples from an incoming field supplied to input digital processor 12 are added to the corresponding digital samples of the previously merged field stored in input memory unit 13 on a weighted basis, and the resulting weighted sums are stored in input memory unit 13, replacing the previously stored samples on a pixel by pixel basis. In the preferred embodiment, the samples are weighted by a factor of 3 to 1 between the older samples stored in the input memory unit 13 and the incoming field samples, i.e. the earlier samples are multiplied by a factor of $\frac{3}{4}$, the later samples are multiplied by the factor of $\frac{1}{4}$ and the resulting weighted samples are added together. The weighting multiplication and the addition are accomplished with conventional digital multipliers and adders, in combination with appropriate conventional addressing logic.

Each newly merged field stored in input memory unit 13 is compared on a block by block basis with the reference field stored in reference memory unit 14 by means of a block difference and decision unit 16. As illustrated in FIG. 3, each block element consists of a rectangular array of 8 pixels by 8 pixels, and the difference between each block is obtained by digitally subtracting corresponding pixel samples read from input memory unit 13 and reference memory unit 14 in block difference and decision unit 16, squaring the resulting difference signals, summing the squares of the resulting difference signals, and dividing the resulting sum by the number of pixels per block (64). Each block difference value so obtained is tested against a threshold $T_K$ supplied from a distortion calculation unit 18. If the block difference exceeds the threshold, the corresponding block in input memory unit 13 is converted to a set of transform coefficients by means of a one dimension cosine transform unit 20, and the transform coefficients are stored in a diagonal memory unit 21 along with a corresponding block address code specifying the field block to which the transform coefficients correspond. In addition, whenever a block is selected for conversion to the transform domain, the reference memory unit 14 is updated by replacing the corresponding block in reference-memory unit 14 with the newly selected block.

The conversion of each selected block to the transform domain is done by a one dimensional cosine transform unit 20 in two steps: a first transformation along the horizontal direction, followed by a second transformation along the vertical direction. The cosine transform unit 20 implements the well known discrete cosine transform function:

$$F(R) = \frac{2C(k)}{N} \sum_{j=0}^{N-1} f(j)\cos\left[\frac{(2j+1)k\pi}{2N}\right]$$

where $$C(k) = \frac{1}{\sqrt{2}}$$

at zero, 1 for k (1, N−1) and zero elsewhere and comprises a plurality of conventional digital multiplying accumulators configured to implement the 8 point cosine transform algorithm shown in the trellis diagram of FIG. 4. During the transformation along the horizontal direction, developing coefficients are stored in diagonal memory unit 21, and are subsequently recalled during the transformation in the vertical direction. After the selected block has been completely converted to the transform domain, the resulting series of coefficients is stored in diagonal memory unit 21 along with a multi-bit digital word specifying the block address of the block corresponding to the series of coefficients and two multi-bit digital words specifying the average value of the chrominance quatradure components for the corresponding block, the coefficients being arranged in the diagonal form illustrated schematically in FIG. 5.

The transform coefficients and corresponding block address and chrominance quadrature digitial characters are next encoded for subsequent transmission in the following manner. The block address digital character corresponding to a series of transform coefficients is coupled directly to a coder unit 22 which contains in the preferred embodiment nine separate code tables, eight tables containing a set of code characters arranged according to the Huffman code technique, in which the number of bits per specific character depends upon the probability of occurrence of that character, and one table containing a set of code characters arranged according to a special variable length coding technique specified below. The special variable length code table is dedicated for use with the block address code, and the application of a new block address code to the dedicated code table results in the generation of a block address transmission code. The block address is actually encoded by forming the numerical difference between the current block address and the address of the most recent previously encoded block address, and generating a code in accordance with the following algorithm:

If $\Delta_k = 1$, code 1 bit ($\Delta_k$)
If $\Delta_k < 32$, code 1 bit zero + 5 bits ($\Delta_k$)
If $\Delta_k \geq 32$, code 6 bits zero + 10 bits ($\Delta_k$)
where
$\Delta_k = A_k - A_{k-1}$
$A_k$ = numerical address of current block
$A_{k-1}$ = numerical address of most recently encoded block.

The color quadrature components are encoded using dedicated Huffman code tables in coder unit 22. The tables listed as table number 2 and table number 3 in appendix A are used for the Q and I component values, respectively. After the block address and the color quadrature components have been encoded in the manner noted above, the first coefficient in diagonal memory unit 21 corresponding to the block, and which respresents the average luminance of the block, is encoded using dedicated Huffman code table number 7 shown in appendix A. Thereafter, the cosine coefficients are processed for encoding by passing each cosine coefficient through a quantizer unit 23 in which the individual coefficients are divided by a distortion constant $D_k$ supplied by distortion calculator unit 18. More particularly, each coefficient is multiplied by the quantity $1/D_k$ using a digital multiplier, and the resulting rounded product, designated as a quantized cosine coefficient, is coupled to coder unit 22. In the preferred embodiment, each quantized cosine coefficient comprises a 12 bit digital character having 1 sign bit and 11 bits of magnitude. For each quantized cosine coefficient received in coder unit 22, the predictive mean value is calculated using the following relationship:

$$PM_K = \tfrac{1}{4}C_K + \tfrac{3}{4}PM_{K-1}$$

where $PM_K$ is the predictive mean value of the $K^{th}$ quantized coefficient, $C_K$ is the value of the $K^{th}$ quantized coefficient and $PM_{K-1}$ is the predictive mean value of the $K-1^{th}$ quantized coefficient. The predictive mean value $PM_K$ is used to select one of six of the Huffman code tables 1-6 listed in Appendix A to be used to encode the next appearing quantized coefficient, in the manner described below. Thus, $PM_K$ is used to select the Huffman code table for quantized coefficient $K+1$, $PM_{K+1}$ is used for quantized coefficient $K+2$, etc.

The four most significant magnitude bits of each quantized coefficient are next examined in coder unit 22 using conventional logic circuitry and, if the most significant four bits are zero, the quantized coefficient is Huffman coded using one of tables 1-6 listed in appendix A. Each table 1-6 is constructed using a different one of six probability distribution curves illustrated in FIG. 6. Each curve comprises an exponential function, with different curves having different mean values ranging from 1 to 32. The calculated predictive mean value $PM_K$ measures the steepness of the probability curve for a given quantized coefficient, and thus each Huffman code table is selected for a particular quantized coefficient by converting the value of $PM_K$ to the log (base 2) equivalent value, and using the converted value to specify the appropriate table. The table selected is ideally that table capable of encoding the quantized coefficient with the least number of bits.

When the four most significant bits of a quantized coefficient are non-zero, a Huffman coded special escape symbol from the appropriate table and the actual twelve-bit quantized coefficient are transmitted. The escape symbol is the last symbol found in the Appendix A tables.

Coding of the transform coefficients proceeds as described until the predictive mean falls below a preselected fixed threshold, termed the run length threshold. When this occurs, a run length code corresponding to the number of successive quantized coefficients having value zero is generated by coder unit 22 using table number 8 from appendix A. If the zero run extends to the end of the block, a special end of block code is generated by coder unit 22 from table number 8. The above described encoding process is graphically illustrated in FIG. 7 in which the trend of the predictive mean values is illustrated by the solid curve labelled $PM_i$. The run length threshold is designated by the horizontal broken line, and the run length and end of block segments are designated with the legends RL and EOB, respectively. In the preferred embodiment, the numerical value of the run length threshold is one.

The code characters generated in coder unit 22 are stored in their order of generation in a rate buffer unit 25 having a predetermined maximum capacity N. Rate buffer 25 is a conventional unit capable of accepting binary input bits at a variable rate and generating bits at the output thereof at a constant rate of $2.39 \times 10^5$ bits/sec. in the preferred embodiment. Since the rate at which coder unit 22 supplies binary bits to the input of rate buffer 25 can vary widely, while the buffer output bit rate is constant, a rate feedback technique is incorporated into the encoder of FIG. 1 to minimize the probability of buffer overflow. For this purpose, a signal representative of the number of bits actually transferred from coder unit 22 to buffer unit 25 is coupled to distortion calculator unit 18 for each replenishment block K, and the value of the distortion constant $D_k$, which establishes the magnitude of the minimum quantization interval for quantizer unit 23, is recalculated. The calculation is performed in accordance with the following relationship:

DISTORTION CALCULATION $$D = D'_K + K_D \cdot BFN(B_K - N/2)$$

where:
$BFN(X) = (X/N - |X|)$
$D_K$ = Distortion parameter for block K
$D'_K$ = Filtered distortion parameter $$D'_K = T \cdot D'_{K-1} + (1-T)D_{K-1}$$

where

T=a constant (close to 1)
$K_D$=a constant
$B_K$=# of bits in buffer for block K
N=Max. number of bits In addition, the distortion calculator 18 updates the value of the block difference threshold $T_k$ for each encoded replenishment block in accordance with the following relationship:

REPLENISHMENT CALCULATION $$T_K = T_{INIT}$$

for $B_{LOW} \leq B_K \leq B_{HIGH}$ $$T_K = T_{INIT} + K_R \cdot BFN(B_{LOW} - B_K)$$

for $B_K < B_{LOW}$ $$T_L = T_{INIT} + K_R \cdot BFN(B_K - B_{HIGH})$$

for $B_K > B_{HIGH}$
where
  $T_K$=replenishment threshold for block K
  $T_{INIT}$=initial threshold (about 5 for 8-bit input data)
  $K_R$=multiplier constant (about 25-75)
  $B_{LOW}$=low cutoff (about 0.1 of buffer)
  $B_{HIGH}$=high cutoff (about 0.75 of buffer)

Thus, as the buffer unit 25 fullness increases, the quantizer unit 23 provides coarser quantization intervals for the encoding of the transform coefficients, which tends to reduce the number of bits per symbol generated by coder unit 22, and thus tends to reduce the buffer fullness. In addition, the block difference threshold $T_k$ is raised, which tends to reduce the number of blocks selected for replenishment transformation, which also tends to reduce the buffer fullness. Similarly, when the buffer fullness decreases, the distortion constant $D_k$ provides finer quantization intervals for processing the transform coefficients, which tends to increase the number of bits per symbol generated by coder unit 22; and the block difference threshold $T_k$ is lowered, tending to select more blocks for replenishment processing, both of which tend to increase the buffer fullness.

The manner in which the serially generated code symbols representing the block replenishment information are arranged for transmission from buffer unit 25 to a decoder site is shown in FIG. 8, which illustrates one entire frame of information. As seen in this FIG., a frame of information commences with a frame sync code signal indicating the beginning of the frame, followed by a first control code signal $B_K$ which specifies the state of buffer fullness at the beginning of the frame. This control code signal is followed by the second control code signal $D_k$, which is the actual value of the distortion constant at the beginning of the frame. Following this header information, which is used to reset the decoder shown in FIG. 2 at the beginning of each frame, are groups of block symbols containing the block replenishment information. After the last such group, a new frame sync code signal indicates the beginning of the succeeding frame of information.

Each group of block replenishment code symbols commences with the block address code, is followed by the two color quadrature component code symbols and continues with the coefficient code symbols, as indicated in FIG. 8. The arrangement of the coefficient codes indicated in FIG. 8 for the first block to be updated corresponds to the representative plot shown in FIG. 7.

The block replenishment symbols encoded in the manner described above are transmitted over a suitable communication link to the decoder system shown in FIG. 2, which provides inverse processing for the received information code symbols. Thus, after receipt of a frame sync code signal, the initial value of the distortion constant $D_k$ is coupled to an inverse quantizer unit 23' and the first block of replenishment information is initially decoded in decoder unit 22'. Decoder unit 22' contains the inverse code tables illustrated in appendix B which generate digital values from the received code symbols applied to the input thereof. The tables are arranged in a manner similar to that employed in coder unit 22, so that the block address codes, the color quadrature component codes and the DC coefficient code are all applied to their respective dedicated tables, while the cosine coefficient codes are applied on an individual basis to a selected one of six tables, depending on the value of the predictive mean calculated for each received quantized coefficient code. The emerging twelve-bit digital characters representing the quantized coefficients are inverse quantized in unit 23' by simply digitally multiplying each twelve-bit character with the value of $D_k$, and the resulting inversely quantized cosine coefficients are stored in diagonal memory unit 21', along with the corresponding block address digital character, the digital character representing the DC term and the quadrature chrominance characters. The coefficients are transformed to the time domain by subjecting the coefficients to a two-step inverse cosine transformation in unit 20', with the intermediate resulting values being stored back in diagonal memory unit 21'. After the inverse cosine transformation process has been completed, the resulting pixel samples are stored in output memory unit 13, replacing the former eight by eight block of pixel information. It should be noted that the field of information stored in output memory unit 13' comprises a replica of the field of information stored in reference memory unit 14 of the FIG. 1 encoder.

The replenished field information contained in output memory unit 13' is coupled to an output digital processor unit 12', and thence to analog processor unit 11' which converts the digital video data to analog form. The emerging analog video signals are coupled to a suitable utilization device, such as a raster scan monitor.

As binary bits are transferred from buffer unit 25' to decoder unit 22', a signal representing the number of bits transferred is coupled to distortion calculator unit 18', which updates the value of the distortion constant $D_k$ for each block of replenishment information. The distortion calculator 18' employs the same algorithm as that noted above for distortion calculator 18.

Further compression of the input video is obtained by two additional signal processing techniques. Firstly, the luminance portion of a field of input video is subsampled to provide 256 lines/frame and 256 samples/line (65,536 pixels/frame), as opposed to the normal standard of 512 lines/frame and 512 samples/line (262,144 pixels/frame). After decoding, the full luminance field is recovered in output digital processor 12' by interpolative processing of the actual luminance samples transmitted through the system. Deleted luminance samples are reconstructed by summing adjacent samples and dividing the result by two. Thus, if A and B are adjacent luminance samples in a line, the intermediate sample is reconstructed by forming the sum A/2+B/2, and inserting this result between sample A and sample B.

The quadrature chrominance components for each 8×8 block of input video are compressed by first discarding the 2 least significant bits of each 8-bit digital chrominance quadrature component sample to form 6-bit digital characters. For each 8×8 block, the separate quadrature component samples are averaged over the block by summing every other component sample in a given line, dividing the result by four, storing the result obtained for each line, summing the result for the eight lines in a block and dividing the result by eight. Specifically, for the I quadrature component for block K, the initial sample array is:

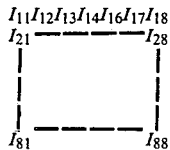

The first row average is:

$$I_{AV1} \pm (I_{11} + I_{13} + I_{15} + I_{17})/4$$

The last row average is:

$$I_{AV8} = (I_{81} + I_{83} + I_{85} + I_{87})/4$$

The block average is:

$$I_{AV\;BLOCK\;K} = (I_{AV1} + I_{AV2} + \ldots I_{AV8})/8$$

For the Q quadrature component, the first row average is:

$$Q_{AV1} = (Q_{12} + Q_{14} + Q_{16} + Q_{18})/4$$

The last row average is:

$$Q_{AV8} = (Q_{82} + Q_{84} + Q_{86} + Q_{88})/4$$

The block average is:

$$Q_{AV\;BLOCK\;K} = (A_{AV1} + Q_{AV2} + \ldots Q_{AV8})/8$$

The resulting block average for each component is stored as a 6-bit character in input memory 13. The full chrominance field is recovered in output digital processor 12' by inverse interpolative processing of the average chrominance samples transmitted through the system.

While suitable for many applications requiring information signal compression, the invention is especially adapted for use in a video teleconferencing system in which the prime criterion is bandwidth reduction with minimum degradation in the subjective quality of the video images. At a typical sampling rate of 10.7 MHz for digital video transmission using eight-bits per digital sample character, the required bit rate to reliably transmit video information without compression is $8.56 \times 10^7$ bits per second. By processing video signals according to the invention, using the same sample rate and the same size digital characters (i.e. eight-bits) in the analog to digital converter section of the encoder, and the digital to analog section of the decoder, compressed digital video can be transmitted from the encoder buffer unit 25 to the decoder buffer unit 25' at a rate of $2.39 \times 10^5$ bits per second, which is 0.25 percent of the standard uncompressed digital bit rate. As will be appreciated by those skilled in the art, such a substantial reduction in the bit rate enables video information of good picture quality to be transmitted over a communication link having a substantially narrower bandwidth, for example four conventional digital voice channels, with the result that substantially more information traffic can be routed over available communication links.

While the above provides a full and complete disclosure of the preferred embodiments of the invention, various modifications, alternate constructions and equivalents may be employed without departing from the true spirit and scope of the invention. For example, while eight by eight pixel blocks are employed in the preferred embodiment of the invention, blocks of other sizes may be employed, if desired. The relevant criteria for selecting appropriate block sizes are the processing time required by the block difference and decision unit 16, the cosine transform unit 20, the quantizer unit 23, the coder unit 22 and the distortion calculator 18. In general, larger blocks require more processing time, and the speed of currently available digital circuitry provides a practical limitation of about 32 pixels by 32 pixels on the maximum block size. In addition, for applications in which the amount of interframe image motion is excessive (i.e. greater than that normally present in video conferencing applications), a smaller block size may be necessary in order to provide decoded video signals of good subjective quality. Selection of smaller block sizes, however, increases the required minimum bit rate for the buffer units 25, 25'. In addition, different weighting factors may be employed for field merging, if desired; however, in the development of the preferred embodiment it has been discovered that a ratio of seven to one results in decoded video signals which are quite blurry, while a ratio approaching one to one results in a substantially increased number of blocks selected for replenishment, requiring a higher minimum bit rate for reliable transmission and decoding. The above description and illustrations, therefore, should not be construed as limiting the scope of the invention, which is defined by the appended claims.

APPENDIX A

```
**********************************************
         © 1982  Bell  &  Howell
         T A B L E      1
```

| Entry | Occurrences | Length | Huffman Code |
|---|---|---|---|
| 0 | 66718. | 1 | 0000 |
| 1 | 63441. | 2 | 0003 |
| 2 | 7747. | 3 | 0005 |
| 3 | 2258. | 4 | 0008 |
| 4 | 894. | 6 | 0027 |
| 5 | 446. | 6 | 0024 |
| 6 | 276. | 7 | 004B |
| 7 | 167. | 8 | 009A |
| 8 | 115. | 8 | 0095 |
| 9 | 94. | 9 | 0137 |
| 10 | 61. | 9 | 0131 |
| 11 | 55. | 9 | 0129 |
| 12 | 51. | 9 | 0128 |
| 13 | 38. | 10 | 0265 |
| 14 | 25. | 11 | 04DB |
| 15 | 14. | 11 | 04C2 |
| 16 | 23. | 11 | 04D9 |
| 17 | 19. | 11 | 04CC |
| 18 | 12. | 12 | 09B5 |
| 19 | 9. | 12 | 0993 |
| 20 | 18. | 11 | 04C8 |
| 21 | 10. | 12 | 09B1 |
| 22 | 3. | 13 | 130C |
| 23 | 5. | 13 | 1369 |
| 24 | 9. | 12 | 0992 |

| | | | |
|---|---|---|---|
| 25 | 10. | 12 | 09B0 |
| 26 | 4. | 13 | 130F |
| 27 | 7. | 12 | 09B3 |
| 28 | 6. | 12 | 09B2 |
| 29 | 5. | 13 | 1368 |
| 30 | 0. | 16 | 99FD |
| 31 | 6. | 12 | 0981 |
| 32 | 4. | 13 | 130E |
| 33 | 2. | 14 | 267E |
| 34 | 1. | 14 | 2603 |
| 35 | 0. | 16 | 99FC |
| 36 | 1. | 14 | 2602 |
| 37 | 4. | 13 | 130D |
| 38 | 1. | 14 | 2601 |
| 39 | 0. | 16 | 99F7 |
| 40 | 0. | 16 | 99F6 |
| 41 | 1. | 14 | 2600 |
| 42 | 0. | 16 | 99F5 |
| 43 | 0. | 16 | 99F4 |
| 44 | 0. | 16 | 99F3 |
| 45 | 0. | 16 | 99F2 |
| 46 | 0. | 16 | 99F1 |
| 47 | 0. | 16 | 99F0 |
| 48 | 1. | 15 | 4CFF |
| 49 | 0. | 16 | 99EF |
| 50 | 0. | 16 | 99EE |
| 51 | 0. | 16 | 99ED |
| 52 | 0. | 16 | 99EC |
| 53 | 0. | 16 | 99EB |
| 54 | 0. | 16 | 99EA |
| 55 | 0. | 16 | 99E9 |
| 56 | 0. | 16 | 99E8 |
| 57 | 0. | 16 | 99E7 |
| 58 | 0. | 16 | 99E6 |
| 59 | 0. | 16 | 99E5 |
| 60 | 0. | 16 | 99E4 |
| 61 | 0. | 16 | 99E3 |
| 62 | 0. | 16 | 99E2 |
| 63 | 0. | 16 | 99E1 |
| 64 | 0. | 16 | 99E0 |
| 65 | 0. | 16 | 99DF |
| 66 | 0. | 16 | 99DE |
| 67 | 0. | 16 | 99DD |
| 68 | 0. | 16 | 99DC |
| 69 | 0. | 16 | 99DB |
| 70 | 0. | 16 | 99DA |
| 71 | 0. | 16 | 99D9 |
| 72 | 0. | 16 | 99D8 |
| 73 | 0. | 16 | 99D7 |
| 74 | 0. | 16 | 99D6 |
| 75 | 0. | 16 | 99D5 |
| 76 | 0. | 16 | 99D4 |
| 77 | 0. | 16 | 99D3 |
| 78 | 0. | 16 | 99D2 |
| 79 | 0. | 16 | 99D1 |
| 80 | 0. | 16 | 99D0 |
| 81 | 0. | 16 | 99CF |
| 82 | 0. | 16 | 99CE |
| 83 | 0. | 16 | 99CD |
| 84 | 0. | 16 | 99CC |
| 85 | 0. | 16 | 99CB |
| 86 | 0. | 16 | 99CA |
| 87 | 0. | 16 | 99C9 |
| 88 | 0. | 16 | 99C8 |
| 89 | 0. | 16 | 99C7 |
| 90 | 0. | 16 | 99C6 |
| 91 | 0. | 16 | 99C5 |
| 92 | 0. | 16 | 99C4 |
| 93 | 0. | 16 | 99C3 |
| 94 | 0. | 16 | 99C2 |
| 95 | 0. | 16 | 99C1 |
| 96 | 0. | 16 | 99C0 |
| 97 | 0. | 16 | 99BF |
| 98 | 0. | 16 | 99BE |
| 99 | 0. | 16 | 99BD |
| 100 | 0. | 16 | 99BC |
| 101 | 0. | 16 | 99BB |
| 102 | 0. | 16 | 99BA |
| 103 | 0. | 16 | 99B9 |
| 104 | 0. | 16 | 99B8 |
| 105 | 0. | 16 | 99B7 |
| 106 | 0. | 16 | 99B6 |
| 107 | 0. | 16 | 99B5 |
| 108 | 0. | 16 | 99B4 |
| 109 | 0. | 16 | 99B3 |
| 110 | 0. | 16 | 99B2 |
| 111 | 0. | 16 | 99B1 |
| 112 | 0. | 16 | 99B0 |
| 113 | 0. | 16 | 99AF |
| 114 | 0. | 16 | 99AE |
| 115 | 0. | 16 | 99AD |
| 116 | 0. | 16 | 99AC |
| 117 | 0. | 16 | 99AB |
| 118 | 0. | 16 | 99AA |
| 119 | 0. | 16 | 99A9 |
| 120 | 0. | 16 | 99A8 |
| 121 | 0. | 16 | 99A7 |
| 122 | 0. | 16 | 99A6 |
| 123 | 0. | 16 | 99A5 |
| 124 | 0. | 16 | 99A4 |
| 125 | 0. | 16 | 99A3 |
| 126 | 0. | 16 | 99A2 |
| 127 | 0. | 16 | 99A1 |
| 128 | 0. | 16 | 99A0 |

Total Symbols = 142561.
Symbol Entropy = 1.507
Bits per Symbol = 1.706

```
************************************************
              © 1982 Bell & Howell
                   T A B L E    2
```

| Entry | Occurrences | Length | Huffman Code |
|---|---|---|---|
| 0 | 19459. | 1 | 0000 |
| 1 | 13767. | 2 | 0003 |
| 2 | 4937. | 3 | 0005 |
| 3 | 2096. | 4 | 0008 |
| 4 | 1016. | 6 | 0027 |
| 5 | 568. | 6 | 0025 |
| 6 | 352. | 7 | 004C |
| 7 | 214. | 7 | 004B |
| 8 | 136. | 8 | 0093 |
| 9 | 92. | 9 | 0136 |
| 10 | 52. | 10 | 026F |
| 11 | 42. | 10 | 026A |
| 12 | 29. | 10 | 0249 |
| 13 | 32. | 10 | 024A |
| 14 | 19. | 11 | 04D2 |
| 15 | 19. | 11 | 04D1 |
| 16 | 25. | 11 | 04DC |
| 17 | 9. | 12 | 09A0 |
| 18 | 13. | 11 | 0491 |
| 19 | 13. | 11 | 0490 |
| 20 | 6. | 13 | 1377 |
| 21 | 1. | 15 | 4DD7 |
| 22 | 4. | 13 | 125F |
| 23 | 2. | 14 | 26BC |
| 24 | 4. | 13 | 125E |
| 25 | 2. | 14 | 26BB |
| 26 | 3. | 13 | 125B |
| 27 | 0. | 15 | 4970 |
| 28 | 6. | 13 | 1376 |
| 29 | 3. | 13 | 125A |
| 30 | 4. | 13 | 125D |
| 31 | 3. | 13 | 1259 |
| 32 | 3. | 13 | 1258 |
| 33 | 1. | 15 | 4DD6 |
| 34 | 0. | 16 | 9AD7 |
| 35 | 1. | 15 | 4DD5 |
| 36 | 1. | 15 | 4DD4 |
| 37 | 0. | 16 | 9AD6 |
| 38 | 1. | 15 | 4DD3 |
| 39 | 0. | 16 | 9AD5 |
| 40 | 0. | 16 | 9AD4 |
| 41 | 0. | 16 | 9AD3 |
| 42 | 0. | 16 | 9AD2 |
| 43 | 1. | 15 | 4DD2 |
| 44 | 2. | 14 | 26BA |
| 45 | 1. | 15 | 4DD1 |
| 46 | 1. | 15 | 4DD0 |
| 47 | 1. | 15 | 4D7F |
| 48 | 2. | 14 | 26B9 |
| 49 | 1. | 15 | 4D7E |
| 50 | 1. | 15 | 4D7D |
| 51 | 2. | 14 | 26B8 |
| 52 | 0. | 16 | 9AD1 |
| 53 | 0. | 16 | 9AD0 |
| 54 | 0. | 16 | 9ACF |
| 55 | 0. | 16 | 9ACE |
| 56 | 0. | 16 | 9ACD |
| 57 | 1. | 15 | 4D7C |
| 58 | 0. | 16 | 9ACC |
| 59 | 0. | 16 | 9ACB |
| 60 | 0. | 16 | 9ACA |
| 61 | 0. | 16 | 9AC9 |
| 62 | 0. | 16 | 9AC8 |
| 63 | 1. | 15 | 4D7B |
| 64 | 0. | 16 | 9AC7 |
| 65 | 1. | 15 | 4D7A |
| 66 | 0. | 16 | 9AC6 |

| Entry | Occurrences | Length | Huffman Code |
|---|---|---|---|
| 67 | 0. | 16 | 9AC5 |
| 68 | 2. | 14 | 26B7 |
| 69 | 0. | 16 | 9AC4 |
| 70 | 0. | 16 | 9AC3 |
| 71 | 2. | 14 | 26B6 |
| 72 | 0. | 16 | 9AC2 |
| 73 | 0. | 16 | 9AC1 |
| 74 | 0. | 16 | 9AC0 |
| 75 | 0. | 16 | 9A7F |
| 76 | 0. | 16 | 9A7E |
| 77 | 0. | 16 | 9A7D |
| 78 | 0. | 16 | 9A7C |
| 79 | 0. | 16 | 9A7B |
| 80 | 0. | 16 | 9A7A |
| 81 | 0. | 16 | 9A79 |
| 82 | 0. | 16 | 9A78 |
| 83 | 0. | 16 | 9A77 |
| 84 | 0. | 16 | 9A76 |
| 85 | 0. | 16 | 9A75 |
| 86 | 0. | 16 | 9A74 |
| 87 | 0. | 16 | 9A73 |
| 88 | 0. | 16 | 9A72 |
| 89 | 0. | 16 | 9A71 |
| 90 | 0. | 16 | 9A70 |
| 91 | 0. | 16 | 9A6F |
| 92 | 0. | 16 | 9A6E |
| 93 | 0. | 16 | 9A6D |
| 94 | 0. | 16 | 9A6C |
| 95 | 0. | 16 | 9A6B |
| 96 | 0. | 16 | 9A6A |
| 97 | 0. | 16 | 9A69 |
| 98 | 0. | 16 | 9A68 |
| 99 | 0. | 16 | 9A67 |
| 100 | 0. | 16 | 9A66 |
| 101 | 0. | 16 | 9A65 |
| 102 | 0. | 16 | 9A64 |
| 103 | 0. | 16 | 9A63 |
| 104 | 0. | 16 | 9A62 |
| 105 | 0. | 16 | 9A61 |
| 106 | 0. | 16 | 9A60 |
| 107 | 0. | 16 | 9A1F |
| 108 | 0. | 16 | 9A1E |
| 109 | 0. | 16 | 9A1D |
| 110 | 0. | 16 | 9A1C |
| 111 | 0. | 16 | 9A1B |
| 112 | 0. | 16 | 9A1A |
| 113 | 0. | 16 | 9A19 |
| 114 | 0. | 16 | 9A18 |
| 115 | 0. | 16 | 9A17 |
| 116 | 0. | 16 | 9A16 |
| 117 | 0. | 16 | 9A15 |
| 118 | 0. | 16 | 9A14 |
| 119 | 0. | 16 | 9A13 |
| 120 | 0. | 16 | 9A12 |
| 121 | 0. | 16 | 9A11 |
| 122 | 0. | 16 | 9A10 |
| 123 | 0. | 16 | 92E7 |
| 124 | 0. | 16 | 92E6 |
| 125 | 0. | 16 | 92E5 |
| 126 | 0. | 16 | 92E4 |
| 127 | 0. | 16 | 92E3 |
| 128 | 0. | 16 | 92E2 |

Total Symbols = 42954.
Symbol Entropy = 2.048
Bits per Symbol = 2.074

*******************************************
© 1982 Bell & Howell
T A B L E 3

Entry * Occurrences * Length * Huffman Code ***

| Entry | Occurrences | Length | Huffman Code |
|---|---|---|---|
| 0 | 16170. | 2 | 0003 |
| 1 | 14815. | 2 | 0002 |
| 2 | 6726. | 3 | 0003 |
| 3 | 3891. | 3 | 0001 |
| 4 | 2383. | 4 | 0004 |
| 5 | 1615. | 4 | 0000 |
| 6 | 1161. | 5 | 0003 |
| 7 | 722. | 6 | 0016 |
| 8 | 545. | 6 | 0014 |
| 9 | 414. | 7 | 002F |
| 10 | 350. | 7 | 002B |
| 11 | 259. | 7 | 000B |
| 12 | 194. | 8 | 005D |
| 13 | 141. | 8 | 0054 |
| 14 | 115. | 8 | 0013 |
| 15 | 101. | 8 | 0011 |
| 16 | 62. | 9 | 002A |
| 17 | 72. | 9 | 00AA |
| 18 | 46. | 9 | 0020 |
| 19 | 56. | 9 | 0025 |
| 20 | 41. | 10 | 0170 |
| 21 | 29. | 10 | 0050 |
| 22 | 31. | 10 | 0053 |
| 23 | 20. | 11 | 02E2 |
| 24 | 33. | 10 | 0057 |
| 25 | 23. | 11 | 02E7 |
| 26 | 21. | 11 | 02E4 |
| 27 | 19. | 11 | 02AE |
| 28 | 15. | 11 | 00A5 |
| 29 | 21. | 11 | 02E3 |
| 30 | 13. | 11 | 0090 |
| 31 | 16. | 11 | 00AC |
| 32 | 14. | 11 | 0093 |
| 33 | 8. | 12 | 015B |
| 34 | 4. | 13 | 0AB3 |
| 35 | 7. | 12 | 014B |
| 36 | 7. | 12 | 0147 |
| 37 | 9. | 12 | 055A |
| 38 | 6. | 12 | 010F |
| 39 | 6. | 12 | 010E |
| 40 | 7. | 12 | 0146 |
| 41 | 5. | 13 | 0B96 |
| 42 | 5. | 13 | 0B95 |
| 43 | 8. | 12 | 015A |
| 44 | 4. | 13 | 0AB2 |
| 45 | 7. | 12 | 0145 |
| 46 | 4. | 13 | 0AB1 |
| 47 | 5. | 13 | 0B94 |
| 48 | 3. | 13 | 024B |
| 49 | 6. | 12 | 010D |
| 50 | 7. | 12 | 0144 |
| 51 | 4. | 13 | 0AB0 |
| 52 | 3. | 13 | 024A |
| 53 | 1. | 14 | 0423 |
| 54 | 6. | 12 | 010C |
| 55 | 0. | 16 | 1495 |
| 56 | 2. | 14 | 157D |
| 57 | 1. | 14 | 0422 |
| 58 | 3. | 13 | 0249 |
| 59 | 2. | 14 | 157C |
| 60 | 1. | 14 | 0421 |
| 61 | 3. | 13 | 0248 |
| 62 | 1. | 14 | 0420 |
| 63 | 3. | 13 | 0247 |
| 64 | 3. | 13 | 0246 |
| 65 | 2. | 14 | 157B |
| 66 | 2. | 14 | 157A |
| 67 | 3. | 13 | 0245 |
| 68 | 1. | 15 | 2E6F |
| 69 | 2. | 14 | 1579 |
| 70 | 1. | 15 | 2E6E |
| 71 | 1. | 15 | 2E6D |
| 72 | 2. | 14 | 1578 |
| 73 | 4. | 13 | 0293 |
| 74 | 5. | 13 | 0ABF |
| 75 | 1. | 15 | 2E6C |
| 76 | 3. | 13 | 0244 |
| 77 | 6. | 12 | 010B |
| 78 | 1. | 15 | 2E6B |
| 79 | 0. | 16 | 1494 |
| 80 | 1. | 15 | 2E6A |
| 81 | 1. | 15 | 2E69 |
| 82 | 1. | 15 | 2E68 |
| 83 | 1. | 15 | 2E67 |
| 84 | 1. | 15 | 2E66 |
| 85 | 0. | 16 | 1493 |
| 86 | 1. | 15 | 2E65 |
| 87 | 3. | 13 | 0215 |
| 88 | 0. | 16 | 1492 |
| 89 | 1. | 15 | 2E64 |
| 90 | 1. | 15 | 2E63 |
| 91 | 1. | 15. | 2E62 |
| 92 | 2. | 14 | 156F |
| 93 | 1. | 15 | 2E61 |
| 94 | 0. | 16 | 1491 |
| 95 | 2. | 14 | 156E |
| 96 | 1. | 15 | 2E60 |
| 97 | 0. | 16 | 1490 |
| 98 | 0. | 16 | 10A7 |
| 99 | 0. | 16 | 10A6 |
| 100 | 0. | 16 | 10A5 |
| 101 | 1. | 15 | 2E5F |
| 102 | 0. | 16 | 10A4 |
| 103 | 1. | 15 | 2E5E |
| 104 | 2. | 14 | 156D |
| 105 | 1. | 15 | 2E5D |
| 106 | 0. | 16 | 10A3 |
| 107 | 0. | 16 | 10A2 |
| 108 | 0. | 16 | 10A1 |
| 109 | 0. | 16 | 10A0 |

| Entry | Occurrences | Length | Huffman Code |
|---|---|---|---|
| 110 | 0. | 16 | 109F |
| 111 | 0. | 16 | 109E |
| 112 | 0. | 16 | 109D |
| 113 | 1. | 15 | 2E5C |
| 114 | 2. | 14 | 156C |
| 115 | 0. | 16 | 109C |
| 116 | 0. | 16 | 109B |
| 117 | 0. | 16 | 109A |
| 118 | 0. | 16 | 1099 |
| 119 | 0. | 16 | 1098 |
| 120 | 0. | 16 | 1097 |
| 121 | 0. | 16 | 1096 |
| 122 | 0. | 16 | 1095 |
| 123 | 0. | 16 | 1094 |
| 124 | 0. | 16 | 1093 |
| 125 | 1. | 15 | 0A4B |
| 126 | 0. | 16 | 1092 |
| 127 | 0. | 16 | 1091 |
| 128 | 0. | 16 | 1090 |

Total Symbols = 50336.
Symbol Entropy = 2.774
Bits Per Symbol = 2.834

***********************************************
© 1982 Bell & Howell
TABLE 4

| Entry | Occurrences | Length | Huffman Code |
|---|---|---|---|
| 0 | 5652. | 3 | 0007 |
| 1 | 6448. | 2 | 0001 |
| 2 | 3916. | 3 | 0005 |
| 3 | 2656. | 3 | 0000 |
| 4 | 2019. | 4 | 0009 |
| 5 | 1581. | 4 | 0003 |
| 6 | 1229. | 5 | 001A |
| 7 | 979. | 5 | 0018 |
| 8 | 811. | 5 | 0005 |
| 9 | 618. | 6 | 0036 |
| 10 | 518. | 6 | 0032 |
| 11 | 417. | 6 | 0021 |
| 12 | 404. | 6 | 0020 |
| 13 | 321. | 7 | 006E |
| 14 | 256. | 7 | 0047 |
| 15 | 211. | 7 | 0044 |
| 16 | 181. | 7 | 0011 |
| 17 | 177. | 8 | 00DF |
| 18 | 156. | 8 | 00CF |
| 19 | 140. | 8 | 00CD |
| 20 | 103. | 8 | 0027 |
| 21 | 93. | 8 | 0024 |
| 22 | 98. | 8 | 0026 |
| 23 | 88. | 8 | 0020 |
| 24 | 71. | 9 | 019C |
| 25 | 68. | 9 | 0198 |
| 26 | 63. | 9 | 0119 |
| 27 | 59. | 9 | 0117 |
| 28 | 50. | 9 | 004B |
| 29 | 44. | 9 | 0042 |
| 30 | 39. | 10 | 0379 |
| 31 | 35. | 10 | 033A |
| 32 | 32. | 10 | 0235 |
| 33 | 31. | 10 | 0234 |
| 34 | 33. | 10 | 0236 |
| 35 | 27. | 10 | 022A |
| 36 | 24. | 10 | 0095 |
| 37 | 22. | 10 | 0086 |
| 38 | 28. | 10 | 022D |
| 39 | 21. | 11 | 06F6 |
| 40 | 23. | 10 | 0094 |
| 41 | 19. | 11 | 06F0 |
| 42 | 17. | 11 | 0666 |
| 43 | 17. | 11 | 0665 |
| 44 | 9. | 12 | 0CED |
| 45 | 17. | 11 | 0664 |
| 46 | 15. | 11 | 0462 |
| 47 | 10. | 12 | 0DEA |
| 48 | 8. | 12 | 0BDE |
| 49 | 12. | 11 | 0451 |
| 50 | 16. | 11 | 046E |
| 51 | 10. | 12 | 0DE9 |
| 52 | 10. | 12 | 0DE8 |
| 53 | 11. | 11 | 010E |
| 54 | 12. | 11 | 0450 |
| 55 | 7. | 12 | 08C6 |
| 56 | 10. | 12 | 0DE3 |
| 57 | 6. | 12 | 08A6 |
| 58 | 2. | 14 | 378B |
| 59 | 5. | 13 | 1BDC |
| 60 | 4. | 13 | 199F |
| 61 | 7. | 12 | 08C3 |
| 62 | 3. | 13 | 115B |
| 63 | 4. | 13 | 199E |
| 64 | 7. | 12 | 08C2 |
| 65 | 4. | 13 | 199D |
| 66 | 7. | 12 | 08C1 |
| 67 | 5. | 13 | 1BD7 |
| 68 | 2. | 14 | 378A |
| 69 | 3. | 13 | 115A |
| 70 | 7. | 12 | 08C0 |
| 71 | 8. | 12 | 08C7 |
| 72 | 4. | 13 | 199C |
| 73 | 3. | 13 | 1159 |
| 74 | 7. | 12 | 08AF |
| 75 | 5. | 13 | 1BD6 |
| 76 | 6. | 12 | 08A5 |
| 77 | 2. | 14 | 3789 |
| 78 | 2. | 14 | 3788 |
| 79 | 1. | 14 | 087A |
| 80 | 3. | 13 | 1158 |
| 81 | 6. | 12 | 08A4 |
| 82 | 2. | 14 | 33BF |
| 83 | 7. | 12 | 08AE |
| 84 | 2. | 14 | 33BE |
| 85 | 2. | 14 | 33BD |
| 86 | 4. | 13 | 11BF |
| 87 | 2. | 14 | 33BC |
| 88 | 3. | 13 | 114F |
| 89 | 2. | 14 | 33BB |
| 90 | 0. | 16 | CEC1 |
| 91 | 2. | 14 | 33BA |
| 92 | 3. | 13 | 114E |
| 93 | 3. | 13 | 043F |
| 94 | 2. | 14 | 33B9 |
| 95 | 1. | 14 | 0879 |
| 96 | 1. | 14 | 0878 |
| 97 | 1. | 15 | 6F7F |
| 98 | 0. | 16 | CEC0 |
| 99 | 0. | 16 | 21F7 |
| 100 | 1. | 15 | 6F7E |
| 101 | 1. | 15 | 6F7D |
| 102 | 2. | 14 | 33B8 |
| 103 | 0. | 16 | 21F6 |
| 104 | 2. | 14 | 33B3 |
| 105 | 1. | 15 | 6F7C |
| 106 | 4. | 13 | 11BE |
| 107 | 1. | 15 | 6F7B |
| 108 | 0. | 16 | 21F5 |
| 109 | 0. | 16 | 21F4 |
| 110 | 0. | 16 | 21F3 |
| 111 | 1. | 15 | 6F7A |
| 112 | 0. | 16 | 21F2 |
| 113 | 0. | 16 | 21F1 |
| 114 | 2. | 14 | 33B2 |
| 115 | 1. | 15 | 6F79 |
| 116 | 1. | 15 | 6F78 |
| 117 | 0. | 16 | 21F0 |
| 118 | 0. | 16 | 21EF |
| 119 | 0. | 16 | 21EE |
| 120 | 1. | 15 | 6F77 |
| 121 | 0. | 16 | 21ED |
| 122 | 0. | 16 | 21EC |
| 123 | 2. | 14 | 33B1 |
| 124 | 1. | 15 | 6F76 |
| 125 | 1. | 15 | 6F75 |
| 126 | 1. | 15 | 6F74 |
| 127 | 1. | 15 | 6761 |
| 128 | 28. | 10 | 022C |

* Total Symbols = 30144.
* Symbol Entropy = 3.793
* Bits Per Symbol = 3.835

***********************************************
© 1982 Bell & Howell
TABLE 5

| Entry | Occurrences | Length | Huffman Code |
|---|---|---|---|
| 0 | 1660. | 3 | 0004 |
| 1 | 1804. | 3 | 0005 |
| 2 | 1425. | 3 | 0002 |
| 3 | 978. | 4 | 000D |
| 4 | 822. | 4 | 0007 |
| 5 | 637. | 4 | 0002 |
| 6 | 595. | 4 | 0000 |
| 7 | 522. | 5 | 001E |
| 8 | 411. | 5 | 0018 |
| 9 | 393. | 5 | 000C |

| | | | | | | | | |
|---|---|---|---|---|---|---|---|---|
| 10 | 372. | 5 | 0007 | | 05 | 1. | 14 | 3FFF |
| 11 | 308. | 5 | 0002 | | 06 | 1. | 14 | 3FFE |
| 12 | 270. | 6 | 003E | | 07 | 2. | 13 | 1FD3 |
| 13 | 248. | 6 | 003A | | 08 | 4. | 12 | 0EDC |
| 14 | 234. | 6 | 0033 | | 09 | 2. | 13 | 1FD2 |
| 15 | 236. | 6 | 0038 | 5 | 10 | 1. | 14 | 3FFD |
| 16 | 161. | 6 | 000C | | 11 | 0. | 16 | C85A |
| 17 | 143. | 7 | 007E | | 12 | 3. | 12 | 06BF |
| 18 | 123. | 7 | 0073 | | 13 | 1. | 14 | 3FFC |
| 19 | 131. | 7 | 0077 | | 14 | 1. | 14 | 3FFB |
| 20 | 94. | 7 | 001B | | 15 | 1. | 14 | 3FFA |
| 21 | 102. | 7 | 0036 | | 16 | 1. | 14 | 3FF9 |
| 22 | 96. | 7 | 0034 | 10 | 17 | 0. | 16 | C859 |
| 23 | 76. | 7 | 000D | | 18 | 3. | 12 | 06BE |
| 24 | 61. | 8 | 00E5 | | 19 | 0. | 16 | C858 |
| 25 | 76. | 7 | 000C | | 20 | 1. | 14 | 3FF8 |
| 26 | 53. | 8 | 006F | | 21 | 0. | 16 | C857 |
| 27 | 56. | 8 | 00CA | | 22 | 1. | 14 | 3FE7 |
| 28 | 57. | 8 | 00CB | | 23 | 0. | 16 | C856 |
| 29 | 40. | 8 | 001E | 15 | 24 | 0. | 16 | C855 |
| 30 | 31. | 9 | 01DA | | 25 | 1. | 14 | 3FE6 |
| 31 | 43. | 8 | 0034 | | 26 | 3. | 12 | 0353 |
| 32 | 28. | 9 | 0193 | | 27 | 0. | 16 | C854 |
| 33 | 31. | 9 | 01D9 | | 28 | 31. | 9 | 01D8 |
| 34 | 39. | 8 | 001C | | | | | |
| 35 | 25. | 9 | 00DC | | | | | |
| 36 | 37. | 9 | 01FE | 20 | Total Symbols = 12959. | | | |
| 37 | 27. | 9 | 0192 | | Symbol Entropy = 4.557 | | | |
| 38 | 19. | 9 | 003A | | Bits Per Symbol = 4.578 | | | |
| 39 | 17. | 10 | 03F9 | | | | | |
| 40 | 29. | 9 | 01C8 | | | | | |
| 41 | 23. | 9 | 00D4 | | | | | |
| 42 | 11. | 10 | 00D7 | 25 | ************************************************ | | | |
| 43 | 20. | 9 | 003B | | © 1982 Bell & Howell | | | |
| 44 | 16. | 10 | 03B6 | | T A B L E 6 | | | |
| 45 | 13. | 10 | 0320 | | Entry * Occurrences * Length * Huffman Code *** | | | |
| 46 | 18. | 10 | 03FB | | | | | |
| 47 | 27. | 9 | 0191 | | 0 | 496. | 3 | 0005 |
| 48 | 16. | 10 | 0393 | 30 | 1 | 366. | 3 | 0001 |
| 49 | 6. | 11 | 035E | | 2 | 294. | 4 | 000E |
| 50 | 12. | 10 | 01AC | | 3 | 232. | 4 | 0008 |
| 51 | 11. | 10 | 00D6 | | 4 | 213. | 4 | 0005 |
| 52 | 11. | 10 | 00D5 | | 5 | 157. | 5 | 001F |
| 53 | 5. | 11 | 01A8 | | 6 | 142. | 5 | 001B |
| 54 | 12. | 10 | 01AB | 35 | 7 | 134. | 5 | 0019 |
| 55 | 9. | 11 | 07FE | | 8 | 118. | 5 | 0012 |
| 56 | 6. | 11 | 035D | | 9 | 104. | 5 | 0009 |
| 57 | 9. | 11 | 07FD | | 10 | 88. | 5 | 0001 |
| 58 | 12. | 10 | 01AA | | 11 | 96. | 5 | 0003 |
| 59 | 4. | 12 | 0FE8 | | 12 | 67. | 6 | 0031 |
| 60 | 6. | 11 | 035C | | 13 | 71. | 6 | 0035 |
| 61 | 5. | 11 | 00FF | | 14 | 54. | 6 | 001A |
| 62 | 7. | 11 | 0725 | | 15 | 57. | 6 | 001E |
| 63 | 17. | 10 | 03F8 | | 16 | 60. | 6 | 001F |
| 64 | 7. | 11 | 0724 | 40 | 17 | 55. | 6 | 001C |
| 65 | 10. | 10 | 007D | | 18 | 66. | 6 | 0027 |
| 66 | 5. | 11 | 00FE | | 19 | 45. | 6 | 0004 |
| 67 | 4. | 12 | 0EDF | | 20 | 44. | 6 | 0001 |
| 68 | 5. | 11 | 00FD | | 21 | 54. | 6 | 0019 |
| 69 | 5. | 11 | 00FC | 45 | 22 | 39. | 7 | 007A |
| 70 | 1. | 13 | 06A5 | | 23 | 27. | 7 | 0037 |
| 71 | 2. | 13 | 1FF2 | | 24 | 35. | 7 | 0068 |
| 72 | 3. | 12 | 0C84 | | 25 | 31. | 7 | 004D |
| 73 | 4. | 12 | 0EDE | | 26 | 27. | 7 | 0036 |
| 74 | 6. | 11 | 035B | | 27 | 36. | 7 | 0078 |
| 75 | 3. | 12 | 06EF | 50 | 28 | 26. | 7 | 0023 |
| 76 | 7. | 11 | 0643 | | 29 | 25. | 7 | 0022 |
| 77 | 3. | 12 | 06EE | | 30 | 21. | 8 | 00F7 |
| 78 | 4. | 12 | 0EDD | | 31 | 24. | 7 | 000B |
| 79 | 5. | 11 | 00F9 | | 32 | 28. | 7 | 003B |
| 80 | 3. | 12 | 06ED | | 33 | 22. | 7 | 0001 |
| 81 | 0. | 15 | 6429 | | 34 | 25. | 7 | 0021 |
| 82 | 1. | 13 | 06A4 | | 35 | 19. | 8 | 00F3 |
| 83 | 3. | 12 | 06EC | 55 | 36 | 16. | 8 | 00C0 |
| 84 | 6. | 11 | 035A | | 37 | 13. | 8 | 0063 |
| 85 | 3. | 12 | 06EB | | 38 | 14. | 8 | 0098 |
| 86 | 3. | 12 | 06EA | | 39 | 13. | 8 | 0062 |
| 87 | 2. | 13 | 1FF1 | | 40 | 14. | 8 | 0075 |
| 88 | 3. | 12 | 06E9 | | 41 | 13. | 8 | 0061 |
| 89 | 1. | 13 | 03E3 | | 42 | 11. | 8 | 0015 |
| 90 | 1. | 13 | 03E2 | 60 | 43 | 13. | 8 | 0060 |
| 91 | 0. | 15 | 6428 | | 44 | 9. | 9 | 01E4 |
| 92 | 0. | 16 | C85F | | 45 | 11. | 8 | 0014 |
| 93 | 2. | 13 | 1FF0 | | 46 | 10. | 9 | 01ED |
| 94 | 2. | 13 | 1FD7 | | 47 | 10. | 9 | 01EC |
| 95 | 0. | 16 | C85E | | 48 | 8. | 9 | 0133 |
| 96 | 1. | 13 | 03E1 | 65 | 49 | 11. | 8 | 0001 |
| 97 | 0. | 16 | C85D | | 50 | 6. | 9 | 0083 |
| 98 | 1. | 13 | 03E0 | | 51 | 9. | 9 | 01A7 |
| 99 | 2. | 13 | 1FD6 | | 52 | 5. | 9 | 0000 |
| 00 | 2. | 13 | 1FD5 | | 53 | 5. | 10 | 03CB |
| 01 | 2. | 13 | 1FD4 | | 54 | 4. | 10 | 0309 |
| 02 | 3. | 12 | 06E8 | | | | | |
| 03 | 0. | 16 | C85C | | | | | |
| 04 | 0. | 16 | C85B | | | | | |

| Entry | Occurrences | Length | Huffman Code |
|---|---|---|---|
| 55 | 4. | 10 | 0308 |
| 56 | 4. | 10 | 0307 |
| 57 | 4. | 10 | 0306 |
| 58 | 2. | 11 | 0695 |
| 59 | 1. | 11 | 0005 |
| 60 | 4. | 10 | 0305 |
| 61 | 7. | 9 | 00E9 |
| 62 | 3. | 10 | 01D1 |
| 63 | 4. | 10 | 0304 |
| 64 | 4. | 10 | 0265 |
| 65 | 2. | 11 | 0694 |
| 66 | 2. | 11 | 0693 |
| 67 | 2. | 11 | 0692 |
| 68 | 2. | 11 | 0691 |
| 69 | 2. | 11 | 0690 |
| 70 | 6. | 9 | 0082 |
| 71 | 0. | 14 | 2645 |
| 72 | 2. | 11 | 061F |
| 73 | 1. | 11 | 0004 |
| 74 | 2. | 11 | 061E |
| 75 | 2. | 11 | 061D |
| 76 | 2. | 11 | 061C |
| 77 | 1. | 12 | 0F2B |
| 78 | 2. | 11 | 061B |
| 79 | 3. | 10 | 01D0 |
| 80 | 0. | 14 | 2644 |
| 81 | 0. | 14 | 2643 |
| 82 | 2. | 11 | 061A |
| 83 | 0. | 14 | 2642 |
| 84 | 0. | 14 | 2641 |
| 85 | 1. | 12 | 0F2A |
| 86 | 0. | 14 | 2640 |
| 87 | 0. | 15 | 4C9F |
| 88 | 1. | 12 | 0F29 |
| 89 | 1. | 12 | 0F28 |
| 90 | 2. | 11 | 0619 |
| 91 | 0. | 15 | 4C9E |
| 92 | 2. | 11 | 0618 |
| 93 | 1. | 12 | 0D37 |
| 94 | 0. | 15 | 4C9D |
| 95 | 2. | 11 | 0617 |
| 96 | 3. | 10 | 0003 |
| 97 | 1. | 12 | 0D36 |
| 98 | 1. | 12 | 0D35 |
| 99 | 1. | 12 | 0D34 |
| 100 | 1. | 12 | 0D33 |
| 101 | 0. | 15 | 4C9C |
| 102 | 0. | 15 | 4C9B |
| 103 | 0. | 15 | 4C9A |
| 104 | 0. | 15 | 4C99 |
| 105 | 1. | 12 | 0D32 |
| 106 | 0. | 15 | 4C98 |
| 107 | 0. | 15 | 4C97 |
| 108 | 0. | 15 | 4C96 |
| 109 | 0. | 15 | 4C95 |
| 110 | 1. | 12 | 0D31 |
| 111 | 1. | 12 | 0D30 |
| 112 | 0. | 15 | 4C94 |
| 113 | 2. | 11 | 0616 |
| 114 | 0. | 15 | 4C93 |
| 115 | 0. | 15 | 4C92 |
| 116 | 1. | 12 | 0D2F |
| 117 | 1. | 12 | 0D2E |
| 118 | 0. | 15 | 4C91 |
| 119 | 1. | 12 | 0D2D |
| 120 | 0. | 15 | 4C90 |
| 121 | 0. | 15 | 4C8F |
| 122 | 1. | 12 | 0D2C |
| 123 | 0. | 15 | 4C8E |
| 124 | 0. | 15 | 4C8D |
| 125 | 2. | 11 | 0615 |
| 126 | 0. | 15 | 4C8C |
| 127 | 2. | 11 | 0614 |
| 128 | 12. | 8 | 0040 |

Total Symbols = 3705.  
Symbol Entropy = 5.023  
Bits Per Symbol = 5.047

*******************************************
© 1982 Bell & Howell  
TABLE 7

| Entry | Occurrences | Length | Huffman Code |
|---|---|---|---|
| 0 | 1134. | 4 | 000D |
| 1 | 476. | 5 | 0011 |
| 2 | 463. | 5 | 000F |
| 3 | 482. | 5 | 0012 |
| 4 | 607. | 5 | 001C |
| 5 | 632. | 5 | 001F |
| 6 | 611. | 5 | 001D |
| 7 | 546. | 5 | 0018 |
| 8 | 489. | 5 | 0014 |
| 9 | 500. | 5 | 0015 |
| 10 | 503. | 5 | 0016 |
| 11 | 423. | 5 | 000C |
| 12 | 317. | 6 | 003D |
| 13 | 353. | 5 | 0005 |
| 14 | 344. | 5 | 0004 |
| 15 | 381. | 5 | 0007 |
| 16 | 241. | 6 | 0026 |
| 17 | 197. | 6 | 0012 |
| 18 | 266. | 6 | 002F |
| 19 | 233. | 6 | 0021 |
| 20 | 220. | 6 | 001C |
| 21 | 170. | 6 | 0007 |
| 22 | 149. | 7 | 0067 |
| 23 | 213. | 6 | 001A |
| 24 | 243. | 6 | 0027 |
| 25 | 206. | 6 | 0015 |
| 26 | 216. | 6 | 001B |
| 27 | 162. | 6 | 0002 |
| 28 | 230. | 6 | 0020 |
| 29 | 200. | 6 | 0013 |
| 30 | 193. | 6 | 0011 |
| 31 | 181. | 6 | 000C |
| 32 | 160. | 6 | 0001 |
| 33 | 278. | 6 | 0032 |
| 34 | 209. | 6 | 0016 |
| 35 | 191. | 6 | 0010 |
| 36 | 154. | 7 | 007B |
| 37 | 168. | 6 | 0005 |
| 38 | 109. | 7 | 003A |
| 39 | 170. | 6 | 0006 |
| 40 | 159. | 6 | 0000 |
| 41 | 101. | 7 | 0029 |
| 42 | 100. | 7 | 0028 |
| 43 | 105. | 7 | 002E |
| 44 | 77. | 8 | 00F2 |
| 45 | 56. | 8 | 0076 |
| 46 | 62. | 8 | 0077 |
| 47 | 79. | 8 | 00F3 |
| 48 | 81. | 7 | 000B |
| 49 | 94. | 7 | 001B |
| 50 | 89. | 7 | 001A |
| 51 | 125. | 7 | 005C |
| 52 | 165. | 6 | 0003 |
| 53 | 149. | 7 | 0066 |
| 54 | 55. | 8 | 005F |
| 55 | 22. | 9 | 0026 |
| 56 | 21. | 9 | 0025 |
| 57 | 28. | 9 | 0174 |
| 58 | 23. | 9 | 0027 |
| 59 | 17. | 10 | 02EB |
| 60 | 17. | 10 | 02EA |
| 61 | 13. | 10 | 017A |
| 62 | 13. | 10 | 0179 |
| 63 | 14. | 10 | 017B |
| 64 | 1. | 13 | 0BC4 |
| 65 | 0. | 15 | 2F14 |
| 66 | 1. | 13 | 0BC3 |
| 67 | 0. | 15 | 091B |
| 68 | 0. | 15 | 091A |
| 69 | 1. | 13 | 0BC2 |
| 70 | 0. | 15 | 0919 |
| 71 | 0. | 15 | 0918 |
| 72 | 1. | 13 | 0BC1 |
| 73 | 0. | 15 | 0917 |
| 74 | 0. | 15 | 0916 |
| 75 | 0. | 15 | 0915 |
| 76 | 1. | 13 | 0BC0 |
| 77 | 1. | 13 | 024F |
| 78 | 0. | 15 | 0914 |
| 79 | 0. | 15 | 0913 |
| 80 | 1. | 13 | 024E |
| 81 | 0. | 15 | 0912 |
| 82 | 0. | 15 | 0911 |
| 83 | 0. | 15 | 0910 |
| 84 | 0. | 15 | 090F |
| 85 | 0. | 15 | 090E |
| 86 | 2. | 12 | 0124 |
| 87 | 0. | 15 | 090D |
| 88 | 1. | 13 | 024D |
| 89 | 0. | 15 | 090C |
| 90 | 1. | 13 | 024C |
| 91 | 0. | 15 | 090B |
| 92 | 0. | 15 | 090A |
| 93 | 0. | 15 | 0909 |
| 94 | 0. | 15 | 0908 |
| 95 | 0. | 15 | 0907 |
| 96 | 1. | 13 | 024B |
| 97 | 0. | 15 | 0906 |
| 98 | 0. | 15 | 0905 |
| 99 | 0. | 15 | 0904 |

| Entry | Occurrences | Length | Huffman Code |
|---|---|---|---|
| 100 | 0. | 15 | 0903 |
| 101 | 1. | 13 | 024A |
| 102 | 0. | 15 | 0902 |
| 103 | 0. | 15 | 0901 |
| 104 | 0. | 15 | 0900 |
| 105 | 1. | 13 | 0247 |
| 106 | 0. | 16 | 5E3F |
| 107 | 0. | 16 | 5E3E |
| 108 | 0. | 16 | 5E3D |
| 109 | 0. | 16 | 5E3C |
| 110 | 0. | 16 | 5E3B |
| 111 | 0. | 16 | 5E3A |
| 112 | 0. | 16 | 5E39 |
| 113 | 0. | 16 | 5E38 |
| 114 | 0. | 16 | 5E37 |
| 115 | 0. | 16 | 5E36 |
| 116 | 0. | 16 | 5E35 |
| 117 | 0. | 16 | 5E34 |
| 118 | 0. | 16 | 5E33 |
| 119 | 0. | 16 | 5E32 |
| 120 | 0. | 16 | 5E31 |
| 121 | 0. | 16 | 5E30 |
| 122 | 0. | 16 | 5E2F |
| 123 | 0. | 16 | 5E2E |
| 124 | 0. | 16 | 5E2D |
| 125 | 0. | 16 | 5E2C |
| 126 | 0. | 16 | 5E2B |
| 127 | 0. | 16 | 5E2A |
| 128 | 69. | 8 | 00BB |

* Total Symbols = 14768.
* Symbol Entropy = 5.538
* Bits Per Symbol = 5.570

© 1982 Bell & Howell

TABLE 8

| Entry | Occurrences | Length | Huffman Code |
|---|---|---|---|
| 0 | 12208. | 2 | 0001 |
| 1 | 6198. | 3 | 0004 |
| 2 | 3850. | 4 | 000B |
| 3 | 2618. | 4 | 0002 |
| 4 | 2085. | 4 | 0000 |
| 5 | 1716. | 5 | 0014 |
| 6 | 1378. | 5 | 0003 |
| 7 | 1069. | 6 | 002B |
| 8 | 950. | 6 | 002A |
| 9 | 815. | 6 | 000E |
| 10 | 767. | 6 | 000D |
| 11 | 621. | 6 | 0005 |
| 12 | 471. | 7 | 001F |
| 13 | 401. | 7 | 0019 |
| 14 | 349. | 7 | 0018 |
| 15 | 151. | 8 | 0012 |
| 16 | 98. | 9 | 0078 |
| 17 | 63. | 9 | 0023 |
| 18 | 57. | 9 | 0020 |
| 19 | 44. | 10 | 004F |
| 20 | 58. | 9 | 0022 |
| 21 | 52. | 10 | 00F3 |
| 22 | 58. | 9 | 0021 |
| 23 | 55. | 10 | 00F7 |
| 24 | 53. | 10 | 00F5 |
| 25 | 55. | 10 | 00F6 |
| 26 | 52. | 10 | 00F2 |
| 27 | 34. | 10 | 004C |
| 28 | 14. | 12 | 03D2 |
| 29 | 6. | 13 | 07A3 |
| 30 | 10. | 12 | 03D0 |
| 31 | 3. | 13 | 0268 |
| 32 | 4. | 13 | 026A |
| 33 | 2. | 14 | 04EB |
| 34 | 7. | 13 | 07A7 |
| 35 | 10. | 12 | 013B |
| 36 | 2. | 14 | 04EA |
| 37 | 3. | 14 | 0F4D |
| 38 | 3. | 14 | 0F4C |
| 39 | 1. | 14 | 04D2 |
| 40 | 0. | 16 | 13A7 |
| 41 | 1. | 15 | 1E8B |
| 42 | 1. | 15 | 1E8A |
| 43 | 1. | 15 | 1E89 |
| 44 | 0. | 16 | 13A6 |
| 45 | 0. | 16 | 13A5 |
| 46 | 0. | 16 | 13A4 |
| 47 | 1. | 15 | 1E88 |
| 48 | 0. | 16 | 13A3 |
| 49 | 0. | 16 | 13A2 |
| 50 | 0. | 16 | 13A1 |
| 51 | 0. | 16 | 13A0 |
| 52 | 0. | 16 | 139F |
| 53 | 0. | 16 | 139E |
| 54 | 0. | 16 | 139D |
| 55 | 0. | 16 | 139C |
| 56 | 0. | 16 | 139B |
| 57 | 0. | 16 | 139A |
| 58 | 0. | 16 | 1399 |
| 59 | 0. | 16 | 1398 |
| 60 | 0. | 16 | 1397 |
| 61 | 0. | 16 | 1396 |
| 62 | 0. | 16 | 1395 |
| 63 | 0. | 16 | 1394 |
| 64 | 0. | 16 | 1393 |
| 65 | 0. | 16 | 1392 |
| 66 | 0. | 16 | 1391 |
| 67 | 0. | 16 | 1390 |
| 68 | 0. | 16 | 138F |
| 69 | 0. | 16 | 138E |
| 70 | 0. | 16 | 138D |
| 71 | 0. | 16 | 138C |
| 72 | 0. | 16 | 138B |
| 73 | 0. | 16 | 138A |
| 74 | 0. | 16 | 1389 |
| 75 | 0. | 16 | 1388 |
| 76 | 0. | 16 | 1387 |
| 77 | 0. | 16 | 1386 |
| 78 | 0. | 16 | 1385 |
| 79 | 0. | 16 | 1384 |
| 80 | 0. | 16 | 1383 |
| 81 | 0. | 16 | 1382 |
| 82 | 0. | 16 | 1381 |
| 83 | 0. | 16 | 1380 |
| 84 | 0. | 16 | 137F |
| 85 | 0. | 16 | 137E |
| 86 | 0. | 16 | 137D |
| 87 | 0. | 16 | 137C |
| 88 | 0. | 16 | 137B |
| 89 | 0. | 16 | 137A |
| 90 | 0. | 16 | 1379 |
| 91 | 0. | 16 | 1378 |
| 92 | 0. | 16 | 1377 |
| 93 | 0. | 16 | 1376 |
| 94 | 0. | 16 | 1375 |
| 95 | 0. | 16 | 1374 |
| 96 | 0. | 16 | 1373 |
| 97 | 0. | 16 | 1372 |
| 98 | 0. | 16 | 1371 |
| 99 | 0. | 16 | 1370 |
| 100 | 0. | 16 | 136F |
| 101 | 0. | 16 | 136E |
| 102 | 0. | 16 | 136D |
| 103 | 0. | 16 | 136C |
| 104 | 0. | 16 | 136B |
| 105 | 0. | 16 | 136A |
| 106 | 0. | 16 | 1369 |
| 107 | 0. | 16 | 1368 |
| 108 | 0. | 16 | 1367 |
| 109 | 0. | 16 | 1366 |
| 110 | 0. | 16 | 1365 |
| 111 | 0. | 16 | 1364 |
| 112 | 0. | 16 | 1363 |
| 113 | 0. | 16 | 1362 |
| 114 | 0. | 16 | 1361 |
| 115 | 0. | 16 | 1360 |
| 116 | 0. | 16 | 135F |
| 117 | 0. | 16 | 135E |
| 118 | 0. | 16 | 135D |
| 119 | 0. | 16 | 135C |
| 120 | 0. | 16 | 135B |
| 121 | 0. | 16 | 135A |
| 122 | 0. | 16 | 1359 |
| 123 | 0. | 16 | 1358 |
| 124 | 0. | 16 | 134F |
| 125 | 0. | 16 | 134E |
| 126 | 0. | 16 | 134D |
| 127 | 0. | 16 | 134C |
| 128 | 14080. | 2 | 0003 |

Total Symbols = 50475.
Symbol Entropy = 3.216
Bits Per Symbol = 3.235

APPENDIX B

```
*************************************************************
              © 1982 Bell & Howell
                T A B L E   1

Entry * Father * Bit * Value or Sons * ROM Data: EOB,Z,E,T,D6-D0 ***

0     none      0            0              2  B  0
     1     none      1       0000001x            0  0  1
     2       1       0       0000010x            0  0  2
     3       1       1            1              0  8  1
     4       2       0       0000011x            0  0  3
     5       2       1            2              0  8  2
     6       4       0            3              0  8  3
     7       4       1       0000100x            0  0  4
     8       7       0       0000110x            0  0  6
     9       7       1       0000101x            0  0  5
    10       9       0       0001000x            0  0  8
    11       9       1            4              0  8  4
    12       8       0            5              0  8  5
    13       8       1       0000111x            0  0  7
    14      13       0       0001010x            0  0  A
    15      13       1            6              0  8  6
    16      10       0       0001100x            0  0  C
    17      10       1       0001001x            0  0  9
    18      17       0            7              0  8  7
    19      17       1       0001011x            0  0  B
    20      14       0       0001110x            0  0  E
    21      14       1            8              0  8  8
    22      19       0       0010001x            0  1  1
    23      19       1            9              0  8  9
    24      16       0       0001101x            0  0  D
    25      16       1       0001111x            0  0  F
    26      24       0       0010011x            0  1  3
    27      24       1           10              0  8  A
    28      20       0           12              0  8  C
    29      20       1           11              0  8  B
    30      25       0       0010000x            0  1  0
    31      25       1       0010110x            0  1  6
    32      30       0       0011001x            0  1  9
    33      30       1           13              0  8  D
    34      22       0       0010101x            0  1  5
    35      22       1       0010010x            0  1  2
    36      35       0       0011000x            0  1  8
    37      35       1           14              0  8  E
    38      26       0       0100000x            0  2  0
    39      26       1       0010100x            0  1  4
    40      39       0           15              0  8  F
    41      39       1       0011100x            0  1  C
    42      34       0       0011011x            0  1  B
    43      34       1           16              0  9  0
    44      31       0       0010111x            0  1  7
    45      31       1       0100010x            0  2  2
    46      44       0           17              0  9  1
    47      44       1       1100001x            0  6  1
    48      36       0       0011110x            0  1  E
    49      36       1           18              0  9  2
    50      32       0           20              0  9  4
    51      32       1       0011010x            0  1  A
    52      51       0           24              0  9  8
    53      51       1           19              0  9  3
    54      42       0           25              0  9  9
    55      42       1           21              0  9  5
    56      41       0       0011101x            0  1  D
    57      41       1       0011111x            0  1  F
    58      56       0           22              0  9  6
    59      56       1           37              0  A  5
    60      48       0           29              0  9  D
    61      48       1           23              0  9  7
    62      57       0           32              0  A  0
    63      57       1           26              0  9  A
    64      38       0       0101000x            0  2  8
    65      38       1       0100001x            0  2  1
```

| | | | | | | |
|---|---|---|---|---|---|---|
| 66 | 65 | 0 | 28 | 0 | 9 | C |
| 67 | 65 | 1 | 27 | 0 | 9 | B |
| 68 | 45 | 0 | 1000010x | 0 | 4 | 2 |
| 69 | 45 | 1 | 0100011x | 0 | 2 | 3 |
| 70 | 69 | 0 | 0110011x | 0 | 3 | 3 |
| 71 | 69 | 1 | 0100100x | 0 | 2 | 4 |
| 72 | 71 | 0 | 0101100x | 0 | 2 | C |
| 73 | 71 | 1 | 0100101x | 0 | 2 | 5 |
| 74 | 73 | 0 | 33 | 0 | A | 1 |
| 75 | 73 | 1 | 0100110x | 0 | 2 | 6 |
| 76 | 75 | 0 | 0100111x | 0 | 2 | 7 |
| 77 | 75 | 1 | 48 | 0 | B | 0 |
| 78 | 76 | 0 | 35 | 0 | A | 3 |
| 79 | 76 | 1 | 30 | 0 | 9 | E |
| 80 | 64 | 0 | 0101001x | 0 | 2 | 9 |
| 81 | 64 | 1 | 31 | 0 | 9 | F |
| 82 | 80 | 0 | 0101011x | 0 | 2 | B |
| 83 | 80 | 1 | 0101010x | 0 | 2 | A |
| 84 | 83 | 0 | 36 | 0 | A | 4 |
| 85 | 83 | 1 | 34 | 0 | A | 2 |
| 86 | 82 | 0 | 41 | 0 | A | 9 |
| 87 | 82 | 1 | 38 | 0 | A | 6 |
| 88 | 72 | 0 | 0110000x | 0 | 3 | 0 |
| 89 | 72 | 1 | 0101101x | 0 | 2 | D |
| 90 | 89 | 0 | 0101111x | 0 | 2 | F |
| 91 | 89 | 1 | 0101110x | 0 | 2 | E |
| 92 | 91 | 0 | 40 | 0 | A | 8 |
| 93 | 91 | 1 | 39 | 0 | A | 7 |
| 94 | 90 | 0 | 43 | 0 | A | B |
| 95 | 90 | 1 | 42 | 0 | A | A |
| 96 | 88 | 0 | 0110010x | 0 | 3 | 2 |
| 97 | 88 | 1 | 0110001x | 0 | 3 | 1 |
| 98 | 97 | 0 | 45 | 0 | A | D |
| 99 | 97 | 1 | 44 | 0 | A | C |
| 100 | 96 | 0 | 47 | 0 | A | F |
| 101 | 96 | 1 | 46 | 0 | A | E |
| 102 | 70 | 0 | 0111011x | 0 | 3 | B |
| 103 | 70 | 1 | 0110100x | 0 | 3 | 4 |
| 104 | 103 | 0 | 0111000x | 0 | 3 | 8 |
| 105 | 103 | 1 | 0110101x | 0 | 3 | 5 |
| 106 | 105 | 0 | 0110111x | 0 | 3 | 7 |
| 107 | 105 | 1 | 0110110x | 0 | 3 | 6 |
| 108 | 107 | 0 | 50 | 0 | B | 2 |
| 109 | 107 | 1 | 49 | 0 | B | 1 |
| 110 | 106 | 0 | 52 | 0 | B | 4 |
| 111 | 106 | 1 | 51 | 0 | B | 3 |
| 112 | 104 | 0 | 0111010x | 0 | 3 | A |
| 113 | 104 | 1 | 0111001x | 0 | 3 | 9 |
| 114 | 113 | 0 | 54 | 0 | B | 6 |
| 115 | 113 | 1 | 53 | 0 | B | 5 |
| 116 | 112 | 0 | 56 | 0 | B | 8 |
| 117 | 112 | 1 | 55 | 0 | B | 7 |
| 118 | 102 | 0 | 0111111x | 0 | 3 | F |
| 119 | 102 | 1 | 0111100x | 0 | 3 | C |
| 120 | 119 | 0 | 0111110x | 0 | 3 | E |
| 121 | 119 | 1 | 0111101x | 0 | 3 | D |
| 122 | 121 | 0 | 58 | 0 | B | A |
| 123 | 121 | 1 | 57 | 0 | B | 9 |
| 124 | 120 | 0 | 60 | 0 | B | C |
| 125 | 120 | 1 | 59 | 0 | B | B |
| 126 | 118 | 0 | 1000001x | 0 | 4 | 1 |
| 127 | 118 | 1 | 1000000x | 0 | 4 | 0 |
| 128 | 127 | 0 | 62 | 0 | B | E |
| 129 | 127 | 1 | 61 | 0 | B | D |
| 130 | 126 | 0 | 64 | 0 | C | 0 |
| 131 | 126 | 1 | 63 | 0 | B | F |
| 132 | 68 | 0 | 1010010x | 0 | 5 | 2 |
| 133 | 68 | 1 | 1000011x | 0 | 4 | 3 |
| 134 | 133 | 0 | 1001011x | 0 | 4 | B |
| 135 | 133 | 1 | 1000100x | 0 | 4 | 4 |
| 136 | 135 | 0 | 1001000x | 0 | 4 | 8 |
| 137 | 135 | 1 | 1000101x | 0 | 4 | 5 |
| 138 | 137 | 0 | 1000111x | 0 | 4 | 7 |
| 139 | 137 | 1 | 1000110x | 0 | 4 | 6 |

| | | | | | | |
|---|---|---|---|---|---|---|
| 140 | 139 | 0 | 66 | 0 | C | 2 |
| 141 | 139 | 1 | 65 | 0 | C | 1 |
| 142 | 138 | 0 | 68 | 0 | C | 4 |
| 143 | 138 | 1 | 67 | 0 | C | 3 |
| 144 | 136 | 0 | 1001010x | 0 | 4 | A |
| 145 | 136 | 1 | 1001001x | 0 | 4 | 9 |
| 146 | 145 | 0 | 70 | 0 | C | 6 |
| 147 | 145 | 1 | 69 | 0 | C | 5 |
| 148 | 144 | 0 | 72 | 0 | C | 8 |
| 149 | 144 | 1 | 71 | 0 | C | 7 |
| 150 | 134 | 0 | 1001111x | 0 | 4 | F |
| 151 | 134 | 1 | 1001100x | 0 | 4 | C |
| 152 | 151 | 0 | 1001110x | 0 | 4 | E |
| 153 | 151 | 1 | 1001101x | 0 | 4 | D |
| 154 | 153 | 0 | 74 | 0 | C | A |
| 155 | 153 | 1 | 73 | 0 | C | 9 |
| 156 | 152 | 0 | 76 | 0 | C | C |
| 157 | 152 | 1 | 75 | 0 | C | B |
| 158 | 150 | 0 | 1010001x | 0 | 5 | 1 |
| 159 | 150 | 1 | 1010000x | 0 | 5 | 0 |
| 160 | 159 | 0 | 78 | 0 | C | E |
| 161 | 159 | 1 | 77 | 0 | C | D |
| 162 | 158 | 0 | 80 | 0 | D | 0 |
| 163 | 158 | 1 | 79 | 0 | C | F |
| 164 | 132 | 0 | 1011010x | 0 | 5 | A |
| 165 | 132 | 1 | 1010011x | 0 | 5 | 3 |
| 166 | 165 | 0 | 1010111x | 0 | 5 | 7 |
| 167 | 165 | 1 | 1010100x | 0 | 5 | 4 |
| 168 | 167 | 0 | 1010110x | 0 | 5 | 6 |
| 169 | 167 | 1 | 1010101x | 0 | 5 | 5 |
| 170 | 169 | 0 | 82 | 0 | D | 2 |
| 171 | 169 | 1 | 81 | 0 | D | 1 |
| 172 | 168 | 0 | 84 | 0 | D | 4 |
| 173 | 168 | 1 | 83 | 0 | D | 3 |
| 174 | 166 | 0 | 1011001x | 0 | 5 | 9 |
| 175 | 166 | 1 | 1011000x | 0 | 5 | 8 |
| 176 | 175 | 0 | 86 | 0 | D | 6 |
| 177 | 175 | 1 | 85 | 0 | D | 5 |
| 178 | 174 | 0 | 88 | 0 | D | 8 |
| 179 | 174 | 1 | 87 | 0 | D | 7 |
| 180 | 164 | 0 | 1011110x | 0 | 5 | E |
| 181 | 164 | 1 | 1011011x | 0 | 5 | B |
| 182 | 181 | 0 | 1011101x | 0 | 5 | D |
| 183 | 181 | 1 | 1011100x | 0 | 5 | C |
| 184 | 183 | 0 | 90 | 0 | D | A |
| 185 | 183 | 1 | 89 | 0 | D | 9 |
| 186 | 182 | 0 | 92 | 0 | D | C |
| 187 | 182 | 1 | 91 | 0 | D | B |
| 188 | 180 | 0 | 1100000x | 0 | 6 | 0 |
| 189 | 180 | 1 | 1011111x | 0 | 5 | F |
| 190 | 189 | 0 | 94 | 0 | D | E |
| 191 | 189 | 1 | 93 | 0 | D | D |
| 192 | 188 | 0 | 96 | 0 | E | 0 |
| 193 | 188 | 1 | 95 | 0 | D | F |
| 194 | 47 | 0 | 1110001x | 0 | 7 | 1 |
| 195 | 47 | 1 | 1100010x | 0 | 6 | 2 |
| 196 | 195 | 0 | 1101010x | 0 | 6 | A |
| 197 | 195 | 1 | 1100011x | 0 | 6 | 3 |
| 198 | 197 | 0 | 1100111x | 0 | 6 | 7 |
| 199 | 197 | 1 | 1100100x | 0 | 6 | 4 |
| 200 | 199 | 0 | 1100110x | 0 | 6 | 6 |
| 201 | 199 | 1 | 1100101x | 0 | 6 | 5 |
| 202 | 201 | 0 | 98 | 0 | E | 2 |
| 203 | 201 | 1 | 97 | 0 | E | 1 |
| 204 | 200 | 0 | 100 | 0 | E | 4 |
| 205 | 200 | 1 | 99 | 0 | E | 3 |
| 206 | 198 | 0 | 1101001x | 0 | 6 | 9 |
| 207 | 198 | 1 | 1101000x | 0 | 6 | 8 |
| 208 | 207 | 0 | 102 | 0 | E | 6 |
| 209 | 207 | 1 | 101 | 0 | E | 5 |
| 210 | 206 | 0 | 104 | 0 | E | 8 |
| 211 | 206 | 1 | 103 | 0 | E | 7 |
| 212 | 196 | 0 | 1101110x | 0 | 6 | E |
| 213 | 196 | 1 | 1101011x | 0 | 6 | B |
| 214 | 213 | 0 | 1101101x | 0 | 6 | D |

| Entry | Father | Bit | Value or Sons | ROM Data |
|---|---|---|---|---|
| 215 | 213 | 1 | 1101100x | 0 6 C |
| 216 | 215 | 0 | 106 | 0 E A |
| 217 | 215 | 1 | 105 | 0 E 9 |
| 218 | 214 | 0 | 108 | 0 E C |
| 219 | 214 | 1 | 107 | 0 E B |
| 220 | 212 | 0 | 1110000x | 0 7 0 |
| 221 | 212 | 1 | 1101111x | 0 6 F |
| 222 | 221 | 0 | 110 | 0 E E |
| 223 | 221 | 1 | 109 | 0 E D |
| 224 | 220 | 0 | 112 | 0 F 0 |
| 225 | 220 | 1 | 111 | 0 E F |
| 226 | 194 | 0 | 1111001x | 0 7 9 |
| 227 | 194 | 1 | 1110010x | 0 7 2 |
| 228 | 227 | 0 | 1110110x | 0 7 6 |
| 229 | 227 | 1 | 1110011x | 0 7 3 |
| 230 | 229 | 0 | 1110101x | 0 7 5 |
| 231 | 229 | 1 | 1110100x | 0 7 4 |
| 232 | 231 | 0 | 114 | 0 F 2 |
| 233 | 231 | 1 | 113 | 0 F 1 |
| 234 | 230 | 0 | 116 | 0 F 4 |
| 235 | 230 | 1 | 115 | 0 F 3 |
| 236 | 228 | 0 | 1111000x | 0 7 8 |
| 237 | 228 | 1 | 1110111x | 0 7 7 |
| 238 | 237 | 0 | 118 | 0 F 6 |
| 239 | 237 | 1 | 117 | 0 F 5 |
| 240 | 236 | 0 | 120 | 0 F 8 |
| 241 | 236 | 1 | 119 | 0 F 7 |
| 242 | 226 | 0 | 1111101x | 0 7 D |
| 243 | 226 | 1 | 1111010x | 0 7 A |
| 244 | 243 | 0 | 1111100x | 0 7 C |
| 245 | 243 | 1 | 1111011x | 0 7 B |
| 246 | 245 | 0 | 122 | 0 F A |
| 247 | 245 | 1 | 121 | 0 F 9 |
| 248 | 244 | 0 | 124 | 0 F C |
| 249 | 244 | 1 | 123 | 0 F B |
| 250 | 242 | 0 | 1111111x | 0 7 F |
| 251 | 242 | 1 | 1111110x | 0 7 E |
| 252 | 251 | 0 | 126 | 0 F E |
| 253 | 251 | 1 | 125 | 0 F D |
| 254 | 250 | 0 | 128 | 1 8 0 |
| 255 | 250 | 1 | 127 | 0 F F |

*********************************©*********************************
© 1982 Bell & Howell
TABLE 2

\*\*\* Entry \* Father \* Bit \* Value or Sons \* ROM Data: EOB,Z,E,T,D6-D0 \*\*\*

| Entry | Father | Bit | Value or Sons | ROM Data |
|---|---|---|---|---|
| 0 | none | 0 | 0 | 2 8 0 |
| 1 | none | 1 | 0000001x | 0 0 1 |
| 2 | 1 | 0 | 0000010x | 0 0 2 |
| 3 | 1 | 1 | 1 | 0 8 1 |
| 4 | 2 | 0 | 0000011x | 0 0 3 |
| 5 | 2 | 1 | 2 | 0 8 2 |
| 6 | 4 | 0 | 3 | 0 8 3 |
| 7 | 4 | 1 | 0000100x | 0 0 4 |
| 8 | 7 | 0 | 0000110x | 0 0 6 |
| 9 | 7 | 1 | 0000101x | 0 0 5 |
| 10 | 9 | 0 | 0000111x | 0 0 7 |
| 11 | 9 | 1 | 4 | 0 8 4 |
| 12 | 8 | 0 | 0001000x | 0 0 8 |
| 13 | 8 | 1 | 5 | 0 8 5 |
| 14 | 10 | 0 | 6 | 0 8 6 |
| 15 | 10 | 1 | 0001010x | 0 0 A |
| 16 | 12 | 0 | 7 | 0 8 7 |
| 17 | 12 | 1 | 0001001x | 0 0 9 |
| 18 | 17 | 0 | 0001111x | 0 0 F |
| 19 | 17 | 1 | 8 | 0 8 8 |
| 20 | 15 | 0 | 0001101x | 0 0 D |
| 21 | 15 | 1 | 0001011x | 0 0 B |
| 22 | 21 | 0 | 9 | 0 8 9 |

| | | | | | | |
|---|---|---|---|---|---|---|
| 23 | 21 | 1 | 0001100x | 0 | 0 | C |
| 24 | 23 | 0 | 0010101x | 0 | 1 | 5 |
| 25 | 23 | 1 | 10 | 0 | B | A |
| 26 | 20 | 0 | 0010010x | 0 | 1 | 2 |
| 27 | 20 | 1 | 0001110x | 0 | 0 | E |
| 28 | 27 | 0 | 11 | 0 | 8 | B |
| 29 | 27 | 1 | 0100000x | 0 | 2 | 0 |
| 30 | 18 | 0 | 0010000x | 0 | 1 | 0 |
| 31 | 18 | 1 | 0010001x | 0 | 1 | 1 |
| 32 | 30 | 0 | 0010111x | 0 | 1 | 7 |
| 33 | 30 | 1 | 12 | 0 | 8 | C |
| 34 | 31 | 0 | 13 | 0 | 8 | D |
| 35 | 31 | 1 | 0011101x | 0 | 1 | D |
| 36 | 26 | 0 | 0010100x | 0 | 1 | 4 |
| 37 | 26 | 1 | 0010011x | 0 | 1 | 3 |
| 38 | 37 | 0 | 14 | 0 | 8 | E |
| 39 | 37 | 1 | 1001110x | 0 | 4 | E |
| 40 | 36 | 0 | 0010110x | 0 | 1 | 6 |
| 41 | 36 | 1 | 15 | 0 | 8 | F |
| 42 | 24 | 0 | 16 | 0 | 9 | 0 |
| 43 | 24 | 1 | 0011000x | 0 | 1 | 8 |
| 44 | 40 | 0 | 17 | 0 | 9 | 1 |
| 45 | 40 | 1 | 1101101x | 0 | 6 | D |
| 46 | 32 | 0 | 19 | 0 | 9 | 3 |
| 47 | 32 | 1 | 18 | 0 | 9 | 2 |
| 48 | 43 | 0 | 0011010x | 0 | 1 | A |
| 49 | 43 | 1 | 0011001x | 0 | 1 | 9 |
| 50 | 49 | 0 | 28 | 0 | 9 | C |
| 51 | 49 | 1 | 20 | 0 | 9 | 4 |
| 52 | 48 | 0 | 0110010x | 0 | 3 | 2 |
| 53 | 48 | 1 | 0011011x | 0 | 1 | B |
| 54 | 53 | 0 | 0110001x | 0 | 3 | 1 |
| 55 | 53 | 1 | 0011100x | 0 | 1 | C |
| 56 | 55 | 0 | 33 | 0 | A | 1 |
| 57 | 55 | 1 | 21 | 0 | 9 | 5 |
| 58 | 35 | 0 | 0100110x | 0 | 2 | 6 |
| 59 | 35 | 1 | 0011110x | 0 | 1 | E |
| 60 | 59 | 0 | 0101000x | 0 | 2 | 8 |
| 61 | 59 | 1 | 0011111x | 0 | 1 | F |
| 62 | 61 | 0 | 24 | 0 | 9 | 8 |
| 63 | 61 | 1 | 22 | 0 | 9 | 6 |
| 64 | 29 | 0 | 0101100x | 0 | 2 | C |
| 65 | 29 | 1 | 0100001x | 0 | 2 | 1 |
| 66 | 65 | 0 | 0100100x | 0 | 2 | 4 |
| 67 | 65 | 1 | 0100010x | 0 | 2 | 2 |
| 68 | 67 | 0 | 0100011x | 0 | 2 | 3 |
| 69 | 67 | 1 | 0111000x | 0 | 3 | B |
| 70 | 68 | 0 | 23 | 0 | 9 | 7 |
| 71 | 68 | 1 | 1000101x | 0 | 4 | 5 |
| 72 | 66 | 0 | 0111010x | 0 | 3 | A |
| 73 | 66 | 1 | 0100101x | 0 | 2 | 5 |
| 74 | 73 | 0 | 44 | 0 | A | C |
| 75 | 73 | 1 | 25 | 0 | 9 | 9 |
| 76 | 58 | 0 | 0101011x | 0 | 2 | B |
| 77 | 58 | 1 | 0100111x | 0 | 2 | 7 |
| 78 | 77 | 0 | 29 | 0 | 9 | D |
| 79 | 77 | 1 | 26 | 0 | 9 | A |
| 80 | 60 | 0 | 0101001x | 0 | 2 | 9 |
| 81 | 60 | 1 | 30 | 0 | 9 | E |
| 82 | 80 | 0 | 0101010x | 0 | 2 | A |
| 83 | 80 | 1 | 1111100x | 0 | 7 | C |
| 84 | 82 | 0 | 27 | 0 | 9 | B |
| 85 | 82 | 1 | 1111111x | 0 | 7 | F |
| 86 | 76 | 0 | 32 | 0 | A | 0 |
| 87 | 76 | 1 | 31 | 0 | 9 | F |
| 88 | 64 | 0 | 0111101x | 0 | 3 | D |
| 89 | 64 | 1 | 0101101x | 0 | 2 | D |
| 90 | 89 | 0 | 0101110x | 0 | 2 | E |
| 91 | 89 | 1 | 1001010x | 0 | 4 | A |
| 92 | 90 | 0 | 0110101x | 0 | 3 | 5 |
| 93 | 90 | 1 | 0101111x | 0 | 2 | F |
| 94 | 93 | 0 | 0110100x | 0 | 3 | 4 |
| 95 | 93 | 1 | 0110000x | 0 | 3 | 0 |
| 96 | 95 | 0 | 37 | 0 | A | 5 |

| | | | | | | |
|---|---|---|---|---|---|---|
| 97 | 95 | 1 | 34 | 0 | A | 2 |
| 98 | 54 | 0 | 36 | 0 | A | 4 |
| 99 | 54 | 1 | 35 | 0 | A | 3 |
| 100 | 52 | 0 | 0110111x | 0 | 3 | 7 |
| 101 | 52 | 1 | 0110011x | 0 | 3 | 3 |
| 102 | 101 | 0 | 43 | 0 | A | B |
| 103 | 101 | 1 | 38 | 0 | A | 6 |
| 104 | 94 | 0 | 40 | 0 | A | 8 |
| 105 | 94 | 1 | 39 | 0 | A | 7 |
| 106 | 92 | 0 | 0111100x | 0 | 3 | C |
| 107 | 92 | 1 | 0110110x | 0 | 3 | 6 |
| 108 | 107 | 0 | 42 | 0 | A | A |
| 109 | 107 | 1 | 41 | 0 | A | 9 |
| 110 | 100 | 0 | 46 | 0 | A | E |
| 111 | 100 | 1 | 45 | 0 | A | D |
| 112 | 69 | 0 | 0111011x | 0 | 3 | B |
| 113 | 69 | 1 | 0111001x | 0 | 3 | 9 |
| 114 | 113 | 0 | 49 | 0 | B | 1 |
| 115 | 113 | 1 | 47 | 0 | A | F |
| 116 | 72 | 0 | 51 | 0 | B | 3 |
| 117 | 72 | 1 | 48 | 0 | B | 0 |
| 118 | 112 | 0 | 57 | 0 | B | 9 |
| 119 | 112 | 1 | 50 | 0 | B | 2 |
| 120 | 106 | 0 | 53 | 0 | B | 5 |
| 121 | 106 | 1 | 52 | 0 | B | 4 |
| 122 | 88 | 0 | 1000110x | 0 | 4 | 6 |
| 123 | 88 | 1 | 0111110x | 0 | 3 | E |
| 124 | 123 | 0 | 1000010x | 0 | 4 | 2 |
| 125 | 123 | 1 | 0111111x | 0 | 3 | F |
| 126 | 125 | 0 | 1000001x | 0 | 4 | 1 |
| 127 | 125 | 1 | 1000000x | 0 | 4 | 0 |
| 128 | 127 | 0 | 55 | 0 | B | 7 |
| 129 | 127 | 1 | 54 | 0 | B | 6 |
| 130 | 126 | 0 | 58 | 0 | B | A |
| 131 | 126 | 1 | 56 | 0 | B | 8 |
| 132 | 124 | 0 | 1000100x | 0 | 4 | 4 |
| 133 | 124 | 1 | 1000011x | 0 | 4 | 3 |
| 134 | 133 | 0 | 60 | 0 | B | C |
| 135 | 133 | 1 | 59 | 0 | B | B |
| 136 | 132 | 0 | 62 | 0 | B | E |
| 137 | 132 | 1 | 61 | 0 | B | D |
| 138 | 71 | 0 | 65 | 0 | C | 1 |
| 139 | 71 | 1 | 63 | 0 | B | F |
| 140 | 122 | 0 | 1001011x | 0 | 4 | B |
| 141 | 122 | 1 | 1000111x | 0 | 4 | 7 |
| 142 | 141 | 0 | 1001001x | 0 | 4 | 9 |
| 143 | 141 | 1 | 1001000x | 0 | 4 | 8 |
| 144 | 143 | 0 | 66 | 0 | C | 2 |
| 145 | 143 | 1 | 64 | 0 | C | 0 |
| 146 | 142 | 0 | 69 | 0 | C | 5 |
| 147 | 142 | 1 | 67 | 0 | C | 3 |
| 148 | 91 | 0 | 71 | 0 | C | 7 |
| 149 | 91 | 1 | 68 | 0 | C | 4 |
| 150 | 140 | 0 | 1001101x | 0 | 4 | D |
| 151 | 140 | 1 | 1001100x | 0 | 4 | C |
| 152 | 151 | 0 | 72 | 0 | C | 8 |
| 153 | 151 | 1 | 70 | 0 | C | 6 |
| 154 | 150 | 0 | 74 | 0 | C | A |
| 155 | 150 | 1 | 73 | 0 | C | 9 |
| 156 | 39 | 0 | 1011110x | 0 | 5 | E |
| 157 | 39 | 1 | 1001111x | 0 | 4 | F |
| 158 | 157 | 0 | 1010111x | 0 | 5 | 7 |
| 159 | 157 | 1 | 1010000x | 0 | 5 | 0 |
| 160 | 159 | 0 | 1010100x | 0 | 5 | 4 |
| 161 | 159 | 1 | 1010001x | 0 | 5 | 1 |
| 162 | 161 | 0 | 1010011x | 0 | 5 | 3 |
| 163 | 161 | 1 | 1010010x | 0 | 5 | 2 |
| 164 | 163 | 0 | 76 | 0 | C | C |
| 165 | 163 | 1 | 75 | 0 | C | B |
| 166 | 162 | 0 | 78 | 0 | C | E |
| 167 | 162 | 1 | 77 | 0 | C | D |
| 168 | 160 | 0 | 1010110x | 0 | 5 | 6 |
| 169 | 160 | 1 | 1010101x | 0 | 5 | 5 |
| 170 | 169 | 0 | 80 | 0 | D | 0 |

| | | | | | | |
|---|---|---|---|---|---|---|
| 171 | 169 | 1 | 79 | 0 | C | F |
| 172 | 168 | 0 | 82 | 0 | D | 2 |
| 173 | 168 | 1 | 81 | 0 | D | 1 |
| 174 | 158 | 0 | 1011011× | 0 | 5 | B |
| 175 | 158 | 1 | 1011000× | 0 | 5 | 8 |
| 176 | 175 | 0 | 1011010× | 0 | 5 | A |
| 177 | 175 | 1 | 1011001× | 0 | 5 | 9 |
| 178 | 177 | 0 | 84 | 0 | D | 4 |
| 179 | 177 | 1 | 83 | 0 | D | 3 |
| 180 | 176 | 0 | 86 | 0 | D | 6 |
| 181 | 176 | 1 | 85 | 0 | D | 5 |
| 182 | 174 | 0 | 1011101× | 0 | 5 | D |
| 183 | 174 | 1 | 1011100× | 0 | 5 | C |
| 184 | 183 | 0 | 88 | 0 | D | 8 |
| 185 | 183 | 1 | 87 | 0 | D | 7 |
| 186 | 182 | 0 | 90 | 0 | D | A |
| 187 | 182 | 1 | 89 | 0 | D | 9 |
| 188 | 156 | 0 | 1100110× | 0 | 6 | 6 |
| 189 | 156 | 1 | 1011111× | 0 | 5 | F |
| 190 | 189 | 0 | 1100011× | 0 | 6 | 3 |
| 191 | 189 | 1 | 1100000× | 0 | 6 | 0 |
| 192 | 191 | 0 | 1100010× | 0 | 6 | 2 |
| 193 | 191 | 1 | 1100001× | 0 | 6 | 1 |
| 194 | 193 | 0 | 92 | 0 | D | C |
| 195 | 193 | 1 | 91 | 0 | D | B |
| 196 | 192 | 0 | 94 | 0 | D | E |
| 197 | 192 | 1 | 93 | 0 | D | D |
| 198 | 190 | 0 | 1100101× | 0 | 6 | 5 |
| 199 | 190 | 1 | 1100100× | 0 | 6 | 4 |
| 200 | 199 | 0 | 96 | 0 | E | 0 |
| 201 | 199 | 1 | 95 | 0 | D | F |
| 202 | 198 | 0 | 98 | 0 | E | 2 |
| 203 | 198 | 1 | 97 | 0 | E | 1 |
| 204 | 188 | 0 | 1101010× | 0 | 6 | A |
| 205 | 188 | 1 | 1100111× | 0 | 6 | 7 |
| 206 | 205 | 0 | 1101001× | 0 | 6 | 9 |
| 207 | 205 | 1 | 1101000× | 0 | 6 | 8 |
| 208 | 207 | 0 | 100 | 0 | E | 4 |
| 209 | 207 | 1 | 99 | 0 | E | 3 |
| 210 | 206 | 0 | 102 | 0 | E | 6 |
| 211 | 206 | 1 | 101 | 0 | E | 5 |
| 212 | 204 | 0 | 1101100× | 0 | 6 | C |
| 213 | 204 | 1 | 1101011× | 0 | 6 | B |
| 214 | 213 | 0 | 104 | 0 | E | 8 |
| 215 | 213 | 1 | 103 | 0 | E | 7 |
| 216 | 212 | 0 | 106 | 0 | E | A |
| 217 | 212 | 1 | 105 | 0 | E | 9 |
| 218 | 45 | 0 | 1110101× | 0 | 7 | 5 |
| 219 | 45 | 1 | 1101110× | 0 | 6 | E |
| 220 | 219 | 0 | 1110010× | 0 | 7 | 2 |
| 221 | 219 | 1 | 1101111× | 0 | 6 | F |
| 222 | 221 | 0 | 1110001× | 0 | 7 | 1 |
| 223 | 221 | 1 | 1110000× | 0 | 7 | 0 |
| 224 | 223 | 0 | 108 | 0 | E | C |
| 225 | 223 | 1 | 107 | 0 | E | B |
| 226 | 222 | 0 | 110 | 0 | E | E |
| 227 | 222 | 1 | 109 | 0 | E | D |
| 228 | 220 | 0 | 1110100× | 0 | 7 | 4 |
| 229 | 220 | 1 | 1110011× | 0 | 7 | 3 |
| 230 | 229 | 0 | 112 | 0 | F | 0 |
| 231 | 229 | 1 | 111 | 0 | E | F |
| 232 | 228 | 0 | 114 | 0 | F | 2 |
| 233 | 228 | 1 | 113 | 0 | F | 1 |
| 234 | 218 | 0 | 1111001× | 0 | 7 | 9 |
| 235 | 218 | 1 | 1110110× | 0 | 7 | 6 |
| 236 | 235 | 0 | 1111000× | 0 | 7 | 8 |
| 237 | 235 | 1 | 1110111× | 0 | 7 | 7 |
| 238 | 237 | 0 | 116 | 0 | F | 4 |
| 239 | 237 | 1 | 115 | 0 | F | 3 |
| 240 | 236 | 0 | 118 | 0 | F | 6 |
| 241 | 236 | 1 | 117 | 0 | F | 5 |
| 242 | 234 | 0 | 1111011× | 0 | 7 | B |
| 243 | 234 | 1 | 1111010× | 0 | 7 | A |
| 244 | 243 | 0 | 120 | 0 | F | 8 |

| 245 | 243 | 1 | 119 | 0 F 7 |
| 246 | 242 | 0 | 122 | 0 F A |
| 247 | 242 | 1 | 121 | 0 F 9 |
| 248 | 83 | 0 | 1111110x | 0 7 E |
| 249 | 83 | 1 | 1111101x | 0 7 D |
| 250 | 249 | 0 | 124 | 0 F C |
| 251 | 249 | 1 | 123 | 0 F B |
| 252 | 248 | 0 | 126 | 0 F E |
| 253 | 248 | 1 | 125 | 0 F D |
| 254 | 85 | 0 | 128 | 1 8 0 |
| 255 | 85 | 1 | 127 | 0 F F |

*******************************************************************

© 1982 Bell & Howell

TABLE 3

Entry * Father * Bit * Value or Sons * ROM Data: EOB,Z,E,T,D6-D0 ***

| 0 | none | 0 | 0000010x | 0 0 2 |
| 1 | none | 1 | 0000001x | 0 0 1 |
| 2 | 1 | 0 | 1 | 0 8 1 |
| 3 | 1 | 1 | 0 | 2 8 0 |
| 4 | 0 | 0 | 0000100x | 0 0 4 |
| 5 | 0 | 1 | 0000011x | 0 0 3 |
| 6 | 5 | 0 | 0000101x | 0 0 5 |
| 7 | 5 | 1 | 2 | 0 8 2 |
| 8 | 4 | 0 | 0000110x | 0 0 6 |
| 9 | 4 | 1 | 3 | 0 8 3 |
| 10 | 6 | 0 | 4 | 0 8 4 |
| 11 | 6 | 1 | 0001000x | 0 0 8 |
| 12 | 8 | 0 | 5 | 0 8 5 |
| 13 | 8 | 1 | 0000111x | 0 0 7 |
| 14 | 13 | 0 | 0001101x | 0 0 D |
| 15 | 13 | 1 | 6 | 0 8 6 |
| 16 | 11 | 0 | 0001010x | 0 0 A |
| 17 | 11 | 1 | 0001001x | 0 0 9 |
| 18 | 17 | 0 | 7 | 0 8 7 |
| 19 | 17 | 1 | 0001011x | 0 0 B |
| 20 | 16 | 0 | 8 | 0 8 8 |
| 21 | 16 | 1 | 0001100x | 0 0 C |
| 22 | 19 | 0 | 0001111x | 0 0 F |
| 23 | 19 | 1 | 9 | 0 8 9 |
| 24 | 21 | 0 | 0010000x | 0 1 0 |
| 25 | 21 | 1 | 10 | 0 8 A |
| 26 | 14 | 0 | 0010001x | 0 1 1 |
| 27 | 14 | 1 | 0001110x | 0 0 E |
| 28 | 27 | 0 | 0010100x | 0 1 4 |
| 29 | 27 | 1 | 11 | 0 8 B |
| 30 | 22 | 0 | 0011001x | 0 1 9 |
| 31 | 22 | 1 | 12 | 0 8 C |
| 32 | 24 | 0 | 13 | 0 8 D |
| 33 | 24 | 1 | 0010110x | 0 1 6 |
| 34 | 26 | 0 | 0010011x | 0 1 3 |
| 35 | 26 | 1 | 0010010x | 0 1 2 |
| 36 | 35 | 0 | 0011000x | 0 1 8 |
| 37 | 35 | 1 | 14 | 0 8 E |
| 38 | 34 | 0 | 0010111x | 0 1 7 |
| 39 | 34 | 1 | 15 | 0 8 F |
| 40 | 28 | 0 | 0011011x | 0 1 B |
| 41 | 28 | 1 | 0010101x | 0 1 5 |
| 42 | 41 | 0 | 16 | 0 9 0 |
| 43 | 41 | 1 | 0011111x | 0 1 F |
| 44 | 33 | 0 | 17 | 0 9 1 |
| 45 | 33 | 1 | 0100011x | 0 2 3 |
| 46 | 38 | 0 | 18 | 0 9 2 |
| 47 | 38 | 1 | 0110010x | 0 3 2 |
| 48 | 36 | 0 | 0100110x | 0 2 6 |
| 49 | 36 | 1 | 19 | 0 9 3 |
| 50 | 30 | 0 | 0011010x | 0 1 A |
| 51 | 30 | 1 | 0100000x | 0 2 0 |
| 52 | 50 | 0 | 20 | 0 9 4 |
| 53 | 50 | 1 | 0011110x | 0 1 E |

| | | | | | | |
|---|---|---|---|---|---|---|
| 54 | 40 | 0 | 0011100x | 0 | 1 | C |
| 55 | 40 | 1 | 0011101x | 0 | 1 | D |
| 56 | 54 | 0 | 21 | 0 | 9 | 5 |
| 57 | 54 | 1 | 0101111x | 0 | 2 | F |
| 58 | 55 | 0 | 0100101x | 0 | 2 | 5 |
| 59 | 55 | 1 | 22 | 0 | 9 | 6 |
| 60 | 53 | 0 | 23 | 0 | 9 | 7 |
| 61 | 53 | 1 | 29 | 0 | 9 | D |
| 62 | 43 | 0 | 0101000x | 0 | 2 | 8 |
| 63 | 43 | 1 | 24 | 0 | 9 | 8 |
| 64 | 51 | 0 | 0100010x | 0 | 2 | 2 |
| 65 | 51 | 1 | 0100001x | 0 | 2 | 1 |
| 66 | 65 | 0 | 1001111x | 0 | 4 | F |
| 67 | 65 | 1 | 25 | 0 | 9 | 9 |
| 68 | 64 | 0 | 26 | 0 | 9 | A |
| 69 | 64 | 1 | 0110101x | 0 | 3 | 5 |
| 70 | 45 | 0 | 0101011x | 0 | 2 | B |
| 71 | 45 | 1 | 0100100x | 0 | 2 | 4 |
| 72 | 71 | 0 | 27 | 0 | 9 | B |
| 73 | 71 | 1 | 1000101x | 0 | 4 | 5 |
| 74 | 58 | 0 | 0101110x | 0 | 2 | E |
| 75 | 58 | 1 | 28 | 0 | 9 | C |
| 76 | 48 | 0 | 0100111x | 0 | 2 | 7 |
| 77 | 48 | 1 | 0101001x | 0 | 2 | 9 |
| 78 | 76 | 0 | 30 | 0 | 9 | E |
| 79 | 76 | 1 | 1001010x | 0 | 4 | A |
| 80 | 62 | 0 | 31 | 0 | 9 | F |
| 81 | 62 | 1 | 0101010x | 0 | 2 | A |
| 82 | 77 | 0 | 0111010x | 0 | 3 | A |
| 83 | 77 | 1 | 32 | 0 | A | 0 |
| 84 | 81 | 0 | 43 | 0 | A | B |
| 85 | 81 | 1 | 33 | 0 | A | 1 |
| 86 | 70 | 0 | 0101100x | 0 | 2 | C |
| 87 | 70 | 1 | 0110001x | 0 | 3 | 1 |
| 88 | 86 | 0 | 0111001x | 0 | 3 | 9 |
| 89 | 86 | 1 | 0101101x | 0 | 2 | D |
| 90 | 89 | 0 | 44 | 0 | A | C |
| 91 | 89 | 1 | 34 | 0 | A | 2 |
| 92 | 74 | 0 | 35 | 0 | A | 3 |
| 93 | 74 | 1 | 1000001x | 0 | 4 | 1 |
| 94 | 57 | 0 | 0111000x | 0 | 3 | 8 |
| 95 | 57 | 1 | 0110000x | 0 | 3 | 0 |
| 96 | 95 | 0 | 40 | 0 | A | 8 |
| 97 | 95 | 1 | 36 | 0 | A | 4 |
| 98 | 87 | 0 | 37 | 0 | A | 5 |
| 99 | 87 | 1 | 1100010x | 0 | 6 | 2 |
| 100 | 47 | 0 | 0111101x | 0 | 3 | D |
| 101 | 47 | 1 | 0110011x | 0 | 3 | 3 |
| 102 | 101 | 0 | 0111100x | 0 | 3 | C |
| 103 | 101 | 1 | 0110100x | 0 | 3 | 4 |
| 104 | 103 | 0 | 39 | 0 | A | 7 |
| 105 | 103 | 1 | 38 | 0 | A | 6 |
| 106 | 69 | 0 | 0110111x | 0 | 3 | 7 |
| 107 | 69 | 1 | 0110110x | 0 | 3 | 6 |
| 108 | 107 | 0 | 41 | 0 | A | 9 |
| 109 | 107 | 1 | 1101010x | 0 | 6 | A |
| 110 | 106 | 0 | 47 | 0 | A | F |
| 111 | 106 | 1 | 42 | 0 | A | A |
| 112 | 94 | 0 | 50 | 0 | B | 2 |
| 113 | 94 | 1 | 45 | 0 | A | D |
| 114 | 88 | 0 | 51 | 0 | B | 3 |
| 115 | 88 | 1 | 46 | 0 | A | E |
| 116 | 82 | 0 | 1001000x | 0 | 4 | 8 |
| 117 | 82 | 1 | 0111011x | 0 | 3 | B |
| 118 | 117 | 0 | 52 | 0 | B | 4 |
| 119 | 117 | 1 | 48 | 0 | B | 0 |
| 120 | 102 | 0 | 54 | 0 | B | 6 |
| 121 | 102 | 1 | 49 | 0 | B | 1 |
| 122 | 100 | 0 | 0111110x | 0 | 3 | E |
| 123 | 100 | 1 | 1010101x | 0 | 5 | 5 |
| 124 | 122 | 0 | 0111111x | 0 | 3 | F |
| 125 | 122 | 1 | 1110001x | 0 | 7 | 1 |
| 126 | 124 | 0 | 1001001x | 0 | 4 | 9 |
| 127 | 124 | 1 | 1000000x | 0 | 4 | 0 |

| | | | | | | |
|---|---|---|---|---|---|---|
| 128 | 127 | 0 | 57 | 0 | B | 9 |
| 129 | 127 | 1 | 53 | 0 | B | 5 |
| 130 | 93 | 0 | 1000010× | 0 | 4 | 2 |
| 131 | 93 | 1 | 73 | 0 | C | 9 |
| 132 | 130 | 0 | 1011100× | 0 | 5 | C |
| 133 | 130 | 1 | 1000011× | 0 | 4 | 3 |
| 134 | 133 | 0 | 1000100× | 0 | 4 | 4 |
| 135 | 133 | 1 | 125 | 0 | F | D |
| 136 | 134 | 0 | 79 | 0 | C | F |
| 137 | 134 | 1 | 55 | 0 | B | 7 |
| 138 | 73 | 0 | 1001100× | 0 | 4 | C |
| 139 | 73 | 1 | 1000110× | 0 | 4 | 6 |
| 140 | 139 | 0 | 1000111× | 0 | 4 | 7 |
| 141 | 139 | 1 | 74 | 0 | C | A |
| 142 | 140 | 0 | 59 | 0 | B | B |
| 143 | 140 | 1 | 56 | 0 | B | 8 |
| 144 | 116 | 0 | 61 | 0 | B | D |
| 145 | 116 | 1 | 58 | 0 | B | A |
| 146 | 126 | 0 | 62 | 0 | B | E |
| 147 | 126 | 1 | 60 | 0 | B | C |
| 148 | 79 | 0 | 1001110× | 0 | 4 | E |
| 149 | 79 | 1 | 1001011× | 0 | 4 | B |
| 150 | 149 | 0 | 64 | 0 | C | 0 |
| 151 | 149 | 1 | 63 | 0 | B | F |
| 152 | 138 | 0 | 1010011× | 0 | 5 | 3 |
| 153 | 138 | 1 | 1001101× | 0 | 4 | D |
| 154 | 153 | 0 | 66 | 0 | C | 2 |
| 155 | 153 | 1 | 65 | 0 | C | 1 |
| 156 | 148 | 0 | 76 | 0 | C | C |
| 157 | 148 | 1 | 67 | 0 | C | 3 |
| 158 | 66 | 0 | 1011001× | 0 | 5 | 9 |
| 159 | 66 | 1 | 1010000× | 0 | 5 | 0 |
| 160 | 159 | 0 | 1010110× | 0 | 5 | 6 |
| 161 | 159 | 1 | 1010001× | 0 | 5 | 1 |
| 162 | 161 | 0 | 1010100× | 0 | 5 | 4 |
| 163 | 161 | 1 | 1010010× | 0 | 5 | 2 |
| 164 | 163 | 0 | 70 | 0 | C | 6 |
| 165 | 163 | 1 | 68 | 0 | C | 4 |
| 166 | 152 | 0 | 72 | 0 | C | 8 |
| 167 | 152 | 1 | 69 | 0 | C | 5 |
| 168 | 162 | 0 | 75 | 0 | C | B |
| 169 | 162 | 1 | 71 | 0 | C | 7 |
| 170 | 123 | 0 | 1011111× | 0 | 5 | F |
| 171 | 123 | 1 | 77 | 0 | C | D |
| 172 | 160 | 0 | 1011000× | 0 | 5 | 8 |
| 173 | 160 | 1 | 1010111× | 0 | 5 | 7 |
| 174 | 173 | 0 | 80 | 0 | D | 0 |
| 175 | 173 | 1 | 78 | 0 | C | E |
| 176 | 172 | 0 | 82 | 0 | D | 2 |
| 177 | 172 | 1 | 81 | 0 | D | 1 |
| 178 | 158 | 0 | 1100000× | 0 | 6 | 0 |
| 179 | 158 | 1 | 1011010× | 0 | 5 | A |
| 180 | 179 | 0 | 1011110× | 0 | 5 | E |
| 181 | 179 | 1 | 1011011× | 0 | 5 | B |
| 182 | 181 | 0 | 84 | 0 | D | 4 |
| 183 | 181 | 1 | 83 | 0 | D | 3 |
| 184 | 132 | 0 | 1100101× | 0 | 6 | 5 |
| 185 | 132 | 1 | 1011101× | 0 | 5 | D |
| 186 | 185 | 0 | 88 | 0 | D | 8 |
| 187 | 185 | 1 | 85 | 0 | D | 5 |
| 188 | 180 | 0 | 89 | 0 | D | 9 |
| 189 | 180 | 1 | 86 | 0 | D | 6 |
| 190 | 170 | 0 | 1100110× | 0 | 6 | 6 |
| 191 | 170 | 1 | 87 | 0 | D | 7 |
| 192 | 178 | 0 | 1100100× | 0 | 6 | 4 |
| 193 | 178 | 1 | 1100001× | 0 | 6 | 1 |
| 194 | 193 | 0 | 91 | 0 | D | B |
| 195 | 193 | 1 | 90 | 0 | D | A |
| 196 | 99 | 0 | 1101100× | 0 | 6 | C |
| 197 | 99 | 1 | 1100011× | 0 | 6 | 3 |
| 198 | 197 | 0 | 95 | 0 | D | F |
| 199 | 197 | 1 | 92 | 0 | D | C |
| 200 | 192 | 0 | 96 | 0 | E | 0 |
| 201 | 192 | 1 | 93 | 0 | D | D |

```
202      184      Ø         97            Ø  E  1
203      184      1         94            Ø  D  E
204      190      Ø      1101110x         Ø  6  E
205      190      1      1100111x         Ø  6  7
206      205      Ø      1101001x         Ø  6  9
207      205      1      1101000x         Ø  6  8
208      207      Ø         99            Ø  E  3
209      207      1         98            Ø  E  2
210      206      Ø        102            Ø  E  6
211      206      1        100            Ø  E  4
212      109      Ø      1101101x         Ø  6  D
213      109      1      1101011x         Ø  6  B
214      213      Ø        103            Ø  E  7
215      213      1        101            Ø  E  5
216      196      Ø        114            Ø  F  2
217      196      1        104            Ø  E  8
218      212      Ø        113            Ø  F  1
219      212      1        105            Ø  E  9
220      204      Ø      1110000x         Ø  7  Ø
221      204      1      1101111x         Ø  6  F
222      221      Ø        107            Ø  E  B
223      221      1        106            Ø  E  A
224      220      Ø        109            Ø  E  D
225      220      1        108            Ø  E  C
226      125      Ø      1111001x         Ø  7  9
227      125      1      1110010x         Ø  7  2
228      227      Ø      1110110x         Ø  7  6
229      227      1      1110011x         Ø  7  3
230      229      Ø      1110101x         Ø  7  5
231      229      1      1110100x         Ø  7  4
232      231      Ø        111            Ø  E  F
233      231      1        110            Ø  E  E
234      230      Ø        115            Ø  F  3
235      230      1        112            Ø  F  Ø
236      228      Ø      1111000x         Ø  7  8
237      228      1      1110111x         Ø  7  7
238      237      Ø        117            Ø  F  5
239      237      1        116            Ø  F  4
240      236      Ø        119            Ø  F  7
241      236      1        118            Ø  F  6
242      226      Ø      1111101x         Ø  7  D
243      226      1      1111010x         Ø  7  A
244      243      Ø      1111100x         Ø  7  C
245      243      1      1111011x         Ø  7  B
246      245      Ø        121            Ø  F  9
247      245      1        120            Ø  F  8
248      244      Ø        123            Ø  F  B
249      244      1        122            Ø  F  A
250      242      Ø      1111111x         Ø  7  F
251      242      1      1111110x         Ø  7  E
252      251      Ø        126            Ø  F  E
253      251      1        124            Ø  F  C
254      250      Ø        128            1  8  Ø
255      250      1        127            Ø  F  F
```

```
                    © 1982 Bell & Howell
                      T A B L E    4

*** Entry * Father * Bit * Value or Sons * ROM Data: EOB,Z,E,T,D6-DØ ***

Ø      none     Ø      0000011x         Ø  Ø  3
     1      none     1      0000001x         Ø  Ø  1
     2        1      Ø      0000100x         Ø  Ø  4
     3        1      1      0000010x         Ø  Ø  2
     4        3      Ø      0001000x         Ø  Ø  8
     5        3      1         Ø             2  8  Ø
     6        Ø      Ø      0000101x         Ø  Ø  5
     7        Ø      1         1             Ø  8  1
     8        2      Ø      0000110x         Ø  Ø  6
     9        2      1         2             Ø  8  2
    10        6      Ø         3             Ø  8  3
    11        6      1      0000111x         Ø  Ø  7
    12        8      Ø      0001110x         Ø  Ø  E
    13        8      1         4             Ø  8  4
```

| | | | | | | |
|---|---|---|---|---|---|---|
| 14 | 11 | 0 | 0001011× | 0 | 0 | B |
| 15 | 11 | 1 | 5 | 0 | 8 | 5 |
| 16 | 4 | 0 | 0001010× | 0 | 0 | A |
| 17 | 4 | 1 | 0001001× | 0 | 0 | 9 |
| 18 | 17 | 0 | 6 | 0 | 8 | 6 |
| 19 | 17 | 1 | 0001100× | 0 | 0 | C |
| 20 | 16 | 0 | 7 | 0 | 8 | 7 |
| 21 | 16 | 1 | 0001101× | 0 | 0 | D |
| 22 | 14 | 0 | 0010100× | 0 | 1 | 4 |
| 23 | 14 | 1 | 8 | 0 | 8 | 8 |
| 24 | 19 | 0 | 9 | 0 | 8 | 9 |
| 25 | 19 | 1 | 0010000× | 0 | 1 | 0 |
| 26 | 21 | 0 | 10 | 0 | 8 | A |
| 27 | 21 | 1 | 0010111× | 0 | 1 | 7 |
| 28 | 12 | 0 | 0001111× | 0 | 0 | F |
| 29 | 12 | 1 | 0010001× | 0 | 1 | 1 |
| 30 | 28 | 0 | 12 | 0 | 8 | C |
| 31 | 28 | 1 | 11 | 0 | 8 | B |
| 32 | 25 | 0 | 13 | 0 | 8 | D |
| 33 | 25 | 1 | 0010110× | 0 | 1 | 6 |
| 34 | 29 | 0 | 0010011× | 0 | 1 | 3 |
| 35 | 29 | 1 | 0010010× | 0 | 1 | 2 |
| 36 | 35 | 0 | 0100000× | 0 | 2 | 0 |
| 37 | 35 | 1 | 14 | 0 | 8 | E |
| 38 | 34 | 0 | 15 | 0 | 8 | F |
| 39 | 34 | 1 | 0100010× | 0 | 2 | 2 |
| 40 | 22 | 0 | 0010101× | 0 | 1 | 5 |
| 41 | 22 | 1 | 0011010× | 0 | 1 | A |
| 42 | 40 | 0 | 0011101× | 0 | 1 | D |
| 43 | 40 | 1 | 16 | 0 | 9 | 0 |
| 44 | 33 | 0 | 0100110× | 0 | 2 | 6 |
| 45 | 33 | 1 | 17 | 0 | 9 | 1 |
| 46 | 27 | 0 | 0011001× | 0 | 1 | 9 |
| 47 | 27 | 1 | 0011000× | 0 | 1 | 8 |
| 48 | 47 | 0 | 0011110× | 0 | 1 | E |
| 49 | 47 | 1 | 18 | 0 | 9 | 2 |
| 50 | 46 | 0 | 0011111× | 0 | 1 | F |
| 51 | 46 | 1 | 19 | 0 | 9 | 3 |
| 52 | 41 | 0 | 0011100× | 0 | 1 | C |
| 53 | 41 | 1 | 0011011× | 0 | 1 | B |
| 54 | 53 | 0 | 22 | 0 | 9 | 6 |
| 55 | 53 | 1 | 20 | 0 | 9 | 4 |
| 56 | 52 | 0 | 21 | 0 | 9 | 5 |
| 57 | 52 | 1 | 0100100× | 0 | 2 | 4 |
| 58 | 42 | 0 | 23 | 0 | 9 | 7 |
| 59 | 42 | 1 | 0100101× | 0 | 2 | 5 |
| 60 | 48 | 0 | 24 | 0 | 9 | 8 |
| 61 | 48 | 1 | 0101000× | 0 | 2 | 8 |
| 62 | 50 | 0 | 25 | 0 | 9 | 9 |
| 63 | 50 | 1 | 0110100× | 0 | 3 | 4 |
| 64 | 36 | 0 | 0100001× | 0 | 2 | 1 |
| 65 | 36 | 1 | 0101001× | 0 | 2 | 9 |
| 66 | 64 | 0 | 0111001× | 0 | 3 | 9 |
| 67 | 64 | 1 | 26 | 0 | 9 | A |
| 68 | 39 | 0 | 0101100× | 0 | 2 | C |
| 69 | 39 | 1 | 0100011× | 0 | 2 | 3 |
| 70 | 69 | 0 | 0110000× | 0 | 3 | 0 |
| 71 | 69 | 1 | 27 | 0 | 9 | B |
| 72 | 57 | 0 | 0101110× | 0 | 2 | E |
| 73 | 57 | 1 | 28 | 0 | 9 | C |
| 74 | 59 | 0 | 29 | 0 | 9 | D |
| 75 | 59 | 1 | 0101111× | 0 | 2 | F |
| 76 | 44 | 0 | 0100111× | 0 | 2 | 7 |
| 77 | 44 | 1 | 0110001× | 0 | 3 | 1 |
| 78 | 76 | 0 | 0110011× | 0 | 3 | 3 |
| 79 | 76 | 1 | 30 | 0 | 9 | E |
| 80 | 61 | 0 | 31 | 0 | 9 | F |
| 81 | 61 | 1 | 0110111× | 0 | 3 | 7 |
| 82 | 65 | 0 | 0101010× | 0 | 2 | A |
| 83 | 65 | 1 | 0101011× | 0 | 2 | B |
| 84 | 82 | 0 | 33 | 0 | A | 1 |
| 85 | 82 | 1 | 32 | 0 | A | 0 |
| 86 | 83 | 0 | 34 | 0 | A | 2 |
| 87 | 83 | 1 | 0111101× | 0 | 3 | D |
| 88 | 68 | 0 | 0111111× | 0 | 3 | F |

| | | | | | | |
|---|---|---|---|---|---|---|
| 89 | 68 | 1 | 0101101× | 0 | 2 | D |
| 90 | 89 | 0 | 35 | 0 | A | 3 |
| 91 | 89 | 1 | 1001111× | 0 | 4 | F |
| 92 | 72 | 0 | 40 | 0 | A | 8 |
| 93 | 72 | 1 | 36 | 0 | A | 4 |
| 94 | 75 | 0 | 37 | 0 | A | 5 |
| 95 | 75 | 1 | 1000010× | 0 | 4 | 2 |
| 96 | 70 | 0 | 128 | 1 | 8 | 0 |
| 97 | 70 | 1 | 38 | 0 | A | 6 |
| 98 | 77 | 0 | 0111011× | 0 | 3 | B |
| 99 | 77 | 1 | 0110010× | 0 | 3 | 2 |
| 100 | 99 | 0 | 39 | 0 | A | 7 |
| 101 | 99 | 1 | 1001001× | 0 | 4 | 9 |
| 102 | 78 | 0 | 41 | 0 | A | 9 |
| 103 | 78 | 1 | 1000100× | 0 | 4 | 4 |
| 104 | 63 | 0 | 0110110× | 0 | 3 | 6 |
| 105 | 63 | 1 | 0110101× | 0 | 3 | 5 |
| 106 | 105 | 0 | 42 | 0 | A | A |
| 107 | 105 | 1 | 1001011× | 0 | 4 | B |
| 108 | 104 | 0 | 45 | 0 | A | D |
| 109 | 104 | 1 | 43 | 0 | A | B |
| 110 | 81 | 0 | 0111000× | 0 | 3 | 8 |
| 111 | 81 | 1 | 1011100× | 0 | 5 | C |
| 112 | 110 | 0 | 1100100× | 0 | 6 | 4 |
| 113 | 110 | 1 | 44 | 0 | A | C |
| 114 | 66 | 0 | 1001101× | 0 | 4 | D |
| 115 | 66 | 1 | 0111010× | 0 | 3 | A |
| 116 | 115 | 0 | 46 | 0 | A | E |
| 117 | 115 | 1 | 1000011× | 0 | 4 | 3 |
| 118 | 98 | 0 | 1000001× | 0 | 4 | 1 |
| 119 | 98 | 1 | 0111100× | 0 | 3 | C |
| 120 | 119 | 0 | 47 | 0 | A | F |
| 121 | 119 | 1 | 1010100× | 0 | 5 | 4 |
| 122 | 87 | 0 | 50 | 0 | B | 2 |
| 123 | 87 | 1 | 0111110× | 0 | 3 | E |
| 124 | 123 | 0 | 48 | 0 | B | 0 |
| 125 | 123 | 1 | 1100000× | 0 | 6 | 0 |
| 126 | 88 | 0 | 1000000× | 0 | 4 | 0 |
| 127 | 88 | 1 | 1000101× | 0 | 4 | 5 |
| 128 | 126 | 0 | 54 | 0 | B | 6 |
| 129 | 126 | 1 | 49 | 0 | B | 1 |
| 130 | 118 | 0 | 52 | 0 | B | 4 |
| 131 | 118 | 1 | 51 | 0 | B | 3 |
| 132 | 95 | 0 | 53 | 0 | B | 5 |
| 133 | 95 | 1 | 1011001× | 0 | 5 | 9 |
| 134 | 117 | 0 | 55 | 0 | B | 7 |
| 135 | 117 | 1 | 71 | 0 | C | 7 |
| 136 | 103 | 0 | 1000111× | 0 | 4 | 7 |
| 137 | 103 | 1 | 56 | 0 | B | 8 |
| 138 | 127 | 0 | 1010111× | 0 | 5 | 7 |
| 139 | 127 | 1 | 1000110× | 0 | 4 | 6 |
| 140 | 139 | 0 | 57 | 0 | B | 9 |
| 141 | 139 | 1 | 1100001× | 0 | 6 | 1 |
| 142 | 136 | 0 | 1011000× | 0 | 5 | 8 |
| 143 | 136 | 1 | 1001000× | 0 | 4 | 8 |
| 144 | 143 | 0 | 68 | 0 | C | 4 |
| 145 | 143 | 1 | 58 | 0 | B | A |
| 146 | 101 | 0 | 1001010× | 0 | 4 | A |
| 147 | 101 | 1 | 1101011× | 0 | 6 | B |
| 148 | 146 | 0 | 59 | 0 | B | B |
| 149 | 146 | 1 | 1111100× | 0 | 7 | C |
| 150 | 107 | 0 | 1010010× | 0 | 5 | 2 |
| 151 | 107 | 1 | 1001100× | 0 | 4 | C |
| 152 | 151 | 0 | 63 | 0 | B | F |
| 153 | 151 | 1 | 60 | 0 | B | C |
| 154 | 114 | 0 | 1010011× | 0 | 5 | 3 |
| 155 | 114 | 1 | 1001110× | 0 | 4 | E |
| 156 | 155 | 0 | 64 | 0 | C | 0 |
| 157 | 155 | 1 | 61 | 0 | B | D |
| 158 | 91 | 0 | 1010000× | 0 | 5 | 0 |
| 159 | 91 | 1 | 1010110× | 0 | 5 | 6 |
| 160 | 158 | 0 | 1010101× | 0 | 5 | 5 |
| 161 | 158 | 1 | 1010001× | 0 | 5 | 1 |
| 162 | 161 | 0 | 69 | 0 | C | 5 |
| 163 | 161 | 1 | 62 | 0 | B | E |

| | | | | | | |
|---|---|---|---|---|---|---|
| 164 | 150 | 0 | 72 | 0 | C | 8 |
| 165 | 150 | 1 | 65 | 0 | C | 1 |
| 166 | 154 | 0 | 70 | 0 | C | 6 |
| 167 | 154 | 1 | 66 | 0 | C | 2 |
| 168 | 121 | 0 | 75 | 0 | C | B |
| 169 | 121 | 1 | 67 | 0 | C | 3 |
| 170 | 160 | 0 | 80 | 0 | D | 0 |
| 171 | 160 | 1 | 73 | 0 | C | 9 |
| 172 | 159 | 0 | 83 | 0 | D | 3 |
| 173 | 159 | 1 | 74 | 0 | C | A |
| 174 | 138 | 0 | 81 | 0 | D | 1 |
| 175 | 138 | 1 | 76 | 0 | C | C |
| 176 | 142 | 0 | 78 | 0 | C | E |
| 177 | 142 | 1 | 77 | 0 | C | D |
| 178 | 133 | 0 | 1011010x | 0 | 5 | A |
| 179 | 133 | 1 | 1101000x | 0 | 6 | 8 |
| 180 | 178 | 0 | 1101010x | 0 | 6 | A |
| 181 | 178 | 1 | 1011011x | 0 | 5 | B |
| 182 | 181 | 0 | 79 | 0 | C | F |
| 183 | 181 | 1 | 1111010x | 0 | 7 | A |
| 184 | 111 | 0 | 1100010x | 0 | 6 | 2 |
| 185 | 111 | 1 | 1011101x | 0 | 5 | D |
| 186 | 185 | 0 | 1011111x | 0 | 5 | F |
| 187 | 185 | 1 | 1011110x | 0 | 5 | E |
| 188 | 187 | 0 | 84 | 0 | D | 4 |
| 189 | 187 | 1 | 82 | 0 | D | 2 |
| 190 | 186 | 0 | 87 | 0 | D | 7 |
| 191 | 186 | 1 | 85 | 0 | D | 5 |
| 192 | 125 | 0 | 106 | 0 | E | A |
| 193 | 125 | 1 | 86 | 0 | D | 6 |
| 194 | 141 | 0 | 92 | 0 | D | C |
| 195 | 141 | 1 | 88 | 0 | D | 8 |
| 196 | 184 | 0 | 1101001x | 0 | 6 | 9 |
| 197 | 184 | 1 | 1100011x | 0 | 6 | 3 |
| 198 | 197 | 0 | 91 | 0 | D | B |
| 199 | 197 | 1 | 89 | 0 | D | 9 |
| 200 | 112 | 0 | 1100101x | 0 | 6 | 5 |
| 201 | 112 | 1 | 1110010x | 0 | 7 | 2 |
| 202 | 200 | 0 | 1100110x | 0 | 6 | 6 |
| 203 | 200 | 1 | 123 | 0 | F | B |
| 204 | 202 | 0 | 1100111x | 0 | 6 | 7 |
| 205 | 202 | 1 | 127 | 0 | F | F |
| 206 | 204 | 0 | 98 | 0 | E | 2 |
| 207 | 204 | 1 | 90 | 0 | D | A |
| 208 | 179 | 0 | 1101110x | 0 | 6 | E |
| 209 | 179 | 1 | 93 | 0 | D | D |
| 210 | 196 | 0 | 102 | 0 | E | 6 |
| 211 | 196 | 1 | 94 | 0 | D | E |
| 212 | 180 | 0 | 96 | 0 | E | 0 |
| 213 | 180 | 1 | 95 | 0 | D | F |
| 214 | 147 | 0 | 1110011x | 0 | 7 | 3 |
| 215 | 147 | 1 | 1101100x | 0 | 6 | C |
| 216 | 215 | 0 | 1110001x | 0 | 7 | 1 |
| 217 | 215 | 1 | 1101101x | 0 | 6 | D |
| 218 | 217 | 0 | 100 | 0 | E | 4 |
| 219 | 217 | 1 | 97 | 0 | E | 1 |
| 220 | 208 | 0 | 1110110x | 0 | 7 | 6 |
| 221 | 208 | 1 | 1101111x | 0 | 6 | F |
| 222 | 221 | 0 | 1110101x | 0 | 7 | 5 |
| 223 | 221 | 1 | 1110000x | 0 | 7 | 0 |
| 224 | 223 | 0 | 103 | 0 | E | 7 |
| 225 | 223 | 1 | 99 | 0 | E | 3 |
| 226 | 216 | 0 | 105 | 0 | E | 9 |
| 227 | 216 | 1 | 101 | 0 | E | 5 |
| 228 | 201 | 0 | 114 | 0 | F | 2 |
| 229 | 201 | 1 | 104 | 0 | E | 8 |
| 230 | 214 | 0 | 1111001x | 0 | 7 | 9 |
| 231 | 214 | 1 | 1110100x | 0 | 7 | 4 |
| 232 | 231 | 0 | 111 | 0 | E | F |
| 233 | 231 | 1 | 107 | 0 | E | B |
| 234 | 222 | 0 | 109 | 0 | E | D |
| 235 | 222 | 1 | 108 | 0 | E | C |
| 236 | 220 | 0 | 1111000x | 0 | 7 | 8 |
| 237 | 220 | 1 | 1110111x | 0 | 7 | 7 |
| 238 | 237 | 0 | 112 | 0 | F | 0 |

| | | | | | | | |
|---|---|---|---|---|---|---|---|
| 239 | 237 | 1 | 110 | | Ø | E | E |
| 240 | 236 | Ø | 117 | | Ø | F | 5 |
| 241 | 236 | 1 | 113 | | Ø | F | 1 |
| 242 | 230 | Ø | 116 | | Ø | F | 4 |
| 243 | 230 | 1 | 115 | | Ø | F | 3 |
| 244 | 183 | Ø | 1111110x | | Ø | 7 | E |
| 245 | 183 | 1 | 1111011x | | Ø | 7 | B |
| 246 | 245 | Ø | 119 | | Ø | F | 7 |
| 247 | 245 | 1 | 118 | | Ø | F | 6 |
| 248 | 149 | Ø | 1111111x | | Ø | 7 | F |
| 249 | 149 | 1 | 1111101x | | Ø | 7 | D |
| 250 | 249 | Ø | 124 | | Ø | F | C |
| 251 | 249 | 1 | 120 | | Ø | F | 8 |
| 252 | 244 | Ø | 122 | | Ø | F | A |
| 253 | 244 | 1 | 121 | | Ø | F | 9 |
| 254 | 248 | Ø | 126 | | Ø | F | E |
| 255 | 248 | 1 | 125 | | Ø | F | D |

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
© 1982 Bell & Howell
T A B L E  5

Entry \* Father \* Bit \* Value or Sons \* ROM Data: EOB,Z,E,T,D6-DØ \*\*\*

| Entry | Father | Bit | Value or Sons | ROM Data | | |
|---|---|---|---|---|---|---|
| Ø | none | Ø | 0000011x | Ø | Ø | 3 |
| 1 | none | 1 | 0000001x | Ø | Ø | 1 |
| 2 | 1 | Ø | 0000010x | Ø | Ø | 2 |
| 3 | 1 | 1 | 0000101x | Ø | Ø | 5 |
| 4 | 2 | Ø | Ø | 2 | 8 | Ø |
| 5 | 2 | 1 | 1 | Ø | 8 | 1 |
| 6 | Ø | Ø | 0001000x | Ø | Ø | 8 |
| 7 | Ø | 1 | 0000100x | Ø | Ø | 4 |
| 8 | 7 | Ø | 2 | Ø | 8 | 2 |
| 9 | 7 | 1 | 0000111x | Ø | Ø | 7 |
| 10 | 3 | Ø | 0000110x | Ø | Ø | 6 |
| 11 | 3 | 1 | 0001011x | Ø | Ø | B |
| 12 | 10 | Ø | 0001101x | Ø | Ø | D |
| 13 | 10 | 1 | 3 | Ø | 8 | 3 |
| 14 | 9 | Ø | 0001110x | Ø | Ø | E |
| 15 | 9 | 1 | 4 | Ø | 8 | 4 |
| 16 | 6 | Ø | 0001010x | Ø | Ø | A |
| 17 | 6 | 1 | 0001001x | Ø | Ø | 9 |
| 18 | 17 | Ø | 5 | Ø | 8 | 5 |
| 19 | 17 | 1 | 0001111x | Ø | Ø | F |
| 20 | 16 | Ø | 6 | Ø | 8 | 6 |
| 21 | 16 | 1 | 0010000x | Ø | 1 | Ø |
| 22 | 11 | Ø | 0010010x | Ø | 1 | 2 |
| 23 | 11 | 1 | 0001100x | Ø | Ø | C |
| 24 | 23 | Ø | 7 | Ø | 8 | 7 |
| 25 | 23 | 1 | 0010001x | Ø | 1 | 1 |
| 26 | 12 | Ø | 8 | Ø | 8 | 8 |
| 27 | 12 | 1 | 0010100x | Ø | 1 | 4 |
| 28 | 14 | Ø | 9 | Ø | 8 | 9 |
| 29 | 14 | 1 | 0011011x | Ø | 1 | B |
| 30 | 19 | Ø | 0010110x | Ø | 1 | 6 |
| 31 | 19 | 1 | 10 | Ø | 8 | A |
| 32 | 21 | Ø | 11 | Ø | 8 | B |
| 33 | 21 | 1 | 0011110x | Ø | 1 | E |
| 34 | 25 | Ø | 12 | Ø | 8 | C |
| 35 | 25 | 1 | 0010111x | Ø | 1 | 7 |
| 36 | 22 | Ø | 0010101x | Ø | 1 | 5 |
| 37 | 22 | 1 | 0010011x | Ø | 1 | 3 |
| 38 | 37 | Ø | 13 | Ø | 8 | D |
| 39 | 37 | 1 | 0011001x | Ø | 1 | 9 |
| 40 | 27 | Ø | 0100010x | Ø | 2 | 2 |
| 41 | 27 | 1 | 14 | Ø | 8 | E |
| 42 | 36 | Ø | 15 | Ø | 8 | F |
| 43 | 36 | 1 | 0011000x | Ø | 1 | 8 |
| 44 | 30 | Ø | 16 | Ø | 9 | Ø |
| 45 | 30 | 1 | 0011010x | Ø | 1 | A |
| 46 | 35 | Ø | 17 | Ø | 9 | 1 |
| 47 | 35 | 1 | 0101110x | Ø | 2 | E |
| 48 | 43 | Ø | 0100000x | Ø | 2 | Ø |
| 49 | 43 | 1 | 18 | Ø | 9 | 2 |

| | | | | | | |
|---|---|---|---|---|---|---|
| 50 | 39 | 0 | 0100110x | 0 | 2 | 6 |
| 51 | 39 | 1 | 19 | 0 | 9 | 3 |
| 52 | 45 | 0 | 0101000x | 0 | 2 | 8 |
| 53 | 45 | 1 | 20 | 0 | 9 | 4 |
| 54 | 29 | 0 | 0011101x | 0 | 1 | D |
| 55 | 29 | 1 | 0011100x | 0 | 1 | C |
| 56 | 55 | 0 | 21 | 0 | 9 | 5 |
| 57 | 55 | 1 | 0100001x | 0 | 2 | 1 |
| 58 | 54 | 0 | 22 | 0 | 9 | 6 |
| 59 | 54 | 1 | 0110100x | 0 | 3 | 4 |
| 60 | 33 | 0 | 0011111x | 0 | 1 | F |
| 61 | 33 | 1 | 0100100x | 0 | 2 | 4 |
| 62 | 60 | 0 | 25 | 0 | 9 | 9 |
| 63 | 60 | 1 | 23 | 0 | 9 | 7 |
| 64 | 48 | 0 | 0110011x | 0 | 3 | 3 |
| 65 | 48 | 1 | 24 | 0 | 9 | 8 |
| 66 | 57 | 0 | 0101101x | 0 | 2 | D |
| 67 | 57 | 1 | 26 | 0 | 9 | A |
| 68 | 40 | 0 | 0101001x | 0 | 2 | 9 |
| 69 | 40 | 1 | 0100011x | 0 | 2 | 3 |
| 70 | 69 | 0 | 27 | 0 | 9 | B |
| 71 | 69 | 1 | 28 | 0 | 9 | C |
| 72 | 61 | 0 | 0101100x | 0 | 2 | C |
| 73 | 61 | 1 | 0100101x | 0 | 2 | 5 |
| 74 | 73 | 0 | 29 | 0 | 9 | D |
| 75 | 73 | 1 | 1001010x | 0 | 4 | A |
| 76 | 50 | 0 | 0101011x | 0 | 2 | B |
| 77 | 50 | 1 | 0100111x | 0 | 2 | 7 |
| 78 | 77 | 0 | 30 | 0 | 9 | E |
| 79 | 77 | 1 | 0111000x | 0 | 3 | 8 |
| 80 | 52 | 0 | 31 | 0 | 9 | F |
| 81 | 52 | 1 | 0110110x | 0 | 3 | 6 |
| 82 | 68 | 0 | 0111001x | 0 | 3 | 9 |
| 83 | 68 | 1 | 0101010x | 0 | 2 | A |
| 84 | 83 | 0 | 37 | 0 | A | 5 |
| 85 | 83 | 1 | 32 | 0 | A | 0 |
| 86 | 76 | 0 | 128 | 1 | 8 | 0 |
| 87 | 76 | 1 | 33 | 0 | A | 1 |
| 88 | 72 | 0 | 34 | 0 | A | 2 |
| 89 | 72 | 1 | 0110000x | 0 | 3 | 0 |
| 90 | 66 | 0 | 35 | 0 | A | 3 |
| 91 | 66 | 1 | 1011001x | 0 | 5 | 9 |
| 92 | 47 | 0 | 0110001x | 0 | 3 | 1 |
| 93 | 47 | 1 | 0101111x | 0 | 2 | F |
| 94 | 93 | 0 | 36 | 0 | A | 4 |
| 95 | 93 | 1 | 1000100x | 0 | 4 | 4 |
| 96 | 89 | 0 | 38 | 0 | A | 6 |
| 97 | 89 | 1 | 43 | 0 | A | B |
| 98 | 92 | 0 | 0110010x | 0 | 3 | 2 |
| 99 | 92 | 1 | 0111011x | 0 | 3 | B |
| 100 | 98 | 0 | 63 | 0 | B | F |
| 101 | 98 | 1 | 39 | 0 | A | 7 |
| 102 | 64 | 0 | 40 | 0 | A | 8 |
| 103 | 64 | 1 | 0111100x | 0 | 3 | C |
| 104 | 59 | 0 | 0110101x | 0 | 3 | 5 |
| 105 | 59 | 1 | 0111101x | 0 | 3 | D |
| 106 | 104 | 0 | 41 | 0 | A | 9 |
| 107 | 104 | 1 | 1000011x | 0 | 4 | 3 |
| 108 | 81 | 0 | 1000001x | 0 | 4 | 1 |
| 109 | 81 | 1 | 0110111x | 0 | 3 | 7 |
| 110 | 109 | 0 | 51 | 0 | B | 3 |
| 111 | 109 | 1 | 42 | 0 | A | A |
| 112 | 79 | 0 | 44 | 0 | A | C |
| 113 | 79 | 1 | 1001111x | 0 | 4 | F |
| 114 | 82 | 0 | 0111010x | 0 | 3 | A |
| 115 | 82 | 1 | 47 | 0 | A | F |
| 116 | 114 | 0 | 45 | 0 | A | D |
| 117 | 114 | 1 | 1010110x | 0 | 5 | 6 |
| 118 | 99 | 0 | 1001000x | 0 | 4 | 8 |
| 119 | 99 | 1 | 46 | 0 | A | E |
| 120 | 103 | 0 | 1001101x | 0 | 4 | D |
| 121 | 103 | 1 | 48 | 0 | B | 0 |
| 122 | 105 | 0 | 1000000x | 0 | 4 | 0 |
| 123 | 105 | 1 | 0111110x | 0 | 3 | E |
| 124 | 123 | 0 | 1000110x | 0 | 4 | 6 |
| 125 | 123 | 1 | 0111111x | 0 | 3 | F |
| 126 | 125 | 0 | 49 | 0 | B | 1 |

| | | | | | | | |
|---|---|---|---|---|---|---|---|
| 127 | 125 | 1 | 1110111x | Ø | 7 | 7 | |
| 128 | 122 | Ø | 50 | Ø | B | 2 | |
| 129 | 122 | 1 | 1011000x | Ø | 5 | 8 | |
| 130 | 108 | Ø | 1000010x | Ø | 4 | 2 | |
| 131 | 108 | 1 | 52 | Ø | B | 4 | |
| 132 | 130 | Ø | 53 | Ø | B | 5 | |
| 133 | 130 | 1 | 1010010x | Ø | 5 | 2 | |
| 134 | 107 | Ø | 58 | Ø | B | A | |
| 135 | 107 | 1 | 54 | Ø | B | 6 | |
| 136 | 95 | Ø | 1000111x | Ø | 4 | 7 | |
| 137 | 95 | 1 | 1000101x | Ø | 4 | 5 | |
| 138 | 137 | Ø | 55 | Ø | B | 7 | |
| 139 | 137 | 1 | 1110010x | Ø | 7 | 2 | |
| 140 | 124 | Ø | 60 | Ø | B | C | |
| 141 | 124 | 1 | 56 | Ø | B | 8 | |
| 142 | 136 | Ø | 1010100x | Ø | 5 | 4 | |
| 143 | 136 | 1 | 57 | Ø | B | 9 | |
| 144 | 118 | Ø | 1001001x | Ø | 4 | 9 | |
| 145 | 118 | 1 | 1101011x | Ø | 6 | B | |
| 146 | 144 | Ø | 59 | Ø | B | B | |
| 147 | 144 | 1 | 1110101x | Ø | 7 | 5 | |
| 148 | 75 | Ø | 1001110x | Ø | 4 | E | |
| 149 | 75 | 1 | 1001011x | Ø | 4 | B | |
| 150 | 149 | Ø | 1010001x | Ø | 5 | 1 | |
| 151 | 149 | 1 | 1001100x | Ø | 4 | C | |
| 152 | 151 | Ø | 66 | Ø | C | 2 | |
| 153 | 151 | 1 | 61 | Ø | B | D | |
| 154 | 120 | Ø | 64 | Ø | C | Ø | |
| 155 | 120 | 1 | 62 | Ø | B | E | |
| 156 | 148 | Ø | 1011101x | Ø | 5 | D | |
| 157 | 148 | 1 | 65 | Ø | C | 1 | |
| 158 | 113 | Ø | 1011100x | Ø | 5 | C | |
| 159 | 113 | 1 | 1010000x | Ø | 5 | Ø | |
| 160 | 159 | Ø | 73 | Ø | C | 9 | |
| 161 | 159 | 1 | 67 | Ø | C | 3 | |
| 162 | 150 | Ø | 69 | Ø | C | 5 | |
| 163 | 150 | 1 | 68 | Ø | C | 4 | |
| 164 | 133 | Ø | 1010011x | Ø | 5 | 3 | |
| 165 | 133 | 1 | 126 | Ø | F | E | |
| 166 | 164 | Ø | 82 | Ø | D | 2 | |
| 167 | 164 | 1 | 70 | Ø | C | 6 | |
| 168 | 142 | Ø | 1100100x | Ø | 6 | 4 | |
| 169 | 142 | 1 | 1010101x | Ø | 5 | 5 | |
| 170 | 169 | Ø | 71 | Ø | C | 7 | |
| 171 | 169 | 1 | 1111110x | Ø | 7 | E | |
| 172 | 117 | Ø | 1010111x | Ø | 5 | 7 | |
| 173 | 117 | 1 | 76 | Ø | C | C | |
| 174 | 172 | Ø | 72 | Ø | C | 8 | |
| 175 | 172 | 1 | 1011111x | Ø | 5 | F | |
| 176 | 129 | Ø | 84 | Ø | D | 4 | |
| 177 | 129 | 1 | 74 | Ø | C | A | |
| 178 | 91 | Ø | 1100010x | Ø | 6 | 2 | |
| 179 | 91 | 1 | 1011010x | Ø | 5 | A | |
| 180 | 179 | Ø | 1011110x | Ø | 5 | E | |
| 181 | 179 | 1 | 1011011x | Ø | 5 | B | |
| 182 | 181 | Ø | 77 | Ø | C | D | |
| 183 | 181 | 1 | 75 | Ø | C | B | |
| 184 | 158 | Ø | 108 | Ø | E | C | |
| 185 | 158 | 1 | 78 | Ø | C | E | |
| 186 | 156 | Ø | 1100110x | Ø | 6 | 6 | |
| 187 | 156 | 1 | 79 | Ø | C | F | |
| 188 | 180 | Ø | 83 | Ø | D | 3 | |
| 189 | 180 | 1 | 80 | Ø | D | Ø | |
| 190 | 175 | Ø | 1100000x | Ø | 6 | Ø | |
| 191 | 175 | 1 | 1101000x | Ø | 6 | 8 | |
| 192 | 190 | Ø | 1100001x | Ø | 6 | 1 | |
| 193 | 190 | 1 | 1111100x | Ø | 7 | C | |
| 194 | 192 | Ø | 91 | Ø | D | B | |
| 195 | 192 | 1 | 81 | Ø | D | 1 | |
| 196 | 178 | Ø | 1100101x | Ø | 6 | 5 | |
| 197 | 178 | 1 | 1100011x | Ø | 6 | 3 | |
| 198 | 197 | Ø | 86 | Ø | D | 6 | |
| 199 | 197 | 1 | 85 | Ø | D | 5 | |
| 200 | 168 | Ø | 93 | Ø | D | D | |
| 201 | 168 | 1 | 87 | Ø | D | 7 | |
| 202 | 196 | Ø | 102 | Ø | E | 6 | |

| Entry | Father | Bit | Value or Sons | ROM Data: EOB,Z,E,T,D6-D0 | | |
|---|---|---|---|---|---|---|
| 203 | 196 | 1 | 88 | 0 | D | 8 |
| 204 | 186 | 0 | 1101101x | 0 | 6 | D |
| 205 | 186 | 1 | 1100111x | 0 | 6 | 7 |
| 206 | 205 | 0 | 90 | 0 | D | A |
| 207 | 205 | 1 | 89 | 0 | D | 9 |
| 208 | 191 | 0 | 1110000x | 0 | 7 | 0 |
| 209 | 191 | 1 | 1101001x | 0 | 6 | 9 |
| 210 | 209 | 0 | 1101110x | 0 | 6 | E |
| 211 | 209 | 1 | 1101010x | 0 | 6 | A |
| 212 | 211 | 0 | 95 | 0 | D | F |
| 213 | 211 | 1 | 92 | 0 | D | C |
| 214 | 145 | 0 | 1101111x | 0 | 6 | F |
| 215 | 145 | 1 | 1101100x | 0 | 6 | C |
| 216 | 215 | 0 | 99 | 0 | E | 3 |
| 217 | 215 | 1 | 94 | 0 | D | E |
| 218 | 204 | 0 | 98 | 0 | E | 2 |
| 219 | 204 | 1 | 96 | 0 | E | 0 |
| 220 | 210 | 0 | 103 | 0 | E | 7 |
| 221 | 210 | 1 | 97 | 0 | E | 1 |
| 222 | 214 | 0 | 101 | 0 | E | 5 |
| 223 | 214 | 1 | 100 | 0 | E | 4 |
| 224 | 208 | 0 | 1111011x | 0 | 7 | B |
| 225 | 208 | 1 | 1110001x | 0 | 7 | 1 |
| 226 | 225 | 0 | 111 | 0 | E | F |
| 227 | 225 | 1 | 104 | 0 | E | 8 |
| 228 | 139 | 0 | 1111000x | 0 | 7 | 8 |
| 229 | 139 | 1 | 1110011x | 0 | 7 | 3 |
| 230 | 229 | 0 | 1110110x | 0 | 7 | 6 |
| 231 | 229 | 1 | 1110100x | 0 | 7 | 4 |
| 232 | 231 | 0 | 106 | 0 | E | A |
| 233 | 231 | 1 | 105 | 0 | E | 9 |
| 234 | 147 | 0 | 109 | 0 | E | D |
| 235 | 147 | 1 | 107 | 0 | E | B |
| 236 | 230 | 0 | 113 | 0 | F | 1 |
| 237 | 230 | 1 | 110 | 0 | E | E |
| 238 | 127 | 0 | 118 | 0 | F | 6 |
| 239 | 127 | 1 | 112 | 0 | F | 0 |
| 240 | 228 | 0 | 1111010x | 0 | 7 | A |
| 241 | 228 | 1 | 1111001x | 0 | 7 | 9 |
| 242 | 241 | 0 | 115 | 0 | F | 3 |
| 243 | 241 | 1 | 114 | 0 | F | 2 |
| 244 | 240 | 0 | 120 | 0 | F | 8 |
| 245 | 240 | 1 | 116 | 0 | F | 4 |
| 246 | 224 | 0 | 119 | 0 | F | 7 |
| 247 | 224 | 1 | 117 | 0 | F | 5 |
| 248 | 193 | 0 | 1111111x | 0 | 7 | F |
| 249 | 193 | 1 | 1111101x | 0 | 7 | D |
| 250 | 249 | 0 | 123 | 0 | F | B |
| 251 | 249 | 1 | 121 | 0 | F | 9 |
| 252 | 171 | 0 | 125 | 0 | F | D |
| 253 | 171 | 1 | 122 | 0 | F | A |
| 254 | 248 | 0 | 127 | 0 | F | F |
| 255 | 248 | 1 | 124 | 0 | F | C |

*********************************************************************

© 1982 Bell & Howell

TABLE 6

\*\*\* Entry \* Father \* Bit \* Value or Sons \* ROM Data: EOB,Z,E,T,D6-D0 \*\*\*

| Entry | Father | Bit | Value or Sons | ROM Data | | |
|---|---|---|---|---|---|---|
| 0 | none | 0 | 0000011x | 0 | 0 | 3 |
| 1 | none | 1 | 0000001x | 0 | 0 | 1 |
| 2 | 1 | 0 | 0000010x | 0 | 0 | 2 |
| 3 | 1 | 1 | 0000101x | 0 | 0 | 5 |
| 4 | 2 | 0 | 0000111x | 0 | 0 | 7 |
| 5 | 2 | 1 | 0 | 2 | 8 | 0 |
| 6 | 0 | 0 | 0000100x | 0 | 0 | 4 |
| 7 | 0 | 1 | 0001000x | 0 | 0 | 8 |
| 8 | 6 | 0 | 0010000x | 0 | 1 | 0 |
| 9 | 6 | 1 | 1 | 0 | 8 | 1 |
| 10 | 3 | 0 | 0001011x | 0 | 0 | B |
| 11 | 3 | 1 | 0000110x | 0 | 0 | 6 |
| 12 | 11 | 0 | 2 | 0 | 8 | 2 |
| 13 | 11 | 1 | 0001010x | 0 | 0 | A |
| 14 | 4 | 0 | 3 | 0 | 8 | 3 |
| 15 | 4 | 1 | 0001110x | 0 | 0 | E |
| 16 | 7 | 0 | 0001001x | 0 | 0 | 9 |

| | | | | | | |
|---|---|---|---|---|---|---|
| 17 | 7 | 1 | 0010101× | 0 | 1 | 5 |
| 18 | 16 | 0 | 0001111× | 0 | 0 | F |
| 19 | 16 | 1 | 4 | 0 | 8 | 4 |
| 20 | 13 | 0 | 0011111× | 0 | 1 | F |
| 21 | 13 | 1 | 5 | 0 | 8 | 5 |
| 22 | 10 | 0 | 0001101× | 0 | 0 | D |
| 23 | 10 | 1 | 0001100× | 0 | 0 | C |
| 24 | 23 | 0 | 0010100× | 0 | 1 | 4 |
| 25 | 23 | 1 | 6 | 0 | 8 | 6 |
| 26 | 22 | 0 | 0010011× | 0 | 1 | 3 |
| 27 | 22 | 1 | 7 | 0 | 8 | 7 |
| 28 | 15 | 0 | 8 | 0 | 8 | 8 |
| 29 | 15 | 1 | 0011011× | 0 | 1 | B |
| 30 | 18 | 0 | 0100101× | 0 | 2 | 5 |
| 31 | 18 | 1 | 9 | 0 | 8 | 9 |
| 32 | 8 | 0 | 0010001× | 0 | 1 | 1 |
| 33 | 8 | 1 | 0010010× | 0 | 1 | 2 |
| 34 | 32 | 0 | 0011101× | 0 | 1 | D |
| 35 | 32 | 1 | 10 | 0 | 8 | A |
| 36 | 33 | 0 | 0011100× | 0 | 1 | C |
| 37 | 33 | 1 | 11 | 0 | 8 | B |
| 38 | 26 | 0 | 0101101× | 0 | 2 | D |
| 39 | 26 | 1 | 12 | 0 | 8 | C |
| 40 | 24 | 0 | 0100010× | 0 | 2 | 2 |
| 41 | 24 | 1 | 13 | 0 | 8 | D |
| 42 | 17 | 0 | 0010110× | 0 | 1 | 6 |
| 43 | 17 | 1 | 0011011× | 0 | 1 | B |
| 44 | 42 | 0 | 0011110× | 0 | 1 | E |
| 45 | 42 | 1 | 0010111× | 0 | 1 | 7 |
| 46 | 45 | 0 | 14 | 0 | 8 | E |
| 47 | 45 | 1 | 0100001× | 0 | 2 | 1 |
| 48 | 43 | 0 | 0011010× | 0 | 1 | A |
| 49 | 43 | 1 | 0011001× | 0 | 1 | 9 |
| 50 | 49 | 0 | 15 | 0 | 8 | F |
| 51 | 49 | 1 | 16 | 0 | 9 | 0 |
| 52 | 48 | 0 | 17 | 0 | 9 | 1 |
| 53 | 48 | 1 | 0101001× | 0 | 2 | 9 |
| 54 | 29 | 0 | 0100011× | 0 | 2 | 3 |
| 55 | 29 | 1 | 18 | 0 | 9 | 2 |
| 56 | 36 | 0 | 19 | 0 | 9 | 3 |
| 57 | 36 | 1 | 0101000× | 0 | 2 | 8 |
| 58 | 34 | 0 | 0101010× | 0 | 2 | A |
| 59 | 34 | 1 | 20 | 0 | 9 | 4 |
| 60 | 44 | 0 | 0101111× | 0 | 2 | F |
| 61 | 44 | 1 | 21 | 0 | 9 | 5 |
| 62 | 20 | 0 | 0100100× | 0 | 2 | 4 |
| 63 | 20 | 1 | 0100000× | 0 | 2 | 0 |
| 64 | 63 | 0 | 22 | 0 | 9 | 6 |
| 65 | 63 | 1 | 0100111× | 0 | 2 | 7 |
| 66 | 47 | 0 | 26 | 0 | 9 | A |
| 67 | 47 | 1 | 23 | 0 | 9 | 7 |
| 68 | 40 | 0 | 24 | 0 | 9 | B |
| 69 | 40 | 1 | 0111011× | 0 | 3 | B |
| 70 | 54 | 0 | 0110001× | 0 | 3 | 1 |
| 71 | 54 | 1 | 25 | 0 | 9 | 9 |
| 72 | 62 | 0 | 27 | 0 | 9 | B |
| 73 | 62 | 1 | 0101100× | 0 | 2 | C |
| 74 | 30 | 0 | 0101011× | 0 | 2 | B |
| 75 | 30 | 1 | 0100110× | 0 | 2 | 6 |
| 76 | 75 | 0 | 29 | 0 | 9 | D |
| 77 | 75 | 1 | 28 | 0 | 9 | C |
| 78 | 65 | 0 | 0110110× | 0 | 3 | 6 |
| 79 | 65 | 1 | 30 | 0 | 9 | E |
| 80 | 57 | 0 | 0110100× | 0 | 3 | 4 |
| 81 | 57 | 1 | 31 | 0 | 9 | F |
| 82 | 53 | 0 | 0110010× | 0 | 3 | 2 |
| 83 | 53 | 1 | 32 | 0 | A | 0 |
| 84 | 58 | 0 | 0111000× | 0 | 3 | 8 |
| 85 | 58 | 1 | 33 | 0 | A | 1 |
| 86 | 74 | 0 | 0111001× | 0 | 3 | 9 |
| 87 | 74 | 1 | 34 | 0 | A | 2 |
| 88 | 73 | 0 | 0110101× | 0 | 3 | 5 |
| 89 | 73 | 1 | 35 | 0 | A | 3 |
| 90 | 38 | 0 | 0101110× | 0 | 2 | E |
| 91 | 38 | 1 | 0111111× | 0 | 3 | F |
| 92 | 90 | 0 | 36 | 0 | A | 4 |

| | | | | | | |
|---|---|---|---|---|---|---|
| 93 | 90 | 1 | 1000010x | 0 | 4 | 2 |
| 94 | 60 | 0 | 0110011x | 0 | 3 | 3 |
| 95 | 60 | 1 | 0110000x | 0 | 3 | 0 |
| 96 | 95 | 0 | 39 | 0 | A | 7 |
| 97 | 95 | 1 | 37 | 0 | A | 5 |
| 98 | 70 | 0 | 38 | 0 | A | 6 |
| 99 | 70 | 1 | 0110111x | 0 | 3 | 7 |
| 100 | 82 | 0 | 1001010x | 0 | 4 | A |
| 101 | 82 | 1 | 40 | 0 | A | B |
| 102 | 94 | 0 | 43 | 0 | A | B |
| 103 | 94 | 1 | 41 | 0 | A | 9 |
| 104 | 80 | 0 | 45 | 0 | A | D |
| 105 | 80 | 1 | 42 | 0 | A | A |
| 106 | 88 | 0 | 44 | 0 | A | C |
| 107 | 88 | 1 | 0111110x | 0 | 3 | E |
| 108 | 78 | 0 | 47 | 0 | A | F |
| 109 | 78 | 1 | 46 | 0 | A | E |
| 110 | 99 | 0 | 1001100x | 0 | 4 | C |
| 111 | 99 | 1 | 48 | 0 | B | 0 |
| 112 | 84 | 0 | 0111101x | 0 | 3 | D |
| 113 | 84 | 1 | 49 | 0 | B | 1 |
| 114 | 86 | 0 | 126 | 1 | 8 | 0 |
| 115 | 86 | 1 | 0111010x | 0 | 3 | A |
| 116 | 115 | 0 | 70 | 0 | C | 6 |
| 117 | 115 | 1 | 50 | 0 | B | 2 |
| 118 | 69 | 0 | 1000100x | 0 | 4 | 4 |
| 119 | 69 | 1 | 0111100x | 0 | 3 | C |
| 120 | 119 | 0 | 1100101x | 0 | 6 | 5 |
| 121 | 119 | 1 | 51 | 0 | B | 3 |
| 122 | 112 | 0 | 52 | 0 | B | 4 |
| 123 | 112 | 1 | 1000111x | 0 | 4 | 7 |
| 124 | 107 | 0 | 1011000x | 0 | 5 | 8 |
| 125 | 107 | 1 | 53 | 0 | B | 5 |
| 126 | 91 | 0 | 1000000x | 0 | 4 | 0 |
| 127 | 91 | 1 | 1010100x | 0 | 5 | 4 |
| 128 | 126 | 0 | 1000001x | 0 | 4 | 1 |
| 129 | 126 | 1 | 1101001x | 0 | 6 | 9 |
| 130 | 128 | 0 | 55 | 0 | B | 7 |
| 131 | 128 | 1 | 54 | 0 | B | 6 |
| 132 | 93 | 0 | 1001001x | 0 | 4 | 9 |
| 133 | 93 | 1 | 1000011x | 0 | 4 | 3 |
| 134 | 133 | 0 | 57 | 0 | B | 9 |
| 135 | 133 | 1 | 56 | 0 | B | 8 |
| 136 | 118 | 0 | 1001101x | 0 | 4 | D |
| 137 | 118 | 1 | 1000101x | 0 | 4 | 5 |
| 138 | 137 | 0 | 1000110x | 0 | 4 | 6 |
| 139 | 137 | 1 | 1111000x | 0 | 7 | 8 |
| 140 | 138 | 0 | 65 | 0 | C | 1 |
| 141 | 138 | 1 | 58 | 0 | B | A |
| 142 | 123 | 0 | 1001000x | 0 | 4 | 8 |
| 143 | 123 | 1 | 96 | 0 | E | 0 |
| 144 | 142 | 0 | 73 | 0 | C | 9 |
| 145 | 142 | 1 | 59 | 0 | B | B |
| 146 | 132 | 0 | 63 | 0 | B | F |
| 147 | 132 | 1 | 60 | 0 | B | C |
| 148 | 100 | 0 | 1001011x | 0 | 4 | B |
| 149 | 100 | 1 | 61 | 0 | B | D |
| 150 | 148 | 0 | 79 | 0 | C | F |
| 151 | 148 | 1 | 62 | 0 | B | E |
| 152 | 110 | 0 | 1010000x | 0 | 5 | 0 |
| 153 | 110 | 1 | 64 | 0 | C | 0 |
| 154 | 136 | 0 | 1001111x | 0 | 4 | F |
| 155 | 136 | 1 | 1001110x | 0 | 4 | E |
| 156 | 155 | 0 | 67 | 0 | C | 3 |
| 157 | 155 | 1 | 66 | 0 | C | 2 |
| 158 | 154 | 0 | 69 | 0 | C | 5 |
| 159 | 154 | 1 | 68 | 0 | C | 4 |
| 160 | 152 | 0 | 1010001x | 0 | 5 | 1 |
| 161 | 152 | 1 | 1011111x | 0 | 5 | F |
| 162 | 160 | 0 | 1011100x | 0 | 5 | C |
| 163 | 160 | 1 | 1010010x | 0 | 5 | 2 |
| 164 | 163 | 0 | 1010011x | 0 | 5 | 3 |
| 165 | 163 | 1 | 1111100x | 0 | 7 | C |
| 166 | 164 | 0 | 80 | 0 | D | 0 |
| 167 | 164 | 1 | 71 | 0 | C | 7 |
| 168 | 127 | 0 | 1011010x | 0 | 5 | A |

| | | | | | | |
|---|---|---|---|---|---|---|
| 169 | 127 | 1 | 1010101x | 0 | 5 | 5 |
| 170 | 169 | 0 | 1010111x | 0 | 5 | 7 |
| 171 | 169 | 1 | 1010110x | 0 | 5 | 6 |
| 172 | 171 | 0 | 74 | 0 | C | A |
| 173 | 171 | 1 | 72 | 0 | C | 8 |
| 174 | 170 | 0 | 76 | 0 | C | C |
| 175 | 170 | 1 | 75 | 0 | C | B |
| 176 | 124 | 0 | 1100011x | 0 | 6 | 3 |
| 177 | 124 | 1 | 1011001x | 0 | 5 | 9 |
| 178 | 177 | 0 | 85 | 0 | D | 5 |
| 179 | 177 | 1 | 77 | 0 | C | D |
| 180 | 168 | 0 | 1100100x | 0 | 6 | 4 |
| 181 | 168 | 1 | 1011011x | 0 | 5 | B |
| 182 | 181 | 0 | 82 | 0 | D | 2 |
| 183 | 181 | 1 | 78 | 0 | C | E |
| 184 | 162 | 0 | 1011110x | 0 | 5 | E |
| 185 | 162 | 1 | 1011101x | 0 | 5 | D |
| 186 | 185 | 0 | 83 | 0 | D | 3 |
| 187 | 185 | 1 | 81 | 0 | D | 1 |
| 188 | 184 | 0 | 86 | 0 | D | 6 |
| 189 | 184 | 1 | 84 | 0 | D | 4 |
| 190 | 161 | 0 | 1110001x | 0 | 7 | 1 |
| 191 | 161 | 1 | 1100000x | 0 | 6 | 0 |
| 192 | 191 | 0 | 1101110x | 0 | 6 | E |
| 193 | 191 | 1 | 1100001x | 0 | 6 | 1 |
| 194 | 193 | 0 | 1101000x | 0 | 6 | 8 |
| 195 | 193 | 1 | 1100010x | 0 | 6 | 2 |
| 196 | 195 | 0 | 91 | 0 | D | B |
| 197 | 195 | 1 | 87 | 0 | D | 7 |
| 198 | 176 | 0 | 89 | 0 | D | 9 |
| 199 | 176 | 1 | 88 | 0 | D | 8 |
| 200 | 180 | 0 | 92 | 0 | D | C |
| 201 | 180 | 1 | 90 | 0 | D | A |
| 202 | 120 | 0 | 1101100x | 0 | 6 | C |
| 203 | 120 | 1 | 1100110x | 0 | 6 | 6 |
| 204 | 203 | 0 | 1101011x | 0 | 6 | B |
| 205 | 203 | 1 | 1100111x | 0 | 6 | 7 |
| 206 | 205 | 0 | 97 | 0 | E | 1 |
| 207 | 205 | 1 | 93 | 0 | D | D |
| 208 | 194 | 0 | 101 | 0 | E | 5 |
| 209 | 194 | 1 | 94 | 0 | D | E |
| 210 | 129 | 0 | 1111111x | 0 | 7 | F |
| 211 | 129 | 1 | 1101010x | 0 | 6 | A |
| 212 | 211 | 0 | 113 | 0 | F | 1 |
| 213 | 211 | 1 | 95 | 0 | D | F |
| 214 | 204 | 0 | 99 | 0 | E | 3 |
| 215 | 204 | 1 | 98 | 0 | E | 2 |
| 216 | 202 | 0 | 1110101x | 0 | 7 | 5 |
| 217 | 202 | 1 | 1101101x | 0 | 6 | D |
| 218 | 217 | 0 | 105 | 0 | E | 9 |
| 219 | 217 | 1 | 100 | 0 | E | 4 |
| 220 | 192 | 0 | 1110000x | 0 | 7 | 0 |
| 221 | 192 | 1 | 1101111x | 0 | 6 | F |
| 222 | 221 | 0 | 103 | 0 | E | 7 |
| 223 | 221 | 1 | 102 | 0 | E | 6 |
| 224 | 220 | 0 | 106 | 0 | E | A |
| 225 | 220 | 1 | 104 | 0 | E | 8 |
| 226 | 190 | 0 | 1110110x | 0 | 7 | 6 |
| 227 | 190 | 1 | 1110010x | 0 | 7 | 2 |
| 228 | 227 | 0 | 1110100x | 0 | 7 | 4 |
| 229 | 227 | 1 | 1110011x | 0 | 7 | 3 |
| 230 | 229 | 0 | 108 | 0 | E | C |
| 231 | 229 | 1 | 107 | 0 | E | B |
| 232 | 228 | 0 | 112 | 0 | F | 0 |
| 233 | 228 | 1 | 109 | 0 | E | D |
| 234 | 216 | 0 | 111 | 0 | E | F |
| 235 | 216 | 1 | 110 | 0 | E | E |
| 236 | 226 | 0 | 1111010x | 0 | 7 | A |
| 237 | 226 | 1 | 1110111x | 0 | 7 | 7 |
| 238 | 237 | 0 | 115 | 0 | F | 3 |
| 239 | 237 | 1 | 114 | 0 | F | 2 |
| 240 | 139 | 0 | 1111011x | 0 | 7 | B |
| 241 | 139 | 1 | 1111001x | 0 | 7 | 9 |
| 242 | 241 | 0 | 117 | 0 | F | 5 |
| 243 | 241 | 1 | 116 | 0 | F | 4 |
| 244 | 236 | 0 | 120 | 0 | F | 8 |
| 245 | 236 | 1 | 118 | 0 | F | 6 |

| | | | | | | | |
|---|---|---|---|---|---|---|---|
| 246 | 240 | 0 | | 122 | 0 | F | A |
| 247 | 240 | 1 | | 119 | 0 | F | 7 |
| 248 | 165 | 0 | 111110x | | 0 | 7 | E |
| 249 | 165 | 1 | 111101x | | 0 | 7 | D |
| 250 | 249 | 0 | | 123 | 0 | F | B |
| 251 | 249 | 1 | | 121 | 0 | F | 9 |
| 252 | 248 | 0 | | 126 | 0 | F | E |
| 253 | 248 | 1 | | 124 | 0 | F | C |
| 254 | 210 | 0 | | 127 | 0 | F | F |
| 255 | 210 | 1 | | 125 | 0 | F | D |

*************************************************************

© 1982 Bell & Howell

T A B L E   7

Entry * Father * Bit * Value or Sons * ROM Data: EOB,Z,E,T,D6-D0 ***

| Entry | Father | Bit | Value or Sons | ROM Data |
|---|---|---|---|---|
| 0 | none | 0 | 0000111x | 0 0 7 |
| 1 | none | 1 | 0000001x | 0 0 1 |
| 2 | 1 | 0 | 0000100x | 0 0 4 |
| 3 | 1 | 1 | 0000010x | 0 0 2 |
| 4 | 3 | 0 | 0000011x | 0 0 3 |
| 5 | 3 | 1 | 0001100x | 0 0 C |
| 6 | 4 | 0 | 0001111x | 0 0 F |
| 7 | 4 | 1 | 0 | 2 8 0 |
| 8 | 2 | 0 | 0000101x | 0 0 5 |
| 9 | 2 | 1 | 0010000x | 0 1 0 |
| 10 | 8 | 0 | 0000110x | 0 0 6 |
| 11 | 8 | 1 | 0001011x | 0 0 B |
| 12 | 10 | 0 | 0011110x | 0 1 E |
| 13 | 10 | 1 | 1 | 0 8 1 |
| 14 | 0 | 0 | 0010101x | 0 1 5 |
| 15 | 0 | 1 | 0001000x | 0 0 8 |
| 16 | 15 | 0 | 0011010x | 0 1 A |
| 17 | 15 | 1 | 0001001x | 0 0 9 |
| 18 | 17 | 0 | 0010011x | 0 1 3 |
| 19 | 17 | 1 | 0001010x | 0 0 A |
| 20 | 19 | 0 | 0011111x | 0 1 F |
| 21 | 19 | 1 | 2 | 0 8 2 |
| 22 | 11 | 0 | 3 | 0 8 3 |
| 23 | 11 | 1 | 0011001x | 0 1 9 |
| 24 | 5 | 0 | 0001101x | 0 0 D |
| 25 | 5 | 1 | 0001110x | 0 0 E |
| 26 | 24 | 0 | 4 | 0 8 4 |
| 27 | 24 | 1 | 6 | 0 8 6 |
| 28 | 25 | 0 | 0010100x | 0 1 4 |
| 29 | 25 | 1 | 5 | 0 8 5 |
| 30 | 6 | 0 | 7 | 0 8 7 |
| 31 | 6 | 1 | 0100011x | 0 2 3 |
| 32 | 9 | 0 | 0010001x | 0 1 1 |
| 33 | 9 | 1 | 0010010x | 0 1 2 |
| 34 | 32 | 0 | 8 | 0 8 8 |
| 35 | 32 | 1 | 9 | 0 8 9 |
| 36 | 33 | 0 | 10 | 0 8 A |
| 37 | 33 | 1 | 0011101x | 0 1 D |
| 38 | 18 | 0 | 11 | 0 8 B |
| 39 | 18 | 1 | 0100101x | 0 2 5 |
| 40 | 28 | 0 | 0101110x | 0 2 E |
| 41 | 28 | 1 | 12 | 0 8 C |
| 42 | 14 | 0 | 0100000x | 0 2 0 |
| 43 | 14 | 1 | 0010110x | 0 1 6 |
| 44 | 43 | 0 | 0010111x | 0 1 7 |
| 45 | 43 | 1 | 0011000x | 0 1 8 |
| 46 | 44 | 0 | 14 | 0 8 E |
| 47 | 44 | 1 | 13 | 0 8 D |
| 48 | 45 | 0 | 0101011x | 0 2 B |
| 49 | 45 | 1 | 15 | 0 8 F |
| 50 | 23 | 0 | 16 | 0 9 0 |
| 51 | 23 | 1 | 24 | 0 9 8 |
| 52 | 16 | 0 | 0011011x | 0 1 B |
| 53 | 16 | 1 | 0100110x | 0 2 6 |
| 54 | 52 | 0 | 0101010x | 0 2 A |
| 55 | 52 | 1 | 0011100x | 0 1 C |
| 56 | 55 | 0 | 17 | 0 9 1 |
| 57 | 55 | 1 | 29 | 0 9 D |
| 58 | 37 | 0 | 0110111x | 0 3 7 |
| 59 | 37 | 1 | 18 | 0 9 2 |

| | | | | | | |
|---|---|---|---|---|---|---|
| 60 | 12 | 0 | 28 | 0 | 9 | C |
| 61 | 12 | 1 | 19 | 0 | 9 | 3 |
| 62 | 20 | 0 | 20 | 0 | 9 | 4 |
| 63 | 20 | 1 | 0110000× | 0 | 3 | 0 |
| 64 | 42 | 0 | 0101000× | 0 | 2 | 8 |
| 65 | 42 | 1 | 0100001× | 0 | 2 | 1 |
| 66 | 65 | 0 | 0101111× | 0 | 2 | F |
| 67 | 65 | 1 | 0100010× | 0 | 2 | 2 |
| 68 | 67 | 0 | 39 | 0 | A | 7 |
| 69 | 67 | 1 | 21 | 0 | 9 | 5 |
| 70 | 31 | 0 | 33 | 0 | A | 1 |
| 71 | 31 | 1 | 0100100× | 0 | 2 | 4 |
| 72 | 71 | 0 | 53 | 0 | B | 5 |
| 73 | 71 | 1 | 22 | 0 | 9 | 6 |
| 74 | 39 | 0 | 23 | 0 | 9 | 7 |
| 75 | 39 | 1 | 26 | 0 | 9 | A |
| 76 | 53 | 0 | 0100111× | 0 | 2 | 7 |
| 77 | 53 | 1 | 0101101× | 0 | 2 | D |
| 78 | 76 | 0 | 0110001× | 0 | 3 | 1 |
| 79 | 76 | 1 | 25 | 0 | 9 | 9 |
| 80 | 64 | 0 | 0101100× | 0 | 2 | C |
| 81 | 64 | 1 | 0101001× | 0 | 2 | 9 |
| 82 | 81 | 0 | 27 | 0 | 9 | B |
| 83 | 81 | 1 | 52 | 0 | B | 4 |
| 84 | 54 | 0 | 35 | 0 | A | 3 |
| 85 | 54 | 1 | 30 | 0 | 9 | E |
| 86 | 48 | 0 | 31 | 0 | 9 | F |
| 87 | 48 | 1 | 0110110× | 0 | 3 | 6 |
| 88 | 80 | 0 | 40 | 0 | A | 8 |
| 89 | 80 | 1 | 32 | 0 | A | 0 |
| 90 | 77 | 0 | 34 | 0 | A | 2 |
| 91 | 77 | 1 | 0110010× | 0 | 3 | 2 |
| 92 | 40 | 0 | 36 | 0 | A | 4 |
| 93 | 40 | 1 | 0110011× | 0 | 3 | 3 |
| 94 | 66 | 0 | 0110101× | 0 | 3 | 5 |
| 95 | 66 | 1 | 37 | 0 | A | 5 |
| 96 | 63 | 0 | 38 | 0 | A | 6 |
| 97 | 63 | 1 | 0110100× | 0 | 3 | 4 |
| 98 | 78 | 0 | 42 | 0 | A | A |
| 99 | 78 | 1 | 41 | 0 | A | 9 |
| 100 | 91 | 0 | 43 | 0 | A | B |
| 101 | 91 | 1 | 0111000× | 0 | 3 | 8 |
| 102 | 93 | 0 | 44 | 0 | A | C |
| 103 | 93 | 1 | 47 | 0 | A | F |
| 104 | 97 | 0 | 45 | 0 | A | D |
| 105 | 97 | 1 | 46 | 0 | A | E |
| 106 | 94 | 0 | 48 | 0 | B | 0 |
| 107 | 94 | 1 | 0111001× | 0 | 3 | 9 |
| 108 | 87 | 0 | 50 | 0 | B | 2 |
| 109 | 87 | 1 | 49 | 0 | B | 1 |
| 110 | 58 | 0 | 51 | 0 | B | 3 |
| 111 | 58 | 1 | 0111100× | 0 | 3 | C |
| 112 | 101 | 0 | 0111111× | 0 | 3 | F |
| 113 | 101 | 1 | 54 | 0 | B | 6 |
| 114 | 107 | 0 | 0111011× | 0 | 3 | B |
| 115 | 107 | 1 | 0111010× | 0 | 3 | A |
| 116 | 115 | 0 | 55 | 0 | B | 7 |
| 117 | 115 | 1 | 58 | 0 | B | A |
| 118 | 114 | 0 | 1001001× | 0 | 4 | 9 |
| 119 | 114 | 1 | 56 | 0 | B | 8 |
| 120 | 111 | 0 | 0111101× | 0 | 3 | D |
| 121 | 111 | 1 | 128 | 1 | 8 | 0 |
| 122 | 120 | 0 | 57 | 0 | B | 9 |
| 123 | 120 | 1 | 0111110× | 0 | 3 | E |
| 124 | 123 | 0 | 60 | 0 | B | C |
| 125 | 123 | 1 | 59 | 0 | B | B |
| 126 | 112 | 0 | 1000001× | 0 | 4 | 1 |
| 127 | 112 | 1 | 1000000× | 0 | 4 | 0 |
| 128 | 127 | 0 | 61 | 0 | B | D |
| 129 | 127 | 1 | 63 | 0 | B | F |
| 130 | 126 | 0 | 1000010× | 0 | 4 | 2 |
| 131 | 126 | 1 | 62 | 0 | B | E |
| 132 | 130 | 0 | 1000111× | 0 | 4 | 7 |
| 133 | 130 | 1 | 1000011× | 0 | 4 | 3 |
| 134 | 133 | 0 | 1000100× | 0 | 4 | 4 |
| 135 | 133 | 1 | 1101101× | 0 | 6 | D |

| | | | | | | |
|---|---|---|---|---|---|---|
| 136 | 134 | 0 | 64 | 0 | C | 0 |
| 137 | 134 | 1 | 1000101x | 0 | 4 | 5 |
| 138 | 137 | 0 | 1000110x | 0 | 4 | 6 |
| 139 | 137 | 1 | 1111100x | 0 | 7 | C |
| 140 | 138 | 0 | 65 | 0 | C | 1 |
| 141 | 138 | 1 | 1111111x | 0 | 7 | F |
| 142 | 132 | 0 | 1010000x | 0 | 5 | 0 |
| 143 | 132 | 1 | 1001000x | 0 | 4 | 8 |
| 144 | 143 | 0 | 69 | 0 | C | 5 |
| 145 | 143 | 1 | 66 | 0 | C | 2 |
| 146 | 118 | 0 | 1001010x | 0 | 4 | A |
| 147 | 118 | 1 | 1010101x | 0 | 5 | 5 |
| 148 | 146 | 0 | 1011011x | 0 | 5 | B |
| 149 | 146 | 1 | 1001011x | 0 | 4 | B |
| 150 | 149 | 0 | 1010001x | 0 | 5 | 1 |
| 151 | 149 | 1 | 1001100x | 0 | 4 | C |
| 152 | 151 | 0 | 1001101x | 0 | 4 | D |
| 153 | 151 | 1 | 105 | 0 | E | 9 |
| 154 | 152 | 0 | 1001111x | 0 | 4 | F |
| 155 | 152 | 1 | 1001110x | 0 | 4 | E |
| 156 | 155 | 0 | 68 | 0 | C | 4 |
| 157 | 155 | 1 | 67 | 0 | C | 3 |
| 158 | 154 | 0 | 71 | 0 | C | 7 |
| 159 | 154 | 1 | 70 | 0 | C | 6 |
| 160 | 142 | 0 | 76 | 0 | C | C |
| 161 | 142 | 1 | 72 | 0 | C | 8 |
| 162 | 150 | 0 | 1011000x | 0 | 5 | 8 |
| 163 | 150 | 1 | 1010010x | 0 | 5 | 2 |
| 164 | 163 | 0 | 1010100x | 0 | 5 | 4 |
| 165 | 163 | 1 | 1010011x | 0 | 5 | 3 |
| 166 | 165 | 0 | 74 | 0 | C | A |
| 167 | 165 | 1 | 73 | 0 | C | 9 |
| 168 | 164 | 0 | 78 | 0 | C | E |
| 169 | 164 | 1 | 75 | 0 | C | B |
| 170 | 147 | 0 | 1011111x | 0 | 5 | F |
| 171 | 147 | 1 | 1010110x | 0 | 5 | 6 |
| 172 | 171 | 0 | 1100001x | 0 | 6 | 1 |
| 173 | 171 | 1 | 1010111x | 0 | 5 | 7 |
| 174 | 173 | 0 | 80 | 0 | D | 0 |
| 175 | 173 | 1 | 77 | 0 | C | D |
| 176 | 162 | 0 | 1011010x | 0 | 5 | A |
| 177 | 162 | 1 | 1011001x | 0 | 5 | 9 |
| 178 | 177 | 0 | 81 | 0 | D | 1 |
| 179 | 177 | 1 | 79 | 0 | C | F |
| 180 | 176 | 0 | 83 | 0 | D | 3 |
| 181 | 176 | 1 | 82 | 0 | D | 2 |
| 182 | 148 | 0 | 1100101x | 0 | 6 | 5 |
| 183 | 148 | 1 | 1011100x | 0 | 5 | C |
| 184 | 183 | 0 | 1100010x | 0 | 6 | 2 |
| 185 | 183 | 1 | 1011101x | 0 | 5 | D |
| 186 | 185 | 0 | 1100000x | 0 | 6 | 0 |
| 187 | 185 | 1 | 1011110x | 0 | 5 | E |
| 188 | 187 | 0 | 85 | 0 | D | 5 |
| 189 | 187 | 1 | 84 | 0 | D | 4 |
| 190 | 170 | 0 | 86 | 0 | D | 6 |
| 191 | 170 | 1 | 1101000x | 0 | 6 | 8 |
| 192 | 186 | 0 | 89 | 0 | D | 9 |
| 193 | 186 | 1 | 87 | 0 | D | 7 |
| 194 | 172 | 0 | 90 | 0 | D | A |
| 195 | 172 | 1 | 88 | 0 | D | 8 |
| 196 | 184 | 0 | 1100100x | 0 | 6 | 4 |
| 197 | 184 | 1 | 1100011x | 0 | 6 | 3 |
| 198 | 197 | 0 | 92 | 0 | D | C |
| 199 | 197 | 1 | 91 | 0 | D | B |
| 200 | 196 | 0 | 94 | 0 | D | E |
| 201 | 196 | 1 | 93 | 0 | D | D |
| 202 | 182 | 0 | 1101010x | 0 | 6 | A |
| 203 | 182 | 1 | 1100110x | 0 | 6 | 6 |
| 204 | 203 | 0 | 1101001x | 0 | 6 | 9 |
| 205 | 203 | 1 | 1100111x | 0 | 6 | 7 |
| 206 | 205 | 0 | 97 | 0 | E | 1 |
| 207 | 205 | 1 | 95 | 0 | D | F |
| 208 | 191 | 0 | 101 | 0 | E | 5 |
| 209 | 191 | 1 | 96 | 0 | E | 0 |
| 210 | 204 | 0 | 99 | 0 | E | 3 |

| Entry | Father | Bit | Value or Sons | ROM Data: EOB,Z,E,T,D6-D0 | | |
|---|---|---|---|---|---|---|
| 211 | 204 | 1 | 98 | 0 | E | 2 |
| 212 | 202 | 0 | 1101100x | 0 | 6 | C |
| 213 | 202 | 1 | 1101011x | 0 | 6 | B |
| 214 | 213 | 0 | 102 | 0 | E | 6 |
| 215 | 213 | 1 | 100 | 0 | E | 4 |
| 216 | 212 | 0 | 104 | 0 | E | 8 |
| 217 | 212 | 1 | 103 | 0 | E | 7 |
| 218 | 135 | 0 | 1110101x | 0 | 7 | 5 |
| 219 | 135 | 1 | 1101110x | 0 | 6 | E |
| 220 | 219 | 0 | 1110010x | 0 | 7 | 2 |
| 221 | 219 | 1 | 1101111x | 0 | 6 | F |
| 222 | 221 | 0 | 1110001x | 0 | 7 | 1 |
| 223 | 221 | 1 | 1110000x | 0 | 7 | 0 |
| 224 | 223 | 0 | 107 | 0 | E | B |
| 225 | 223 | 1 | 106 | 0 | E | A |
| 226 | 222 | 0 | 109 | 0 | E | D |
| 227 | 222 | 1 | 108 | 0 | E | C |
| 228 | 220 | 0 | 1110100x | 0 | 7 | 4 |
| 229 | 220 | 1 | 1110011x | 0 | 7 | 3 |
| 230 | 229 | 0 | 111 | 0 | E | F |
| 231 | 229 | 1 | 110 | 0 | E | E |
| 232 | 228 | 0 | 113 | 0 | F | 1 |
| 233 | 228 | 1 | 112 | 0 | F | 0 |
| 234 | 218 | 0 | 1111001x | 0 | 7 | 9 |
| 235 | 218 | 1 | 1110110x | 0 | 7 | 6 |
| 236 | 235 | 0 | 1111000x | 0 | 7 | 8 |
| 237 | 235 | 1 | 1110111x | 0 | 7 | 7 |
| 238 | 237 | 0 | 115 | 0 | F | 3 |
| 239 | 237 | 1 | 114 | 0 | F | 2 |
| 240 | 236 | 0 | 117 | 0 | F | 5 |
| 241 | 236 | 1 | 116 | 0 | F | 4 |
| 242 | 234 | 0 | 1111011x | 0 | 7 | B |
| 243 | 234 | 1 | 1111010x | 0 | 7 | A |
| 244 | 243 | 0 | 119 | 0 | F | 7 |
| 245 | 243 | 1 | 118 | 0 | F | 6 |
| 246 | 242 | 0 | 121 | 0 | F | 9 |
| 247 | 242 | 1 | 120 | 0 | F | 8 |
| 248 | 139 | 0 | 1111110x | 0 | 7 | E |
| 249 | 139 | 1 | 1111101x | 0 | 7 | D |
| 250 | 249 | 0 | 123 | 0 | F | B |
| 251 | 249 | 1 | 122 | 0 | F | A |
| 252 | 248 | 0 | 125 | 0 | F | D |
| 253 | 248 | 1 | 124 | 0 | F | C |
| 254 | 141 | 0 | 127 | 0 | F | F |
| 255 | 141 | 1 | 126 | 0 | F | E |

© 1982 Bell & Howell

TABLE B

** Entry * Father * Bit * Value or Sons * ROM Data: EOB,Z,E,T,D6-D0 *

| Entry | Father | Bit | Value or Sons | ROM Data | | |
|---|---|---|---|---|---|---|
| 0 | none | 0 | 0000001x | 0 | 0 | 1 |
| 1 | none | 1 | 0000010x | 0 | 0 | 2 |
| 2 | 0 | 0 | 0000101x | 0 | 0 | 5 |
| 3 | 0 | 1 | 0 | 0 | 8 | 0 |
| 4 | 1 | 0 | 0000011x | 0 | 0 | 3 |
| 5 | 1 | 1 | 128 | 4 | 8 | 0 |
| 6 | 4 | 0 | 1 | 0 | 8 | 1 |
| 7 | 4 | 1 | 0000100x | 0 | 0 | 4 |
| 8 | 7 | 0 | 0001000x | 0 | 0 | 8 |
| 9 | 7 | 1 | 2 | 0 | 8 | 2 |
| 10 | 2 | 0 | 0000111x | 0 | 0 | 7 |
| 11 | 2 | 1 | 0000110x | 0 | 0 | 6 |
| 12 | 11 | 0 | 3 | 0 | 8 | 3 |
| 13 | 11 | 1 | 0001011x | 0 | 0 | B |
| 14 | 10 | 0 | 4 | 0 | 8 | 4 |
| 15 | 10 | 1 | 0001001x | 0 | 0 | 9 |
| 16 | 8 | 0 | 5 | 0 | 8 | 5 |
| 17 | 8 | 1 | 0001010x | 0 | 0 | A |
| 18 | 15 | 0 | 0001110x | 0 | 0 | E |
| 19 | 15 | 1 | 6 | 0 | 8 | 6 |
| 20 | 17 | 0 | 8 | 0 | 8 | 8 |
| 21 | 17 | 1 | 7 | 0 | 8 | 7 |
| 22 | 13 | 0 | 0001101x | 0 | 0 | D |
| 23 | 13 | 1 | 0001100x | 0 | 0 | C |
| 24 | 23 | 0 | 9 | 0 | 8 | 9 |

| | | | | | | |
|---|---|---|---|---|---|---|
| 25 | 23 | 1 | 0001111× | 0 | 0 | F |
| 26 | 22 | 0 | 0010000× | 0 | 1 | 0 |
| 27 | 22 | 1 | 10 | 0 | 8 | A |
| 28 | 18 | 0 | 0010001× | 0 | 1 | 1 |
| 29 | 18 | 1 | 11 | 0 | 8 | B |
| 30 | 25 | 0 | 0010011× | 0 | 1 | 3 |
| 31 | 25 | 1 | 12 | 0 | 8 | C |
| 32 | 26 | 0 | 14 | 0 | 8 | E |
| 33 | 26 | 1 | 13 | 0 | 8 | D |
| 34 | 28 | 0 | 0010101× | 0 | 1 | 5 |
| 35 | 28 | 1 | 0010010× | 0 | 1 | 2 |
| 36 | 35 | 0 | 15 | 0 | 8 | F |
| 37 | 35 | 1 | 0011000× | 0 | 1 | 8 |
| 38 | 30 | 0 | 0010100× | 0 | 1 | 4 |
| 39 | 30 | 1 | 0011011× | 0 | 1 | B |
| 40 | 38 | 0 | 16 | 0 | 9 | 0 |
| 41 | 38 | 1 | 0011010× | 0 | 1 | A |
| 42 | 34 | 0 | 0010111× | 0 | 1 | 7 |
| 43 | 34 | 1 | 0010110× | 0 | 1 | 6 |
| 44 | 43 | 0 | 20 | 0 | 9 | 4 |
| 45 | 43 | 1 | 17 | 0 | 9 | 1 |
| 46 | 42 | 0 | 18 | 0 | 9 | 2 |
| 47 | 42 | 1 | 22 | 0 | 9 | 6 |
| 48 | 37 | 0 | 0011110× | 0 | 1 | E |
| 49 | 37 | 1 | 0011001× | 0 | 1 | 9 |
| 50 | 49 | 0 | 0100111× | 0 | 2 | 7 |
| 51 | 49 | 1 | 19 | 0 | 9 | 3 |
| 52 | 41 | 0 | 26 | 0 | 9 | A |
| 53 | 41 | 1 | 21 | 0 | 9 | 5 |
| 54 | 39 | 0 | 0011101× | 0 | 1 | D |
| 55 | 39 | 1 | 0011100× | 0 | 1 | C |
| 56 | 55 | 0 | 25 | 0 | 9 | 9 |
| 57 | 55 | 1 | 23 | 0 | 9 | 7 |
| 58 | 54 | 0 | 0011111× | 0 | 1 | F |
| 59 | 54 | 1 | 24 | 0 | 9 | 8 |
| 60 | 48 | 0 | 27 | 0 | 9 | B |
| 61 | 48 | 1 | 0100011× | 0 | 2 | 3 |
| 62 | 58 | 0 | 0100001× | 0 | 2 | 1 |
| 63 | 58 | 1 | 0100000× | 0 | 2 | 0 |
| 64 | 63 | 0 | 28 | 0 | 9 | C |
| 65 | 63 | 1 | 0101011× | 0 | 2 | B |
| 66 | 62 | 0 | 30 | 0 | 9 | E |
| 67 | 62 | 1 | 0100010× | 0 | 2 | 2 |
| 68 | 67 | 0 | 0110001× | 0 | 3 | 1 |
| 69 | 67 | 1 | 29 | 0 | 9 | D |
| 70 | 61 | 0 | 0100100× | 0 | 2 | 4 |
| 71 | 61 | 1 | 1010111× | 0 | 5 | 7 |
| 72 | 70 | 0 | 0100101× | 0 | 2 | 5 |
| 73 | 70 | 1 | 0100110× | 0 | 2 | 6 |
| 74 | 72 | 0 | 31 | 0 | 9 | F |
| 75 | 72 | 1 | 0101101× | 0 | 2 | D |
| 76 | 73 | 0 | 32 | 0 | A | 0 |
| 77 | 73 | 1 | 1110110× | 0 | 7 | 6 |
| 78 | 50 | 0 | 0111000× | 0 | 3 | 8 |
| 79 | 50 | 1 | 0101000× | 0 | 2 | 8 |
| 80 | 79 | 0 | 0101001× | 0 | 2 | 9 |
| 81 | 79 | 1 | 35 | 0 | A | 3 |
| 82 | 80 | 0 | 0101110× | 0 | 2 | E |
| 83 | 80 | 1 | 0101010× | 0 | 2 | A |
| 84 | 83 | 0 | 36 | 0 | A | 4 |
| 85 | 83 | 1 | 33 | 0 | A | 1 |
| 86 | 65 | 0 | 0101100× | 0 | 2 | C |
| 87 | 65 | 1 | 34 | 0 | A | 2 |
| 88 | 86 | 0 | 38 | 0 | A | 6 |
| 89 | 86 | 1 | 37 | 0 | A | 5 |
| 90 | 75 | 0 | 39 | 0 | A | 7 |
| 91 | 75 | 1 | 1111101× | 0 | 7 | D |
| 92 | 82 | 0 | 0110101× | 0 | 3 | 5 |
| 93 | 82 | 1 | 0101111× | 0 | 2 | F |
| 94 | 93 | 0 | 0110100× | 0 | 3 | 4 |
| 95 | 93 | 1 | 0110000× | 0 | 3 | 0 |
| 96 | 95 | 0 | 44 | 0 | A | C |
| 97 | 95 | 1 | 40 | 0 | A | 8 |
| 98 | 68 | 0 | 0110011× | 0 | 3 | 3 |
| 99 | 68 | 1 | 0110010× | 0 | 3 | 2 |
| 100 | 99 | 0 | 42 | 0 | A | A |

| | | | | | | |
|---|---|---|---|---|---|---|
| 101 | 99 | 1 | 41 | 0 | A | 9 |
| 102 | 98 | 0 | 47 | 0 | A | F |
| 103 | 98 | 1 | 43 | 0 | A | B |
| 104 | 94 | 0 | 46 | 0 | A | E |
| 105 | 94 | 1 | 45 | 0 | A | D |
| 106 | 92 | 0 | 0110111x | 0 | 3 | 7 |
| 107 | 92 | 1 | 0110110x | 0 | 3 | 6 |
| 108 | 107 | 0 | 49 | 0 | B | 1 |
| 109 | 107 | 1 | 48 | 0 | B | 0 |
| 110 | 106 | 0 | 51 | 0 | B | 3 |
| 111 | 106 | 1 | 50 | 0 | B | 2 |
| 112 | 78 | 0 | 1001000x | 0 | 4 | 8 |
| 113 | 78 | 1 | 0111001x | 0 | 3 | 9 |
| 114 | 113 | 0 | 1000001x | 0 | 4 | 1 |
| 115 | 113 | 1 | 0111010x | 0 | 3 | A |
| 116 | 115 | 0 | 0111110x | 0 | 3 | E |
| 117 | 115 | 1 | 0111011x | 0 | 3 | B |
| 118 | 117 | 0 | 0111101x | 0 | 3 | D |
| 119 | 117 | 1 | 0111100x | 0 | 3 | C |
| 120 | 119 | 0 | 53 | 0 | B | 5 |
| 121 | 119 | 1 | 52 | 0 | B | 4 |
| 122 | 118 | 0 | 55 | 0 | B | 7 |
| 123 | 118 | 1 | 54 | 0 | B | 6 |
| 124 | 116 | 0 | 1000000x | 0 | 4 | 0 |
| 125 | 116 | 1 | 0111111x | 0 | 3 | F |
| 126 | 125 | 0 | 57 | 0 | B | 9 |
| 127 | 125 | 1 | 56 | 0 | B | 8 |
| 128 | 124 | 0 | 59 | 0 | B | B |
| 129 | 124 | 1 | 58 | 0 | B | A |
| 130 | 114 | 0 | 1000101x | 0 | 4 | 5 |
| 131 | 114 | 1 | 1000010x | 0 | 4 | 2 |
| 132 | 131 | 0 | 1000100x | 0 | 4 | 4 |
| 133 | 131 | 1 | 1000011x | 0 | 4 | 3 |
| 134 | 133 | 0 | 61 | 0 | B | D |
| 135 | 133 | 1 | 60 | 0 | B | C |
| 136 | 132 | 0 | 63 | 0 | B | F |
| 137 | 132 | 1 | 62 | 0 | B | E |
| 138 | 130 | 0 | 1000111x | 0 | 4 | 7 |
| 139 | 130 | 1 | 1000110x | 0 | 4 | 6 |
| 140 | 139 | 0 | 65 | 0 | C | 1 |
| 141 | 139 | 1 | 64 | 0 | C | 0 |
| 142 | 138 | 0 | 67 | 0 | C | 3 |
| 143 | 138 | 1 | 66 | 0 | C | 2 |
| 144 | 112 | 0 | 1010000x | 0 | 5 | 0 |
| 145 | 112 | 1 | 1001001x | 0 | 4 | 9 |
| 146 | 145 | 0 | 1001101x | 0 | 4 | D |
| 147 | 145 | 1 | 1001010x | 0 | 4 | A |
| 148 | 147 | 0 | 1001100x | 0 | 4 | C |
| 149 | 147 | 1 | 1001011x | 0 | 4 | B |
| 150 | 149 | 0 | 69 | 0 | C | 5 |
| 151 | 149 | 1 | 68 | 0 | C | 4 |
| 152 | 148 | 0 | 71 | 0 | C | 7 |
| 153 | 148 | 1 | 70 | 0 | C | 6 |
| 154 | 146 | 0 | 1001111x | 0 | 4 | F |
| 155 | 146 | 1 | 1001110x | 0 | 4 | E |
| 156 | 155 | 0 | 73 | 0 | C | 9 |
| 157 | 155 | 1 | 72 | 0 | C | 8 |
| 158 | 154 | 0 | 75 | 0 | C | B |
| 159 | 154 | 1 | 74 | 0 | C | A |
| 160 | 144 | 0 | 1010100x | 0 | 5 | 4 |
| 161 | 144 | 1 | 1010001x | 0 | 5 | 1 |
| 162 | 161 | 0 | 1010011x | 0 | 5 | 3 |
| 163 | 161 | 1 | 1010010x | 0 | 5 | 2 |
| 164 | 163 | 0 | 77 | 0 | C | D |
| 165 | 163 | 1 | 76 | 0 | C | C |
| 166 | 162 | 0 | 79 | 0 | C | F |
| 167 | 162 | 1 | 78 | 0 | C | E |
| 168 | 160 | 0 | 1010110x | 0 | 5 | 6 |
| 169 | 160 | 1 | 1010101x | 0 | 5 | 5 |
| 170 | 169 | 0 | 81 | 0 | D | 1 |
| 171 | 169 | 1 | 80 | 0 | D | 0 |
| 172 | 168 | 0 | 83 | 0 | D | 3 |
| 173 | 168 | 1 | 82 | 0 | D | 2 |
| 174 | 71 | 0 | 1100111x | 0 | 6 | 7 |
| 175 | 71 | 1 | 1011000x | 0 | 5 | 8 |
| 176 | 175 | 0 | 1100000x | 0 | 6 | 0 |
| 177 | 175 | 1 | 1011001x | 0 | 5 | 9 |

| | | | | | | |
|---|---|---|---|---|---|---|
| 178 | 177 | 0 | 1011101x | 0 | 5 | D |
| 179 | 177 | 1 | 1011010x | 0 | 5 | A |
| 180 | 179 | 0 | 1011100x | 0 | 5 | C |
| 181 | 179 | 1 | 1011011x | 0 | 5 | B |
| 182 | 181 | 0 | 85 | 0 | D | 5 |
| 183 | 181 | 1 | 84 | 0 | D | 4 |
| 184 | 180 | 0 | 87 | 0 | D | 7 |
| 185 | 180 | 1 | 86 | 0 | D | 6 |
| 186 | 178 | 0 | 1011111x | 0 | 5 | F |
| 187 | 178 | 1 | 1011110x | 0 | 5 | E |
| 188 | 187 | 0 | 89 | 0 | D | 9 |
| 189 | 187 | 1 | 88 | 0 | D | 8 |
| 190 | 186 | 0 | 91 | 0 | D | B |
| 191 | 186 | 1 | 90 | 0 | D | A |
| 192 | 176 | 0 | 1100100x | 0 | 6 | 4 |
| 193 | 176 | 1 | 1100001x | 0 | 6 | 1 |
| 194 | 193 | 0 | 1100011x | 0 | 6 | 3 |
| 195 | 193 | 1 | 1100010x | 0 | 6 | 2 |
| 196 | 195 | 0 | 93 | 0 | D | D |
| 197 | 195 | 1 | 92 | 0 | D | C |
| 198 | 194 | 0 | 95 | 0 | D | F |
| 199 | 194 | 1 | 94 | 0 | D | E |
| 200 | 192 | 0 | 1100110x | 0 | 6 | 6 |
| 201 | 192 | 1 | 1100101x | 0 | 6 | 5 |
| 202 | 201 | 0 | 97 | 0 | E | 1 |
| 203 | 201 | 1 | 96 | 0 | E | 0 |
| 204 | 200 | 0 | 99 | 0 | E | 3 |
| 205 | 200 | 1 | 98 | 0 | E | 2 |
| 206 | 174 | 0 | 1101111x | 0 | 6 | F |
| 207 | 174 | 1 | 1101000x | 0 | 6 | B |
| 208 | 207 | 0 | 1101100x | 0 | 6 | C |
| 209 | 207 | 1 | 1101001x | 0 | 6 | 9 |
| 210 | 209 | 0 | 1101011x | 0 | 6 | B |
| 211 | 209 | 1 | 1101010x | 0 | 6 | A |
| 212 | 211 | 0 | 101 | 0 | E | 5 |
| 213 | 211 | 1 | 100 | 0 | E | 4 |
| 214 | 210 | 0 | 103 | 0 | E | 7 |
| 215 | 210 | 1 | 102 | 0 | E | 6 |
| 216 | 208 | 0 | 1101110x | 0 | 6 | E |
| 217 | 208 | 1 | 1101101x | 0 | 6 | D |
| 218 | 217 | 0 | 105 | 0 | E | 9 |
| 219 | 217 | 1 | 104 | 0 | E | 8 |
| 220 | 216 | 0 | 107 | 0 | E | B |
| 221 | 216 | 1 | 106 | 0 | E | A |
| 222 | 206 | 0 | 1110011x | 0 | 7 | 3 |
| 223 | 206 | 1 | 1110000x | 0 | 7 | 0 |
| 224 | 223 | 0 | 1110010x | 0 | 7 | 2 |
| 225 | 223 | 1 | 1110001x | 0 | 7 | 1 |
| 226 | 225 | 0 | 109 | 0 | E | D |
| 227 | 225 | 1 | 108 | 0 | E | C |
| 228 | 224 | 0 | 111 | 0 | E | F |
| 229 | 224 | 1 | 110 | 0 | E | E |
| 230 | 222 | 0 | 1110101x | 0 | 7 | 5 |
| 231 | 222 | 1 | 1110100x | 0 | 7 | 4 |
| 232 | 231 | 0 | 113 | 0 | F | 1 |
| 233 | 231 | 1 | 112 | 0 | F | 0 |
| 234 | 230 | 0 | 115 | 0 | F | 3 |
| 235 | 230 | 1 | 114 | 0 | F | 2 |
| 236 | 77 | 0 | 1111010x | 0 | 7 | A |
| 237 | 77 | 1 | 1110111x | 0 | 7 | 7 |
| 238 | 237 | 0 | 1111001x | 0 | 7 | 9 |
| 239 | 237 | 1 | 1111000x | 0 | 7 | B |
| 240 | 239 | 0 | 117 | 0 | F | 5 |
| 241 | 239 | 1 | 116 | 0 | F | 4 |
| 242 | 238 | 0 | 119 | 0 | F | 7 |
| 243 | 238 | 1 | 118 | 0 | F | 6 |
| 244 | 236 | 0 | 1111100x | 0 | 7 | C |
| 245 | 236 | 1 | 1111011x | 0 | 7 | B |
| 246 | 245 | 0 | 121 | 0 | F | 9 |
| 247 | 245 | 1 | 120 | 0 | F | B |
| 248 | 244 | 0 | 123 | 0 | F | B |
| 249 | 244 | 1 | 122 | 0 | F | A |
| 250 | 91 | 0 | 1111111x | 0 | 7 | F |
| 251 | 91 | 1 | 1111110x | 0 | 7 | E |
| 252 | 251 | 0 | 125 | 0 | F | D |
| 253 | 251 | 1 | 124 | 0 | F | C |
| 254 | 250 | 0 | 127 | 0 | F | F |
| 255 | 250 | 1 | 126 | 0 | F | E |

What is claimed is:

1. A method for processing time domain information signals having a successive field format to effect substantial compression of said signals, said method comprising the steps of:
    comparing corresponding blocks of time domain information signals from successive fields to form a block difference signal;
    converting a block of said time domain information signals to transform domain signals including a D.C. coefficient representing the average intensity of a converted block and a plurality of discrete transform coefficients when said block difference signal exceeds a first variable parametric value;
    varying said first variable parametric value in accordance with the number of blocks selected for conversion; and
    encoding said transform domain coefficients for subsequent utilization.

2. The method of claim 1 wherein said step of comparing includes the steps of storing successive fields of said time domain information signals in a first memory device on a pixel by pixel basis, and retrieving said corresponding blocks from said memory device on a pixel by pixel basis.

3. The method of claim 2 further including the step of replacing a block pf pixel elements in said memory device with the corresponding block in a successive field when said difference exceeds said first variable parametric value.

4. The method of claim 2 wherein said step of storing includes the step of merging successive fields on a pixel by pixel basis.

5. The method of claim 4 wherein said step of merging is performed by summing corresponding pixels from successive fields in accordance with a predetermined weighting factor.

6. The method of claim 5 wherein the pixels from the first appearing merged field are weighted by a factor of $\frac{3}{4}$ and the pixels from the later appearing field are weighted by a factor of $\frac{1}{4}$.

7. The method of claim 1 wherein said step of converting is performed by transforming said block along a first direction and subsequently transforming said block along the orthogonal direction.

8. The method of claim 7 wherein said first direction corresponds to a horizontal line of raster scan information and said orthogonal direction corresponds to a vertical column of raster scan information.

9. The method of claim 7 wherein said step of converting includes the step of storing said transform coefficients in diagonal format in a second memory device.

10. The method of claim 9 further including the step of storing the field address of each transformed block in said second memory device.

11. A method for processing time domain information signals having a successive field format to effect substantial compression of said signals, said method comprising the steps of:
    comparing corresponding blocks of time domain information signals from successive fields to form a block difference signal, said step of comparing including the steps of storing successive fields of said time domain information signals in a first memory device on a pixel by pixel basis, retrieving said corresponding blocks from said memory device on a pixel by pixel basis, forming the difference between corresponding pixels from said successive blocks, squaring the resulting pixel difference signals, summing the squares of said resulting pixel difference signals, and dividing the resulting sum by a number of pixels per block to form said block difference signal;
    converting a block of said time domain information signals to transform domain signals including a D.C. coefficient representing the average intensity of a converted block and a plurality of discrete transform coefficients when said block difference signal exceeds a first variable parametric value; and
    encoding said transform domain coefficients for subsequent utilization.

12. The method of claim 11 wherein each block comprises a total of 64 pixels grouped in an 8 by 8 array.

13. A method for processing time domain information signals having a successive field format to effect substantial compression of said signals, said method comprising the steps of:
    comparing corresponding blocks of time domain information signals from successive fields to form a block difference signal;
    converting a block of said time domain information signals to transform domain signals including a D.C. coefficient representing the average intensity of a converted block and a plurality of discrete transform coefficients when said block difference signal exceeds a first variable parametric value; and
    encoding said transform domain coefficients for subsequent utilization, including the steps of providing a plurality of different code tables, dividing each of said plurality of discrete transform coefficients by a second variable parametric value to obtain a corresponding quantized coefficient, calculating the predictive value of each quantized coefficient, selecting one of said plurality of code tables in accordance with the predictive value, and generating a code representing said quantized coefficient from said selected table.

14. The method of claim 13 wherein said step of calculating is performed in accordance with the formula $PM_K = \frac{1}{4} C_K + \frac{3}{4} PM_{K-1}$, where $PM_K$ is the predictive mean value of the $K^{th}$ quantized coefficient, $C_K$ is the value of the $K^{th}$ quantized coefficient and $PM_{K-1}$ is the predictive mean value of the $K-1^{th}$ quantized coefficient.

15. The method of claim 13 wherein said step of encoding includes the steps of providing a dedicated code table for encoding each DC coefficient and selecting said dedicated table for each said DC coefficient.

16. The method of claim 13 wherein said time domain information signals are color video signals having quadrature components, and wherein said step of encoding includes the steps of providing individual code tables for said quadrature components, calculating the average value of each quadrature component for the converted block, and selecting a code value representing said average value from the corresponding individual quadrature component table.

17. The method of claim 13 wherein said step of encoding further includes the step of generating an address code specifying the field address of the converted block.

18. The method of claim 17 wherein said step of generating includes the steps of providing an address code table having code values arranged in accordance with the following formula:
    If $\Delta_k = 1$, code 1 bit ($\Delta_k$)
    If $\Delta_k < 32$, code 1 bit zero + 5 bits ($\Delta_k$)
    If $\Delta_k \geq 32$, code 6 bits zero + 10 bits ($\Delta_k$)

where
$\Delta_k = A_k - A_{k-1}$
$A_k$ = numerical address of current block
$A_{k-1}$ = numerical address of most recently encoded block, and selecting said address code table for each said address code.

19. The method of claim 13 wherein said step of encoding further includes the steps of comparing said predictive value with a preselected fixed threshold value, and generating a run length code specifying the total number of successive quantized coefficients of zero value when said predictive value lies below said preselected fixed threshold value.

20. The method of claim 19 wherein said step of encoding further includes the step of generating an end of block code when the predictive values for successive remaining quantized coefficients in the converted block lie below said preselected fixed threshold value.

21. The method of claim 19 wherein said codes are multi-bit binary codes, and wherein said method further includes the steps of transferring said codes to a buffer in the order of generation, monitoring the number of bits transferred to said buffer, and varying said first and second parametric values in accordance with said number of transferred bits in order to minimize buffer overflow.

22. The method of claim 21 wherein said second parametric value is varied in accordance with the formula:

$$D = D'_K + K_D \cdot BFN(B_K - N/2)$$

where
$BFN(X) = (X/N - |X|)$
$D_K$ = Distortion parameter for block K
$D'_K$ = Filtered distortion parameter $$D'_K = T \cdot D'_{K-1} + (1-T)D_{K-1}$$

where
T = a constant (close to 1)
$K_D$ = a constant
$B_K$ = # of bits in buffer for block K
N = Max. number of bits.

23. The method of claim 22 wherein said first parametric value is varied in accordance with the alternate formula:

$$T_K = T_{INIT}$$

for $B_{LOW} \leq B_K \leq B_{HIGH}$ $$T_K = T_{INIT} + K_R \cdot BFN(B_{LOW} - B_K)$$

for $B_K < B_{LOW}$ $$T_K = T_{INIT} + K_R \cdot BFN(B_K - B_{HIGH})$$

for $B_K > B_{HIGH}$
where
$T_K$ = replenishment threshold for block K
$T_{INIT}$ = initial threshold (about 5 for 8-bit input data)
$K_R$ = multiplier constant (about 25-75)
$B_{LOW}$ = low cutoff (about 0.1 of buffer)
$B_{HIGH}$ = high cutoff (about 0.75 of buffer).

24. The method of claim 13 wherein each of said code tables comprises a Huffman code table.

25. A method of encoding transform coefficients representing time domain information signals having a successive field format prior to transmission over a communication link in order to effect substantial compression of said signals, said transform coefficients being arranged in a plurality of groups, each group representing an N by N block of field information signals, said method comprising the steps of:

(a) providing a plurality of code tables:
(b) generating a block address code from a first dedicated one of said code tables, said block address code representing the field address of the block represented by a group of said transform coefficients;
(c) generating a DC coefficient code representing the average intensity of said block from a second dedicated one of said plurality of code tables; and
(d) generating a succession of codes representing the remaining transform coefficients corresponding to said block by calculating the predictive value of each said remaining transform coefficient, selecting one of said plurality of code tables in accordance with said predictive value, and generating a code representing the corresponding transform coefficient from said selected table.

26. The method of claim 25 wherein said step of calculating is performed in accordance with the formula $PM_K = \frac{1}{4} C_K + \frac{3}{4} PM_{K-1}$, where $PM_K$ is the predictive mean value of the $K^{th}$ coefficient, $C_K$ is the actual value of the $K^{th}$ coefficient and $PM_{K-1}$ is the predictive mean value of the $K-1^{th}$ coefficient.

27. The method of claim 25 wherein said time domain information signals are color video signals having quadrature components, and wherein said method of encoding includes the steps of providing individual code tables for said quadrature components, calculating the average value of each quadrature component for said block, and selecting a code value representing said average value from the corresponding individual quadrature component table.

28. The method of claim 25 wherein said method of encoding further includes the steps of comparing each said predictive value with a preselected threshold value, and generating a zero run length code specifying the total number of successive predictive values lying below said preselected threshold value.

29. The method of claim 28 wherein said codes are multi-bit binary codes, wherein said method of encoding further includes dividing each of said remaining transform coefficients by a variable parametric value to obtain corresponding quantized remaining coefficients for use in forming the predictive values, and wherein said method further includes the steps of transferring said codes to a buffer in the order of generation, monitoring the number of bits transferred to said buffer, and varying said variable parametric value in accordance with the following formula:

$$D = D'_K + K_D \cdot BFN(B_K - N/2)$$

where
$BFN(X) = X/(N - |X|)$
$D_K$ = Distortion parameter for block K
$D'_K$ = Filtered distortion parameter $$D'_K = T \cdot D'_{K-1} + (1-T)D_{K-1}$$

where
T = a constant (close to 1)
$K_D$ = a constant
$B_K$ = # of bits in buffer for block K
N = Max. number of bits.

30. The method of claim 28 further including the step of generating an end of block code when the predictive values for successive remaining transform coefficients in said block lie below said preselected threshold value.

31. The method of claim 25 wherein said transform coefficients comprise discrete consine transform coefficients.

32. A method for processing time domain information signals for transmission over a communication link, said time domain information signals having a successive field format, said method comprising the steps of:
  comparing corresponding sub-field blocks of time domain information signals from successive fields to form a block difference signal;
  converting a sub-field block of said time domain information signals to a transform domain signal represented by a D.C. coefficient representing the average intensity of the converted block and a pluality of discrete transform coefficients when said block difference signal between the corresponding blocks exceeds a first variable parametric value; and
  generating a frame sync code signal indicating the beginning of a frame;
  generating a first control code signal $B_K$ representative of the fullness of a transmission rate buffer at the beginning of said frame;
  generating a second control code signal $D_K$ representative of a second variable parametric value at the beginning of said frame; and
  generating a plurality of block replenishment code symbols each representative of the value of transform coefficients corresponding to individual sub-field blocks having interfield block differences greater than said first variable parametric value, each said block replenishment code symbol including a block address code specifying the field address of the corresponding block, a D.C. code term representative of said D.C. coefficient of the corresponding block, and a plurality of coefficient code terms representative of the value of said plurality of discrete transform coefficients as quantified according to said second control code signal $D_K$ for the corresponding block.

33. The method of claim 32 wherein said time domain information signals are color video signals having quadrature components, and wherein said step of generating block replenishment code symbols includes the step of providing first and second color code terms in each of said plurality of said block replenishment code symbols representing the average value of each quadrature component for said corresponding block between said block address code and said DC code term.

34. The method of claim 32 wherein said step of generating block replenishment code symbols includes the step of providing a run length code term specifying the total number of successive transform coefficient zero values having a predictive mean value less than a preselected fixed threshold value.

35. The method of claim 32 wherein said step of generating block replenishment code symbols includes a step of providing an end of block code term when the predictive values for successive remaining transform coefficients in said corresponding block lie below a preselected fixed threshold value.

* * * * *

UNITED STATES PATENT AND TRADEMARK OFFICE
CERTIFICATE OF CORRECTION

PATENT NO. : 4,541,012

DATED : September 10, 1985

INVENTOR(S) : ANDREW G. TESCHER et al

It is certified that error appears in the above-identified patent and that said Letters Patent is hereby corrected as shown below:

Title page, item [75] should read:
    Inventors:  Andrew G. Tescher, Claremont, Calif.,
                Eric R. Hamilton, Los Gatos, Calif.,
                Robert D. Widergren, Saratoga, Calif., and
                Stanley C. Fralick, Saratoga, Calif.

Column 3, line 19, "varible" should be --variable--.

Column 3, line 48, "availablef" should be --variable--.

Column 11, line 32, formula should read:
$$I_{AV\ BLOCK\ K} = (I_{AV1} + I_{AV2} + \ldots + I_{AV8})/8$$

Column 11, line 45, formula should read:
$$Q_{AV\ BLOCK\ K} = (A_{AV1} + Q_{AV2} + \ldots + Q_{AV8})/8$$

Column 83, line 51 should read: --for $B_{LOW} \leq B_K \leq B_{HIGH}$--

Column 85, line 5, "consine" should be --cosine--.

Signed and Sealed this

Sixth Day of May 1986

[SEAL]

Attest:

DONALD J. QUIGG

Attesting Officer    Commissioner of Patents and Trademarks